(12) United States Patent
Ghaboosi et al.

(10) Patent No.: US 8,831,519 B2
(45) Date of Patent: Sep. 9, 2014

(54) DISTRIBUTED MULTI-CHANNEL COGNITIVE MAC PROTOCOL

(75) Inventors: Kaveh Ghaboosi, Oulu (FI); Matti Latva-aho, Oulu (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1033 days.

(21) Appl. No.: 12/082,361

(22) Filed: Apr. 9, 2008

(65) Prior Publication Data

US 2009/0258603 A1 Oct. 15, 2009

(51) Int. Cl.
*H04B 15/00* (2006.01)
*H04W 74/08* (2009.01)
*H04W 74/00* (2009.01)
*H04W 16/14* (2009.01)

(52) U.S. Cl.
CPC .............. *H04W 74/08* (2013.01); *H04W 16/14* (2013.01); *H04W 74/002* (2013.01)
USPC ................................ 455/62; 455/68; 455/450

(58) Field of Classification Search
CPC .................................................... H04W 16/14
USPC ............................................ 455/62, 68, 450
See application file for complete search history.

(56) References Cited

U.S. PATENT DOCUMENTS

| | | | |
|---|---|---|---|
| 4,644,546 A * | 2/1987 | Doi et al. ....................... | 714/800 |
| 2001/0049283 A1* | 12/2001 | Thomas ........................ | 455/426 |
| 2002/0057208 A1* | 5/2002 | Lin et al. .................. | 340/825.49 |
| 2004/0266493 A1* | 12/2004 | Bahl et al. ..................... | 455/574 |
| 2005/0227650 A1* | 10/2005 | Williams ................... | 455/179.1 |
| 2006/0084444 A1 | 4/2006 | Kossi et al. ................... | 455/450 |

OTHER PUBLICATIONS

G. Hiertz et al., "Principles of IEEE 820.11s", 1-4244-1241-X-07, 2007 IEEE.
802.11g, IEEE Std. 802.11g-2003, Part 11: Wireless LAN Medium Access Control (MAC) and Physical Layer (PHY) Specification, Amendment 4: Further Higher Data Rate Extension in the 2.4 GHz Band, Jun. 27, 2003.
IEEE Std. 802.11b-1999, Supplement to ANSI/IEEE Std. 80211, 1999 Edition, Part 11: Wireless LAN Medium Access Control (MAC) and Physical Layer (PHY) Specifications; Higher-Speed Physical Layer Extension in the 2.4 GHz Band, Jan. 20, 2000.

(Continued)

*Primary Examiner* — Hsin-Chun Liao
(74) *Attorney, Agent, or Firm* — Ziegler IP Law Group

(57) ABSTRACT

A method includes sending a message from a first cognitive radio apparatus to at least one second cognitive radio apparatus, the message being sent over a first communication channel and containing an advertisement of at least one second communication channel for use in sending data from the first cognitive radio apparatus to the at least one second cognitive radio apparatus. The method further includes receiving a reply from the at least one second cognitive radio apparatus over the first communication channel, where the reply contains one of an acceptance of one of the at least one second communication channels, a rejection of the at least one second communication channel and an advertisement of at least one third communication channel, or a rejection of the at least one second communication channel without an advertisement of at least one third communication channel. The method further includes transmitting the data from the first cognitive radio apparatus to the at least one second cognitive radio apparatus over an agreed upon one of the second or third channels.

31 Claims, 33 Drawing Sheets

(56) References Cited

OTHER PUBLICATIONS

IEEE Std. 802.11 a-1999, (Supplement to IEEE Std. 802.11-1999), Part 11: Wireless LAN MediumAccesS Control (MAC) and Physical Layer (PHY) Specifications: High-Speed Physical Layer in the 5 GHz Band, Dec. 30, 1999.

IEEE Std. 802.11h-2003, (Amendment to IEEE Std. 80211. 1999 Edition (Reaff 2003), Part 11: Wireless LAN Medium Access Control (MAC) and Physical Layer (PHY) Specifications Amendment 5: Spectrum and Transmit Power Management Extension in the 5 GHz band in Europe, IEEE Computer Society, Oct. 14, 2003.

Ma L., et al. "Dynamic Open Spectrum Sharing MAC Protocol for Wireless Ad Hoc Networks", 2005 First IEEE International Symposium on New Frontiers in Dynamic Spectrum Access Networks, Nov. 2005, pp. 203-213.

Wang J.C., et al. "A Survey on Control Separation Techniques in Multi-Radio Multi-Channel MAC Protocols", International Symposium on Communications and Information Technologies, IEEE Oct. 2007, pp. 854-859.

* cited by examiner

| 5000 (000) | 5160 (032) | 5320 (064) | 5480 (096) | 5640 (128) | 5785 (157) | 5945 (189) |
|---|---|---|---|---|---|---|
| 5020 (004) | 5180 (036) | 5340 (068) | 5500 (100) | 5660 (132) | 5805 (161) | 5965 (193) |
| 5040 (008) | 5200 (040) | 5360 (072) | 5520 (104) | 5680 (136) | 5825 (165) | 5985 (197) |
| 5060 (012) | 5220 (044) | 5380 (076) | 5540 (108) | 5700 (140) | 5845 (169) | 5990 (198) |
| 5080 (016) | 5240 (048) | 5400 (080) | 5560 (112) | 5720 (144) | 5865 (173) | 5995 (199) |
| 5100 (020) | 5260 (052) | 5420 (084) | 5580 (116) | 5740 (148) | 5885 (177) | 6000 (000) |
| 5120 (024) | 5280 (056) | 5440 (088) | 5600 (120) | 5745 (149) | 5905 (181) |  |
| 5140 (028) | 5300 (060) | 5460 (092) | 5620 (124) | 5765 (153) | 5925 (185) |  |

FIG.2A

| 2412 (001) | 2427 (004) | 2442 (007) | 2457 (010) | 2472 (013) | 2487 (016) |
|---|---|---|---|---|---|
| 2417 (002) | 2432 9005 | 2447 (008) | 2462 (011) | 2477 (014) |  |
| 2422 (003) | 2437 (006) | 2452 (009) | 2467 (012) | 2482 (015) |  |

FIG.2B

| 3000 (131) | 3010 (133) | 3020 (135) | 3030 (137) | 3040 (139) | 3050 (141) |
|---|---|---|---|---|---|
| 3005 (132) | 3015 (134) | 3025 (136) | 3035 (138) | 3045 (140) |  |

LEGACY HEADER FIELDS (ATIM, RTS, CTS, ACK, etc.) | CHANNEL INFORMATION | FCS
— VARIABLE —

FIG.4

CHANNEL INFORMATION (CI)

| CC (CHANNEL CONTROL) 1 BYTE | REGULATORY CLASS 1 BYTE | CHANNEL MASK 1 BYTE | CENTER FREQUENCY 2 BYTES |

MANDATORY | OPTIONAL – IF RC FIELD IS NOT USED, IT SHOULD BE LOADED BY RECOMMENDED BANDWIDTH IN MHz

FIG.5

PROPOSITION/EVALUATION BIT — DECISION BIT — RESERVED — REASON CODE

| | R | | | | |

CHANNEL PREFERENCE NUMBER

CC (CHANNEL CONTROL)

| | Channel Rejection Reasoning (Only) | |
|---|---|---|
| 011 | | Not in LSEC table, but with satisfactory spectrum sensing results |
| 100 | | Chanel is in Primary User Appearance (PUA) table [Channel is Rejected] |
| 101 | | Chanel is not in PUA, but has unsatisfactory spectrum quality results [Channel is Rejected] |
| 110 | | Unreachability in the offered channel [This feature is generally used in the PS Disabled mode] [Channel is Rejected] |
| 111 | | Overloaded Channel: CTS Timeout (SIFS + CTStime) or RTS Timeout (1xBeacon Interval) in previous Beacon Interval [Channel is Rejected] |

FIG.6B

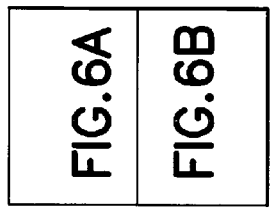

FIG.6

| | Reason Code Bit Pattern |
|---|---|
| | Hint: The MSB bit can be replaced by Decision Bit to save one bit in the CC field |
| 000 | In the current ATIM window [only when PS has been enabled && this is an ATIM or its corresponding Negative non-Null ACK frame] OR during the current Beacon Interval (BI) [only when the STA is not in PS mode && this is an RTS or its corresponding Negative non-Null CTS frame] the initiator of this ATIM/Negative non-Null ACK/RTS/ Negative non-Null CTS frame has been supposed to be a Source STA[4] during the upcoming (Only in PS mode)/ongoing Beacon Interval [By this reasoning, the ATIM/ Negative non-Null ACK/RTS/Negative non-Null CTS recipient is invited to switch to the offered channel to let the Source STA manage all its intended receiver(s) in a same channel] |
| 001 | In the current ATIM window [only when PS has been enabled && this is an ATIM or its corresponding Negative non-Null ACK frame] OR during the current Beacon Interval (BI) [only when the STA is not in PS mode && this is an RTS or its corresponding Negative non-Null CTS frame] the initiator of this ATIM/Negative non-Null ACK/RTS/ Negative non-Null CTS frame has been supposed to be a Destination STA[5] during the upcoming (Only in PS mode)/ongoing Beacon Interval [By this reasoning, the ATIM/ Negative non-Null ACK/RTS/Negative non-Null CTS recipient is invited to switch to the offered channel to let the Destination STA receive all its proposed data frame(s) from different source STAs in a same channel] |
| 010 | Among the Latest Successful Experienced Channels based on LSEC table |

Channel Advertisement/Evaluation Reasoning

FIG.6A

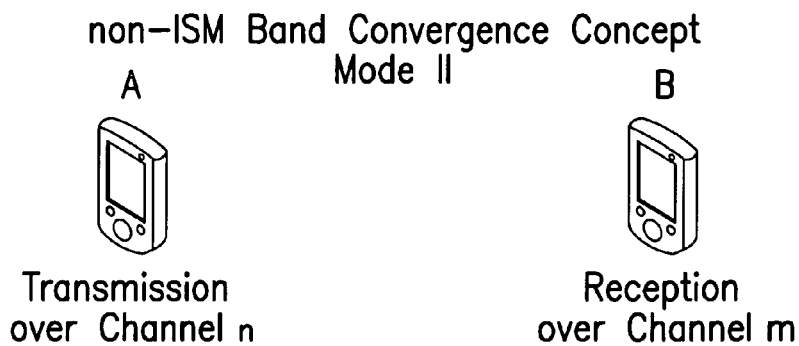

non-ISM Band Convergence Concept
Mode II

A — Transmission over Channel n

B — Reception over Channel m

A has a pending MSDU for B
A invites B to join channel n

A can perform its transmission to B at any time, so it is able to switch to channel m at a later time. In addition, B does not know when it will be able to receive its intended MSDU in channel m to let A know about the exact time it will be able to switch to channel n. B can wait for A while A delivers the pending MSDU; then, A will switch to channel m and send the pending MSDU to B since it knows that B is always waiting for it in channel m B shall reject A's offer (Channel n) and send a Negative non-Null ACK containing channel m offer back to A. A shall accept B's offer if it is not in PUA table and has satisfactory spectrum quality results; A will first send the pending MSDU(s) in channel n to its intended receiver(s), then will switch to channel m and send the pending MSDU to B

FIG. 10B

REASON CODE BIT PATTERN (CHSWIE STATUS = 11)

| FRAME TYPE | | eRTX | eSTX |
|---|---|---|---|
| TEMPORARY SWITCHING | 000 ONE FIELD | CDE's LTRC CHANNEL INFORMATION [ALWAYS MANDATORY. THIS INFORMATION IS BASED ON CSE's KNOWLEDGE ABOUT CDE's LTRC] | CDE's LTRC CHANNEL INFORMATION [WHEN CDE's KNOWLEDGE ABOUT CDE's LTRC CHANNEL INFORMATION IS INCORRECT. THE CORRECT INFORMATION CAN BE OBTAINED VIA THE RECEIVED eRTX IF CSE HAS INCLUDED ITS LTRC CHANNEL INFORMATION IN THE PRECEDING eRTX] |
| | 001 | RESERVED | CDE's LTRC CHANNEL INFORMATION [WHEN CSE HAS NO A PRIORI KNOWLEDGE ABOUT CDE's LTRC, OR WHEN CSE's KNOWLEDGE ABOUT CDE's LTRC CHANNEL INFORMATION IS INCORRECT AND THE ERRONEOUS INFORMATION WAS INCLUDED IN THE PRECEDING eRTX. CDE PUTS ITS LTRC INFORMATION IN AN eCTX AND SENDS IT TO THE CSE OVER THE SHARED ISM CHANNEL] |
| | 010 TWO FIELDS | BOTH CSE AND CDE LTRC CHANNEL INFORMATION [INCLUSION OF CSE's LTRC CHANNEL INFORMATION IS OPTIONAL. THESE INFORMATION ARE BASED ON CSE's KNOWLEDGE] | CSE AND CDE LTRC CHANNEL INFORMATION [WHEN THE KNOWLEDGE OF BOTH CSE AND CDE ABOUT EACH OTHER's LTRC CHANNEL INFORMATION IS INCORRECT. CDE PUTS ITS CORRECT CHANNEL INFORMATION IN THE eCTX. IN ADDITION, IF ITS KNOWLEDGE ABOUT CSE's LTRC CHANNEL INFORMATION IS NOT CORRECT (AS IT MIGHT BE REPORTED IN THE RECEIVED eRTX), IT WILL COPY THE CORRECT INFORMATION FROM THE eRTX AND PASTE IT TO THE eCTX. THE eCTX IS DELIVERED OVER THE SHARED ISM CHANNEL] |
| | 011 | RESERVED | RESERVED |

FIG.23A

REASON CODE BIT PATTERN (CHSWIE STATUS = 00)

| FRAME TYPE | eRTX | eCTX |
|---|---|---|
| 000 | EMPTY CHSWIE [WHEN CSE HAS NO A PRIORI KNOWLEDGE ABOUT CDE's LTRC, IT SENDS AN eRTX WITH EMPTY CHSWIE ADDRESSED TO CDE ON THE SHARED ISM CHANNEL; CDE REPLIES WITH AN eCTX CONTAINING ITS LTRC CHANNEL INFORMATION ON ISM CHANNEL; CSE WILL REPLY BY A SECOND eRTX ON THE ISM CHANNEL CARING CDE's LTRC CHANNEL INFORMATION AND SUBSEQUENT TO A SIFS, IT COMMENCES TRANSMISSION OF DATA ON CDE's LTRC] | EMPTY CHSWIE [WHEN CSE's KNOWLEDGE ABOUT CDE's LTRC CHANNEL INFORMATION IS CORRECT (AND CDE's KNOWLEDGE ABOUT CSE's LTRC CHANNEL INFORMATION IS CORRECT). eRTX HAS BEEN SUCCESSFULLY RECEIVED; CDE SENDS eCTX ON ITS LTRC] |
| [001-111] | RESERVED | RESERVED |

FIG.23B

DISTRIBUTED MULTI-CHANNEL COGNITIVE MAC PROTOCOL

TECHNICAL FIELD

The exemplary and non-limiting embodiments of this invention relate generally to wireless communication systems, methods, devices and computer programs and, more specifically, relate to cognitive radio apparatus and to wireless systems that are operable with cognitive radio apparatus.

BACKGROUND

Opportunistic radio resource management (RRM) schemes have recently received extensive attention in scientific literature and technological fields. One possible area for which opportunistic RRM can be effective is IEEE 802.11-based wireless local area networks (LANs). Existing IEEE 802.11 based systems suffer from inefficient medium access strategies, namely distributed coordination function (DCF), point coordination function (PCF), and their corresponding amendment supporting quality of service (QoS). Furthermore, it is expected that problems will arise due to lack of sufficient frequency opportunities, due at least to the fact that frequency regulations have not efficiently allocated diverse frequency bands. Consequently, cognitive radio, frequency agile, and opportunistic RRM schemes aim to address the aforementioned critical problems in an optimized fashion, resulting in better spectrum utilization and fair radio resource allocation to associated wireless entities.

SUMMARY

In a first non-limiting aspect thereof the exemplary embodiments of this invention provide a method that includes sending a message from a first cognitive radio apparatus to at least one second cognitive radio apparatus, the message being sent over a first communication channel and comprising an advertisement of at least one second communication channel for use in sending data from the first cognitive radio apparatus to the at least one second cognitive radio apparatus. The method further includes receiving a reply from the at least one second cognitive radio apparatus over the first communication channel, where the reply comprises one of an acceptance of one of the at least one second communication channels, a rejection of the at least one second communication channel and an advertisement of at least one third communication channel, or a rejection of the at least one second communication channel without an advertisement of at least one third communication channel. The method further includes transmitting the data from the first cognitive radio apparatus to the at least one second cognitive radio apparatus over an agreed upon one of the second or third channels.

In another non-limiting aspect thereof the exemplary embodiments of this invention provide a computer-readable medium that stores program instructions, the execution of the program instructions resulting in operations that comprise sending a message from a first cognitive radio apparatus to at least one second cognitive radio apparatus, the message being sent over a first communication channel and comprising an advertisement of at least one second communication channel for use in sending data from the first cognitive radio apparatus to the at least one second cognitive radio apparatus; receiving a reply from the at least one second cognitive radio apparatus over the first communication channel, the reply comprising one of an acceptance of one of the at least one second communication channels, a rejection of the at least one second communication channel and an advertisement of at least one third communication channel, or a rejection of the at least one second communication channel without an advertisement of at least one third communication channel; and transmitting the data from the first cognitive radio apparatus to the at least one second cognitive radio apparatus over an agreed upon one of the second or third channels.

In a further non-limiting aspect thereof the exemplary embodiments of this invention provide a first transceiver for communication over a first communication channel; a second frequency agile transceiver for communication over second and third communication channels and a controller configurable to operate the apparatus as a first cognitive radio apparatus and to transmit a message to at least one second cognitive radio apparatus. The message is transmitted over the first communication channel and comprises an advertisement of at least one second communication channel for use in sending data from the first cognitive radio apparatus to the at least one second cognitive radio apparatus. The controller is further configurable to receive a reply from the at least one second cognitive radio apparatus over the first communication channel, the reply comprising one of an acceptance of one of the at least one second communication channels, a rejection of the at least one second communication channel and an advertisement of at least one third communication channel, or a rejection of the at least one second communication channel without an advertisement of at least one third communication channel. The control unit is further configurable to transmit the data to the at least one second cognitive radio apparatus over an agreed upon one of the second or third channels.

BRIEF DESCRIPTION OF THE DRAWINGS

In the attached Drawing Figures:

FIG. 2A shows the current channel numbering scheme of IEEE 802.11a, FIG. 2B shows the case of the IEEE 802.11b and IEEE 802.11g, 2.4 GHz band, while FIG. 2C shows the IEEE 802.11y 3 GHz band.

FIG. 3 shows a position of a new Channel Information (CI) field in control frames.

FIG. 4 shows a generic format of the Channel Information (CI) field.

FIG. 5 shows a generic sub-field format of the Channel Control (CC) field shown in FIG. 4.

FIG. 6 shows a Reason Code Bit Pattern that pertains to the Reason Code sub-field of FIG. 5.

FIGS. 10A-10D describe four modes I, II, III and IV, respectively, that are related to a non-ISM band convergence concept.

FIG. 20A shows the eRTX frame format in a cognitive common channel framework (CCCF), while

FIGS. 23A and 23B are tables showing a Reason Code Bit Pattern (CHSWIE Status=11) and a Reason Code Bit Pattern (CHSWIE Status=00).

DETAILED DESCRIPTION

The exemplary embodiments of this invention provide a novel distributed frequency agile medium access control (MAC) protocol suitable for use in next generation wireless LANs, which furthermore have complete backwards compatibility with the legacy 802.11 systems. The enhanced MAC protocol is capable of multi-channel deployment of available frequency bands to coordinate concurrent multiple data transmissions. Previous multi-channel MAC protocols for wireless LANs that have been proposed in the literature generally make unreasonable assumptions, while being unable to address technical problems concerning channel utilization and simultaneous information transmissions. In contrast, the exemplary embodiments of this invention provide an optimized MAC protocol, which is capable of addressing a variety of problems inherent in multi-channel systems, while being aware of primary users in different frequency bands using intelligent environmental information management entities.

The use of the exemplary embodiments of this invention also improve the channel utilization and capacity using the concept of cognitive radio and also reduce access delay due to more intelligent decision making procedures used for link layer connection establishment. In addition, a concept of welfare enhancement (WE) is provided, that results in higher channel utilization and system throughput. Future extensions to the disclosed enhanced protocols may be simply incorporated, without requiring major protocol core code modification.

New fields for control/management frames are provided in such a way that legacy STAs are able to understand legacy fields while discarding the newly added fields (and sub-fields) . Legacy STAs are able to receive and decode all frames generated by cognitive "smart" STAs except for those fields dedicated and particularly designed for cognitive STAs. Thus, both legacy and new systems are able to work with each other. Legacy STAs are able to join cognitive BSSs and vice versa.

Figure 1A:
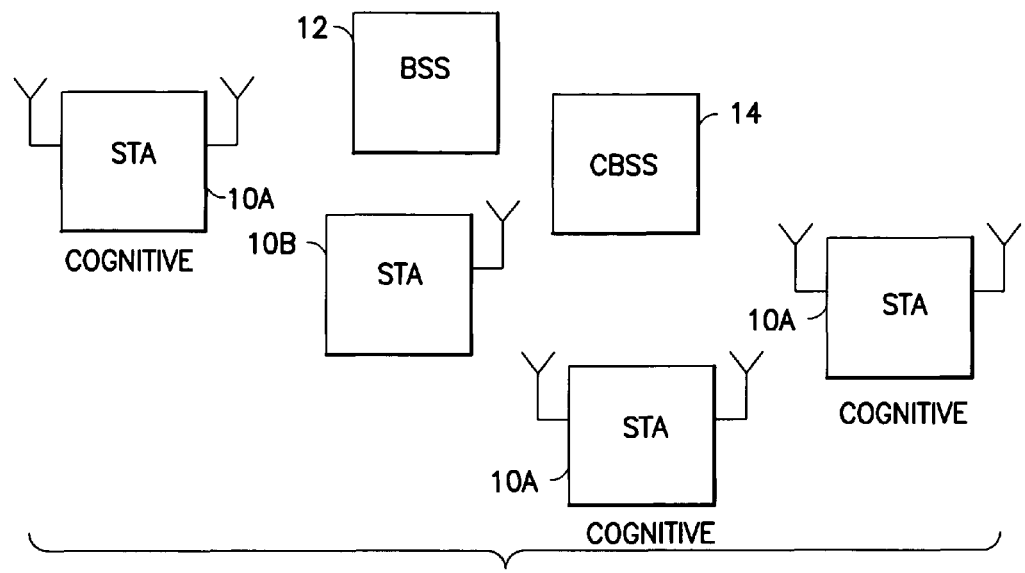
FIG. 1A shows a high level block diagram of a cognitive radio system having a plurality of STAs and a BSS.

FIG. 1A shows a high level block diagram of a cognitive radio system having a plurality of stations (STAs) 10, a basis service set (BSS) 12 and a cognitive basis service set (CBSS) 14. Certain of the STAs 10 may be cognitive STAs 10A, and others may be legacy (non-cognitive) STAs 10B.

Figure 1B:
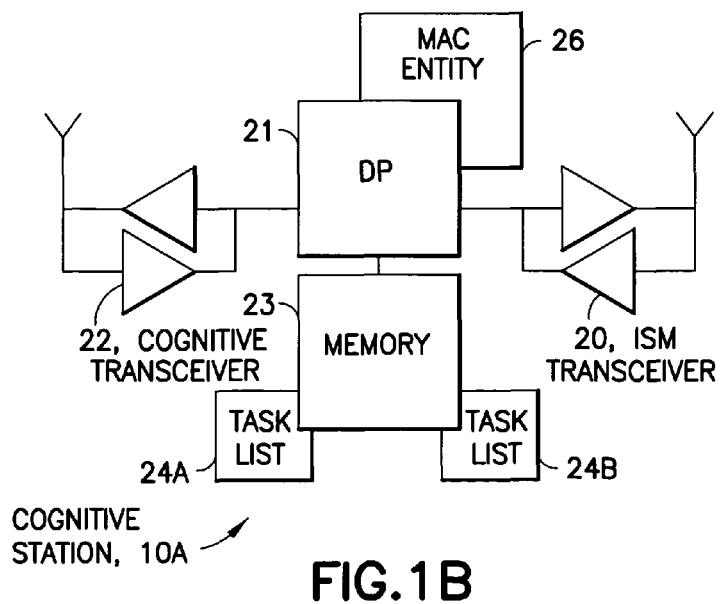
FIG. 1B shows a simplified block diagram of a two-transceiver STA.

FIG. 1B shows a simplified block diagram of a cognitive STA 10A. In this example the cognitive STA 10A includes two wireless transceivers, specifically an ISM band (industrial, scientific, medical band) transceiver 20 and a cognitive transceiver 22. The STA 10A also includes a controller, such as at least one data processor (DP) 21 that operates in accordance with a stored program in a memory 23. Execution of the program instructions results in the implementation of a MAC entity 26 that is constructed and operated in accordance with the exemplary embodiments of this invention. The cognitive STA 10A also includes transceiver associated task lists 24A, 24B (which may be collectively referred to as a task list 24), and other components and data structures as described in detail below.

Legacy IEEE 802.11 based wireless networks are currently capable of operation in certain dedicated ISM channels. As such, a need exists to enable next generation wireless LANs to operate in any frequency band, while being able to work and interact with existing legacy 802.11 networks. For example, assume a case of an established legacy 802.11 basic service set (BSS) 12 comprising associated 802.11 stations (STAs) 10 working/collaborating with another cognitive basic service set (CBSS) 14 which is able to provide additional network connectivity and packet forwarding to the legacy system. Further in this regard providing additional network connectivity and packet forwarding to the legacy BSS 12 mandates that the CBSS 14 operate at the same frequency band and ISM channel as the existing legacy 802.11 system. This fact implies that legacy BSS 12 and CBSS 14 may be better combined with one another to produce a global widespread 802.11 BSS. As a result, and in the same ISM channel, there is provided a BSS 12 to which both legacy and cognitive STAs 10 are associated and cooperating with each other in different ways, e.g., packet forwarding, frame buffering, etc.

On the other hand, it is desirable to not congest the shared ISM channel with those frames exchanged by cognitive STAs 10A. This becomes possible when cognitive STAs 10A utilize non-ISM data channels other than the shared channel, which is utilized particularly by legacy 802.11 STAs 10. As a result, one may conclude that it is better for the shared ISM channel to be utilized predominantly by legacy STAs 10B for management, control, and data exchange purposes, while the shared ISM channel is used only for management and control purposes for cognitive STAs 10A.

According to the foregoing, since both legacy and cognitive STAs 10 can be associated to a common BSS 12 while using the same ISM channel for management/control purposes, consequently they are able to cooperate in control and management functions. Thus, it can be argued that from management/control point of view, there is no difference between a legacy 802.11 STA 10B and a cognitive 802.11 STA 10A. On the other hand, and as pointed out, cognitive STAs 10A should preferably not use the shared ISM channel for their data communication. As a result, cognitive STAs 10A are strongly mandated to switch to another channel (referred to herein as a non-ISM channel) in order to perform their information exchange. However, a problem that arises is how the receiving STA 10 knows to which channel it should switch to enable the source STA 10 to transmit MSDU(s). In addition, a related problem is how the source STA 10 recognizes in which channel its intended receiver is waiting to receive its targeted MSDU(s).

The cognitive destination STA 10A should be able to determine and switch to the intended channel, if prior to channel switching both source and destination STAs 10 agreed to a channel to be used during their data communication. In other words, the source and destination STAs 10 should preferably negotiate concerning the channel to be utilized for the upcoming communication beforehand and reach a mutual agreement. Hence, the shared ISM channel is used to exchange control information in the form of RTS, CTS, ATIM, ACK, etc., to let both involved parties advertise their desired channel(s). Upon reaching mutual agreement, the parties (STAs 10) switch to the agreed channel simultaneously and start their data communication. As a result, by the use of this approach there is no need for a separate dedicated control channel for management/control purposes.

It is thus preferred that both legacy and cognitive STAs 10A share a common ISM channel for both management and control purposes. Technically, there is no difference between BSSs 12 established by legacy STAs 10B and the BSSs 12 initially created by cognitive STAs 10A. In addition, legacy STAs 10B should be able to join BSSs 12 formerly established by cognitive STAs 10A, and vice versa. In any situation, and whether the BSSs 12 was initiated either by a cognitive STA 10A or a legacy STA 10B, cognitive radios are the guests to the ISM band. As a result, they provide additional services to the legacy STAs 10B which are licensed users in the band. The basic services offered by cognitive STAs 10A may include, but are not limited to, network connectivity and packet forwarding in layer three. On the other hand, it is preferred that cognitive STAs 10A are only allowed to use common ISM channel to establish their connection and reach agreement concerning the channel to be utilized for their data communication.

Information regarding primary user appearance and related issues are handled using an extended version of the dynamic frequency selection (DFS) scheme proposed in IEEE 802.11h. By combining the existing DFS scheme with a number of new concepts, a novel extension to DFS is provided that is capable of addressing problems related to primary user appearance in non-ISM channels.

The exemplary embodiments of this invention also provide novel approaches to preventing undesired congestion in non-ISM channels. Also, by proposing another class of concepts, channel aggregation/bursting in multi-channel scenarios becomes possible, resulting in an enhancement in channel utilization.

In the ensuing description channel identification approaches are described that are suitable for use in broadband cognitive wireless local area networks, followed by a description of an enhanced medium access control protocol for cognitive wireless LANs.

Channel Identification Approaches

When two cognitive STAs 10A desire to communicate with one another they should reach a reciprocal conformation concerning the non-ISM channel to be utilized during their data communication. As explained above the common ISM channel, in which the BSS 12 has been formed, is particularly used for connection establishment and control frame exchange. During this phase, both source and destination STAs 10 should negotiate regarding their desired non-ISM channels to be occupied for the whole data exchange. However, the way in which STAs 10 advertise their intended channels is preferably dealt with explicitly. While cognitive STAs 10A may be mandated to use common approaches when advertising desired channels, this can be done in several ways.

One simple way to advertise intended channels is to mention their channel identifiers (CIs) within exchanged control frames (e.g., RTS, CTS, etc.). However, there is no globally unique and wholly accepted channel-numbering scheme. For example, in IEEE 802.11a the current channel numbering scheme (Channel Identifiers) are as shown in FIG. 2A, while FIG. 2B shows the channel numbering case of IEEE 802.11b and IEEE 802.11 g, 2.4 GHz band, while FIG. 2C shows the channel numbering scheme of the IEEE 802.11y 3 GHz band.

As should be evident, there is no global agreement as to how different center frequencies are numbered and, as a result, inclusion of the center frequency of an advertised channel is preferred as well, and the inclusion of a "channel identifier" for preferred non-ISM channel(s) is not necessary.

In IEEE 802.11y, in addition to channel center frequency, the corresponding regulatory class is also defined. Basically, the regulatory class determines several physical layer transmission specifications, including channel starting frequency, channel spacing, channel set, transmission power limit, emissions limits set, etc. As a result, in addition to center frequency, it would be desirable to include the regulatory class when advertising intended channel(s). In addition, the inclusion of the regulatory class when advertising intended channel(s) is preferable to only mentioning the targeted channel bandwidth. Further in this regard, in the future not only conventional channel bandwidths, e.g., 5, 10, and 20 MHz, will be available, but also other channel bandwidths may be allowed by regulatory authorities. Therefore, a channel bandwidth field may also be included within control frames during the channel negotiation phase. As a result, in addition to the channel center frequency the inclusion of both a regulatory class field and a channel bandwidth field are desirable.

Primary User Detection

There is no major problem presented by Primary User Appearance in the common ISM channel shared by legacy and cognitive STAs 10A. This due at least to the fact that IEEE 802.11-based systems are licensed in these frequency bands, and as a result, spectrum sensing for primary user detection in ISM bands is not mandatory, except for the case of IEEE 802.11 a (which should be aware of radar signals). Therefore, in a BSS 12 comprising both legacy and cognitive STAs 10A, if the shared ISM channel is in the 5 GHz band, all associated STAs 10, including legacy and cognitive STAs 10A, should cooperate in the dynamic frequency selection (DFS) procedure. On the other hand, for all discovered non-ISM frequency opportunities that may be utilized by cognitive STAs 10A it is preferred that there be regular (and possibly randomized) spectrum sensing activities to assure very limited interference to primary users of this spectrum. Those non-ISM channels in which the primary user is detected are preferably recorded accordingly by all involving STAs 10. In addition, it is desirable that there be a set of counters for every channel in which primary user has been detected to prevent the MAC entity 26 from acquiring forbidden channels. The manner by which cognitive STAs 10A cooperate in spectrum sensing may be based on an extended version of the IEEE 802.11h DFS scheme. The considered modulation scheme to be implemented in the physical layer is based on orthogonal frequency division multiplexing (OFDM). As a result, any non-decodable signaling in non-ISM channels may be considered as a Primary User Appearance indication. Basically, if clear channel assessment (CCA), which is a combination of carrier sensing (CS) and energy detection (ED), detects any type of known Clause 19 synchronization (sync) symbols, including Barker code sync and OFDM sync symbols, it can be concluded that the detected carrier is due to a legacy/cognitive IEEE 802.11 STA 10; otherwise, it may be concluded that the detected carrier is due to a primary user and subsequently the occupied non-ISM channel is released. In general, the cognitive STAs 10A perform spectrum sensing in at least two different ways: a randomized approach and a regular approach.

Frame Exchange Structure for the Cognitive MAC

In order to advertise a certain channel to be used during data communication between a pair of STAs 10 the MAC entity 26, depending on the current situation, may send an ATIM/RTS/Negative non-Null CTS/Negative non-Null ACK frame to its intended STA MAC entity 26.

More specifically, the Announcement Traffic Indication Message (ATIM) is used to inform the recipient about any pending MSDU addressed to it during a so-called ATIM window just after Beacon frame transmission. Upon reception of an ATIM, the recipient responds with an ACK frame if it agrees to receive the buffered MSDU(s). On the other hand, if the intended recipient has left the IBSS, there will be no respond and as a result, the buffered MSDU(s), after expiration of buffering timeout, are discarded. Basically, ATIM/ACK is used when a power saving (PS) mode is enabled in an IBSS (or BSS). Here, in the cognitive MAC protocol of interest to these exemplary embodiments, an ATIM frame may have the following frame formats as its subsequent response:

regular ACK (when the recipient is a legacy STA, it replies the received ATIM frame using a conventional ACK frame, as in IEEE 802.11), cognitive Positive ACK (when the recipient is a cognitive STA 10A, and if it agrees with at least one of the offered/advertised channels, it responds with the Positive ACK), cognitive Negative Null ACK (when the recipient is a cognitive STA, and if the recipient disagrees with all offered/advertised channels and has no suggestion to offer, it responds with the Negative Null ACK), and cognitive Negative non-Null ACK (when the recipient is a cognitive STA, and if it disagrees with all offered/advertised channels and has a better suggestion(s) to offer, it responds with the Negative Null ACK that includes its suggestion(s)).

In the latter case the source STA 10 may respond using the Positive or the Negative Null ACK.

The Ready-To-Send (RTS) is used to inform the recipient about any pending MSDU addressed to it. In the cognitive MAC entity 26 protocol in accordance with these exemplary embodiments an RTS frame can have the following frame formats as its subsequent response:

regular CTS (when the recipient is a legacy STA 10B, it replies to the received RTS frame using a conventional ACK frame, as in IEEE 802.11), cognitive Positive ACK (when the recipient is a cognitive STA 10A, and if it agrees with at least one of the offered/advertised channels, it responds with a Positive CTS), cognitive Negative Null CTS (when the recipient is a cognitive STA 10A, and if it disagrees with all offered/advertised channels while having no channel suggestion of its own to offer, it responds with a Negative Null CTS), or cognitive Negative non-Null CTS (when the recipient is a cognitive STA 10A, and if it disagrees with all offered/advertised channels while having a (better) channel suggestion(s) to offer, it responds with a Negative non-Null CTS, and places its suggestion(s) within the Negative non-Null CTS). In this case, the source STA may respond using the Positive or Negative Null ACK).

After performing the regular DCF access procedure (for the case of ATIM and RTS) the source STA 10 may transmit an ATIM/RTS frame to the intended destination STA. The size of the transmitted ATIM/RTS frame is preferably considered to be variable since it is not clear how many channels are going to be advertised to the intended receiver. The transmitted ATIM/RTS has the following fields: Frame Control (2 Bytes), Duration/ID (2 Bytes), Receiver Address (6 Bytes), Transmitter Address (6 Bytes), BSSID (Basic Service Set ID) (6 Bytes), Sequence Control (2 Bytes) (Only for ATIM), Frame Check Sequence (FCS) (4 Bytes), and finally a variable size Channel Information (CI) field. FIG. 3 shows the position of the Channel Information (CI) field in control frames, while FIG. 4 shows a generic Format of Channel Information (CI) Field.

In FIG. 4 the Center Frequency (CF) field (2 Bytes) is specified in MHz, the Regulatory Class (RC) field (1 Byte) is considered mandatory; and if not used is loaded with some default value, such as 00 hex; and the Channel Mask field (in particular circumstances Bandwidth (BW)) (1 Byte) which, if the RC field is not used, is set to the recommended bandwidth; 5, 10, or 20 MHz (e.g. 5 MHz is represented by 05H or 00000101B). Note that other values may be used depending on the allowed channel bandwidths. Note also that BW information may be included in the RC field, as most regulatory classes define the bandwidth of the intended channel, in addition to allowed EIRP, etc. Therefore, when the RC field is used, it explicitly determines the bandwidth, EIRP (e.g. Transmit Power Limit in mW/MHz), etc. and as a result, BW field may not be needed. This implies that the RC is a mandatory field while BW is non-compulsory. On the other hand, when the RC field is not used (loaded by 00H), then BW field is used in order to determine the bandwidth of a negotiated data channel.

The Channel Control (CC) (1 Byte) field in FIG. 4 has the following sub-fields (reference is made to FIG. 5).

1) A Channel Preference Number (CPN) (2 Bits) which is used to number offered channels: 01, 10, or 11 (00 may be reserved and is not used). Upon returning the evaluation results of an offered channel, the CPN sub-field should have the same number as it had when the channel was being advertised.

2) A Proposition/Evaluation Bit (1 Bit) which is used to determine whether the channel with a preference number included in the CPN sub-field is a channel being advertised for the first time, or a channel which has been previously offered and subsequently evaluated by the other MAC entity 26, where Proposition=0 (the channel is being advertised), Evaluation=1 (the channel evaluation results are being disclosed).
3) A Decision Bit (1 Bit) which is used when the Proposition/Evaluation Bit is 1. In this case the Decision Bit determines whether the offered channel has been accepted or rejected: Accept=1, Reject=0 (when Proposition/Evaluation=0 this bit is simply ignored, and by default may be set to 0).
4) Reserved (1 Bit)
5) A Reason Code (3 Bits) which when offering a channel (Proposition/Evaluation Bit=0) specifies the reason for which the channel is being advertised, as indicated in FIG. 6 (only 000, 001, 010, 011); on the other hand, when Proposition/Evaluation Bit=1 this sub-field specifies the reason for which the channel has been accepted (only 010, 011)/rejected (only 000, 001, 100, 101, 110, 111). Note that the Decision Bit may be combined with the Reason Code according to the aforementioned definitions.

Note that in an ATIM/RTS (traffic initiator) control frame, there is no need to determine the duration of intended channel deployment. Upon any conformity, both source and destination STAs 10 switch to the agreed channel and, consequently, they exchange regular RTS/CTS to reserve the channel for a particular time duration.

Also, the following points should be noted. First, only one of the advertised channels might be selected at any step of the channel negotiation phase. Second, the source (and destination) STA 10 is preferably limited in the number of advertised channels. As an example, by default the maximum number of advertised channels may be three (3). If the source STA 10 has more than three candidate channels it selects the best three. On the other hand, if the source STA 10 has less than three channels to advertise it may present the information of only the available channels.

Figure 7:
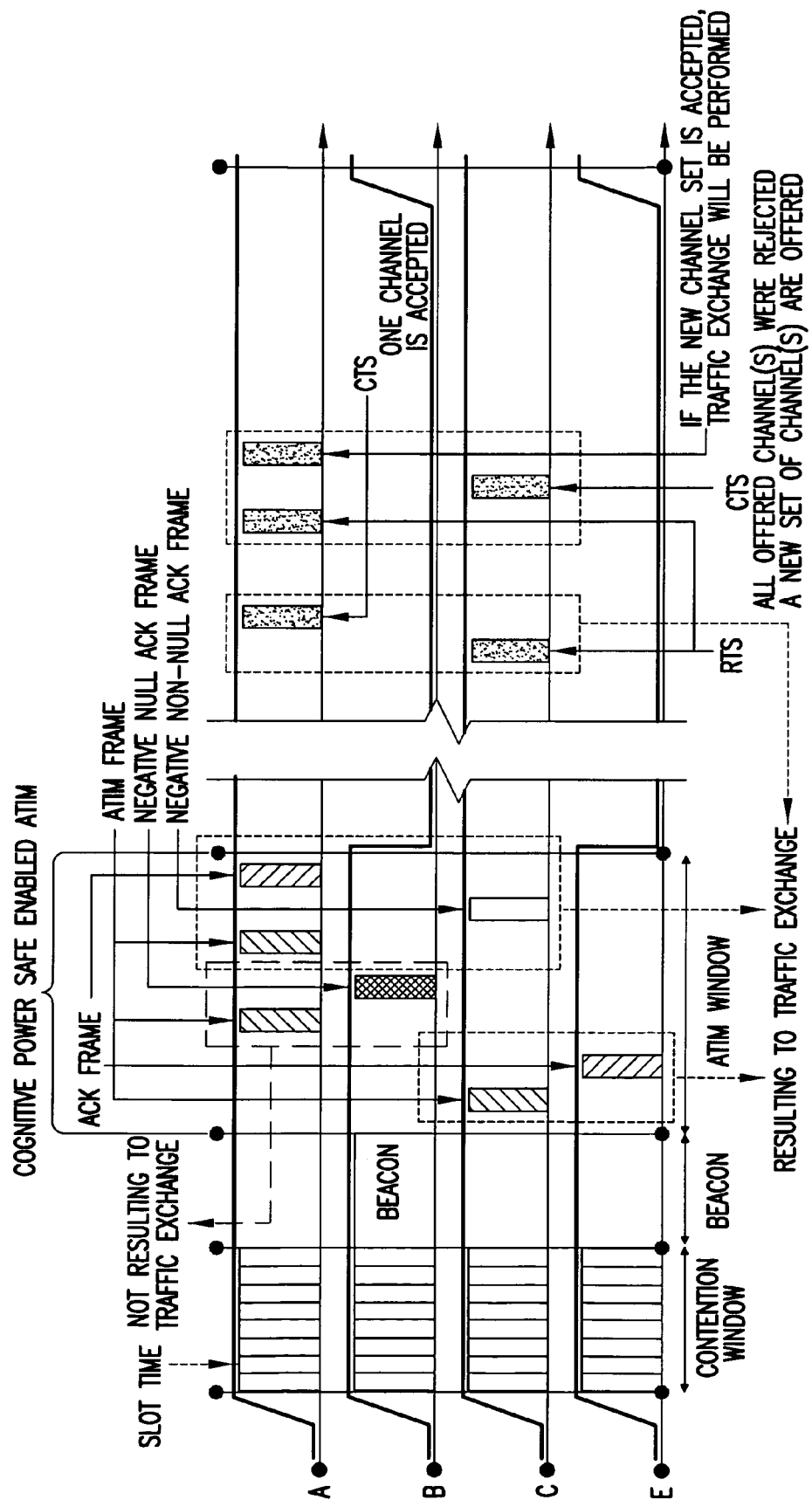
FIG. 7 illustrates possible frame exchange scenarios for PS mode enabled and PS mode disabled cases.

Referring generally to FIG. 7, when a cognitive STA 10A wants to invite its intended destination STA to establish a connection, it uses an ATIM or a RTS frame and puts its desired non-ISM channel(s) within the CI field (see FIGS. 3-5). Note that due to a desire to maintain backwards compatibility it is preferred to use legacy RTS, CTS, ATIM, and ACK frames to enable legacy STAs 10B to receive and recognize the captured frames. If the destination STA 10 agrees with one of the advertised channels, it will respond with a Positive ACK or Positive CTS frame (or simply with an ACK/CTS frame with an extra CI field as its payload). On the other hand, when the destination STA 10 disagrees with the offered channels, and has its own suggestions, it responds with a Negative non-Null ACK or Negative non-Null CTS. When the receiver (the destination STA 10 in this case) disagrees with the advertised channels, and has no channels at hand to offer, it responds with a Negative Null ACK or Negative Null CTS. In this case, no connection with the intended STA 10 is established and, later, the source STA 10 may retry with another possible channel or channels. The manner in which STAs 10 offer the channel(s) and accept/reject particular channels is based on the following rules.

A. When a certain channel is being advertised, the promoting STA 10 assigns a preference number to the channel and places it in the Channel Preference Number (CPN) field (see FIG. 5). When the recipient STA 10 evaluates the channel(s) and reports the evaluation results, it uses the same number as the channel(s) had when advertised.

B. When a channel is being advertised, the corresponding Proposition/Evaluation Bit is set to 0 (Proposition), and when its evaluation result is being reported the Proposition/Evaluation Bit is set to 1 (Evaluation). For a candidate channel being advertised, the Decision Bit is simply ignored (and may be set to 0). In addition, when a channel is being offered, its physical specifications (e.g., its regulatory class, center frequency, bandwidth, etc.) are indicated in the Channel Information (CI) field. The CC field of a particular channel which is being advertised is followed immediately by its corresponding CI field. Accordingly, the MAC entity 26 checks the Proposition/Evaluation Bit and if it is 0 (Proposition), it expects a CI field to follow the CC field. On the other hand, in a CC field being analyzed, when the Proposition/Evaluation Bit is set to 1, the MAC entity 26 expects to find the evaluation report of the channel with the preference number indicated in the CPN field in the following Decision Bit. If the Decision Bit is 0, the MAC entity 26 can assume that the channel was rejected by the recipient, and if it is 1, then the MAC entity 26 may conclude that the channel has been accepted. In the case of channel evaluation reporting, the MAC entity 26 does not expect a CI field to follow the CC field being processed. By the use of this procedure and rule set there is no need to include additional header(s) to express the number of advertised/reported channels and so forth.

Figure 8:
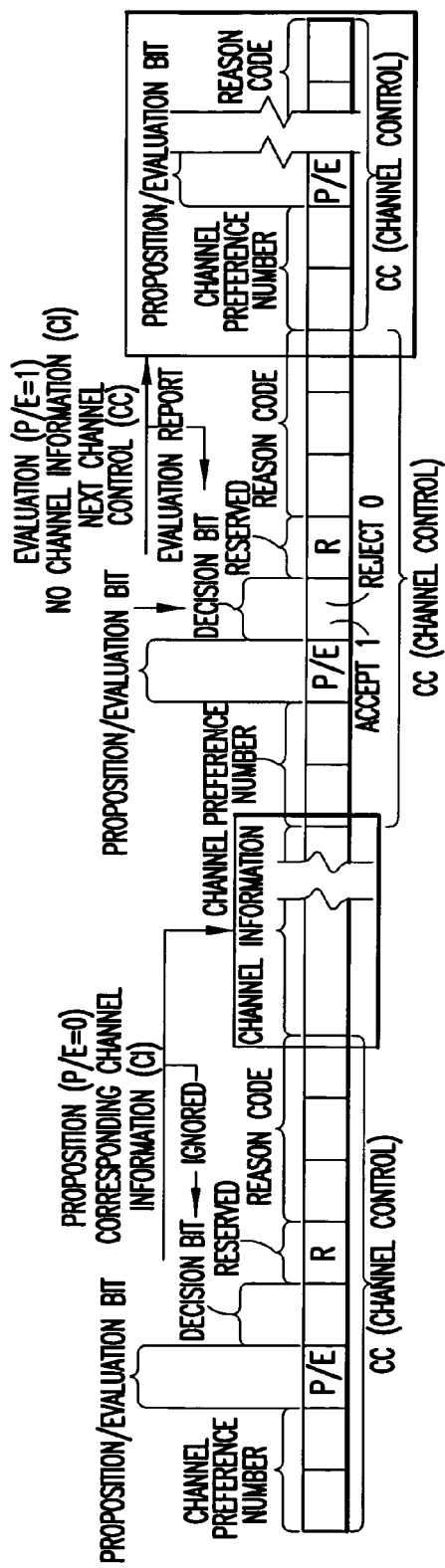
FIG. 8 illustrates Channel Control (CC) inclusion within the exchanged control frames.

FIG. 8 illustrates Channel Control (CC) inclusion within the exchanged control frames.

Upon transmission of an ATIM/RTS frame (in cognitive format), the intended receiver analyzes the included fields to deduce all required information. Here, at least two distinct scenarios are possible.

First, the receiver (intended destination STA) is not a cognitive radio. In this case, it fetches the related information by the use of only known fields and ignores the remaining field(s) without any further processing. The receiver responds to the received ATIM frame with a regular ACK. Upon reception of the ACK frame, the source STA concludes that the intended receiver is a non-cognitive STA and, as a result, it uses the conventional ISM band, in which current IBSS has been already established, in order to exchange pending MSDU(s) with the receiver.

In a second scenario the receiver is a cognitive radio. In this case there are multiple possible scenarios that can occur.
A) When the destination STA agrees with at least one of the offered channels, it informs the source STA of its agreement to deploy the intended channel. Note that the receiver chooses only one of the offered channels based on its own localized decision making procedures, which may be based upon an advanced channel feature measurement or other performance criteria. The protocol by which the receiver calculates the channel performance metrics can be any suitable protocol, and is assumed to be based upon PHY and MAC cooperation. The receiver prepares an ACK/CTS frame to convey its agreement about one of the advertised channels. The appended CC field within the ACK/CTS frame contains a CPN field loaded by the preference number of the channel that was present when it was being advertised (01, 10, or 11, where 00 may be reserved and not used), Proposition/Evaluation Bit set to 1 (Evaluation), Decision Bit set to 1 (Accepted), Reserved Bit, and Reason Code set to one of the two possibilities, 010 or 011.
B) When the receiver disagrees with the offered channels, and has no suggestion regarding the channel deployment, it sends the Negative Null ACK/Negative Null CTS frame back to the source STA. The appended CC field within the Negative Null ACK/Negative Null CTS frame contains the CPN field loaded by the preference number of the channel that was present when it was being advertised (01, 10, or 11, where 00 may be reserved and not used), Proposition/Evaluation Bit set to 1 (Evaluation), Decision Bit set to 0

(Rejected), Reserved Bit, and Reason Code set to one of four possibilities, 100, 101, 110, or 111.

C) When the receiver disagrees with the offered channels, and has at least one other suggestion, it advertises its own channels just as the source STA advertised its channels. In this case then the receiver sends back a Negative non-Null ACK/Negative non-Null CTS frame with the following fields: a set of CC fields corresponding to the rejected channel(s), and a set of CC fields related to the channels being advertised accompanied with their CI fields. For the first set, the Proposition/Evaluation Bit is set to 1 while for the second set this bit is set to 0. The MAC entity 26, by the use of this bit, is able to readily determine whether any CI field occurs immediately following a CC field. Also, for the rejected channels, the Reason Code may be set to one of six possibilities, 000, 001, 100, 101, 110, or 111. Upon reception of the Negative non-Null ACK/Negative non-Null CTS frame, at least two different operational modes can ensue.

In a first mode, if the source STA disagrees with the offered channels, it will send a Negative Null ACK frame with a sufficient number of CC field(s) equivalent to the channels advertised by the destination STA. In this case all Proposition/Evaluation Bits in all aforementioned fields should be 1 (Evaluation), while the Decision Bits are set to 0 (Rejected). Due to the fact that all Proposition/Evaluation Bits are 1, there will be no CI field.(since nothing is being advertised).

In a second mode, if the source STA agrees with at least one of the offered channels, it will inform the destination STA of its agreement to deploy the intended channel. In this case the source STA prepares an ACK frame to convey its agreement concerning one of the advertised channels. The appended fields are the CC fields corresponding to the rejected channels, with Reason Code sub-fields set appropriately, and a single CC field that carries a CPN of the accepted channel.

A discussion is now made of MAC entity 26 basic functionality.

It is first noted that there are numerous operational cases that may occur during the deployment of a cognitive wireless network that tend to make the MAC entity 26 more complex than a legacy/regular single channel MAC protocol (e.g., IEEE 802.11 MAC).

In general, designing a MAC algorithm for a cognitive multi-channel system requires taking into account how many transceiver(s) are available for the designer at the PHY level. In addition, different scenarios exist in the PS and non-PS modes which should be investigated in detail and addressed separately. One can categorize different cases according to diverse differentiation criteria. The number of available transceiver(s) is one of the key classification criterions. In addition, as mentioned above being in PS mode (PS enabled) or non-PS mode (PS disabled) is another complicating factor. Here, and for simplicity, it is preferred to categorize the possible scenarios according to the number of available transceivers in the physical layer. First there is considered the case where the cognitive STA is equipped with two independent transceivers, followed by the more complex case in which the PHY has only one transceiver available for "over the air" activities.

Dual-Transceiver Mode-PS Mode Disabled

In this case the cognitive STAs have two independent transceivers when associated with a PS disabled Basic Service Set (BSS). In this case a general rule is that each STA establishes one of its transceivers on the shared common ISM channel in which the BSS has been established. As a result, this feature aids the cognitive STAs to more efficiently perform channel sensing processes. On the other hand, in dual-transceiver systems, the amount of power consumption is greater than in a single-transceiver embodiment.

Beacon frames are assumed to be always transmitted by the transceiver tuned on the common ISM channel. In addition, managing the RTS/CTS exchange is performed using this transceiver as well. For simplicity, one may refer to the transceiver tuned to the ISM common channel as the ISM transceiver 20, while the other (second) transceiver, which may be at any frequency band to coordinate information exchange between cognitive STAs, may be referred to as the cognitive transceiver 22 (see FIG. 1B).

The ISM transceiver 20 is responsible for RTS/CTS frames exchange, and the coordination between cognitive and non-cognitive STAs. When for the first time a tagged cognitive STA ( a "tagged" cognitive STA is assumed herein to be a considered STA to which the current focus has been concentrated) desires to establish a connection with another associated STA in the same BSS, it sends an RTS frame (comprising the extra fields introduced previously) to its intended destination. When the received CTS frame corresponding to the delivered RTS implies that the intended receiver is a non-cognitive legacy STA, the data exchange is performed in the ISM band. In this case, as there is no possibility for establishing a further connection to (with) the tagged STA, for power efficiency reasons the cognitive transceiver 22 may be turned off (if not currently involved in any spectrum sensing task). In addition, the above case is valid when the tagged STA is receiving MSDU(s) from another non-cognitive STA in the common ISM band. Here, again, establishing a connection to (with) the tagged STA (another STA) is not possible since the ISM channel has been already utilized. On the other hand, when the received CTS frame implies that the intended receiver is a cognitive STA, the two STAs (i.e., the cognitive source STA and the cognitive destination STA) can reach a reciprocal agreement concerning the data channel to be used for their information exchange. In this case the cognitive transceiver 22 is tuned to the agreed upon channel to commence the exchange of RTS/CTS frames.

Assume a case where the tagged cognitive STA is performing data communication with another cognitive STA in a non-ISM channel using the cognitive transceiver 22. Now also assume the case where another STA wants to establish a connection with the tagged cognitive STA. In this case, when the calling STA is a non-cognitive STA, the consequent data communication needs to be done over the shared ISM channel, and there will be no possibility for other STAs to establish a connection with the tagged STA. On the other hand, when the calling STA is a cognitive STA, the concept of non-ISM Band Convergence applies. In this concept, when a dual-transceiver cognitive STA receives a data exchange request in the form of an RTS frame from another cognitive STA, while at the same time being involved with another communication in a non-ISM channel, it is recommended to invite the calling STA to also join the utilized non-ISM channel being utilized for the ongoing data communication. In such cases the Reason Code is used to convey the tagged STAs intent to the calling cognitive STA. By using the aforementioned code, the calling STA is enabled to determine why the called (and tagged STA in the above example) is inviting it to switch to a certain channel. Generally in this scenario, the calling STA advertises up to three channels that may not be the same as those the tagged STAs is interested in. For this reason the tagged STA is allowed to reject the offered up to three advertised channels and to advertise another channel instead. To encourage/force the calling STA to select the tagged STAs desired channel it may include only its intended channel when it sends a Negative non-Null CTS back to the calling STA.

As another use case, consider a cognitive STA that is communicating with one of its cognitive counterparts in a non-ISM channel. In addition, consider the scenario when the tagged STA also wishes to establish an additional connection with another STA, in parallel with the ongoing communication. The tagged STA uses the ISM channel to send an invitation message in the form of an RTS frame to the intended destination STA. When the called STA is not a cognitive STA, the intended data exchange is performed in the ISM channel. On the other hand, when the called STA is a cognitive STA, the communication may be accomplished using any known non-ISM channel. As above, the concept of non-ISM Band Convergence can be used, where the tagged STA places its desired (already deployed) non-ISM channel in the RTS frame to invite the called STA to join. To encourage/force the called STA to choose the intended channel, tagged STA may advertise only the aforementioned channel in order to limit the available options of the called STA. In addition, the Reason Code is set to convey the reasoning for the advertisement of the non-ISM channel. By reception of the RTS the called STA can determine why the tagged STA is promoting this particular non-ISM channel.

Note that for both aforesaid cases, it is possible for the third party (i.e., the called STA) to reject the tagged STA's offer using the Negative Null control frames (in the first case, using Negative Null ACK and in the second case, using Negative Null/non-Null CTS). In this event the third party should disclose its reasoning regarding the rejection of the offer of the tagged STA. Using cognitive reasoning, the STAs are able to not only negotiate with one another concerning channel deployment, but may also obtain valuable information concerning their surrounding environment.

Dual-Transceiver Mode-PS Mode Enabled

In this scenario the same definitions regarding the ISM and cognitive transceivers 20, 22 are applicable, while assuming that the cognitive STA has two independent transceivers when associated to a PS-enabled BSS. Basically, in a PS mode enabled network, STAs contend with each other during ATIM window to inform their intended receivers about any pending MSDUs.

In a PS mode enabled BSS, during each ATIM window, those STAs that have pending MSDU(s) for associated STAs send out ATIM frames to inform targeted STAs of the presence of buffered MSDU(s) destined for them. Subsequently, during the remaining time portion of the Beacon Interval the buffered MSDU(s) are exchanged.

When the STA has pending MSDU(s) for more than one STA in the same BSS, it is allowed to contend for the shared wireless medium as many times as it intends to send ATIM frames to inform targeted STAs about the existence of buffered MSDU(s); hence, if the STA is able to contact all targeted STAs in a single ATIM window, there will be a list of all pending tasks to be accomplished during the remaining time of the Beacon Interval. In other words, cognitive STAs are equipped by a "Task List" 24 in which successive tasks (i.e., acting as either source or destination STA in different channels) are listed according to their appearance order and, more importantly, their priority relative to each other. In this context the words and phrase "Task", "Duty" and "Upcoming Job" may be used to convey the same meaning.

It can be noted that for the dual transceiver mode, each transceiver 20, 22 may have its own associated Task List 24A, 24B, meaning that the cognitive transceiver 22 has a dedicated Task List 24A used only for the duties related to non-ISM channels, while the ISM transceiver 20 has a dedicated Task List 24B for those duties that require use of the shared ISM channel. For the single transceiver mode all ISM and non-ISM related tasks (i.e., cognitive and non-cognitive tasks) are maintained in the same (unified) Task List. 24.

Within a Task List 24 the task with the highest priority/position is handled before any other existing/accumulated task. For example, in FIG. 9 there is a "Reception (1) $C_0$" task meaning that upon completion of the current ATIM window the tagged STA is to switch to channel $C_0$ to wait for a calling STA willing to send pending MSDU(s) addressed to it. In this case "(1)" means that there is only one reception task to be performed in channel $C_0$. Note that since the tagged STA knows who will send pending MSDU(s), upon reception of intended frames from the known calling STA it simply knows that it should then switch to the next task. In other words, it is preferred that the tagged STA is not allowed to switch to the next task before completion of an ongoing task.

Figure 9:
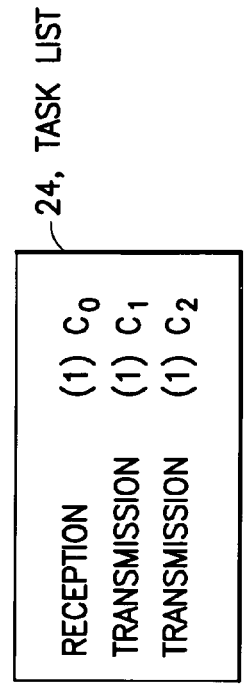
FIG. 9 shows a simple example of a task list.
Figure 10A:
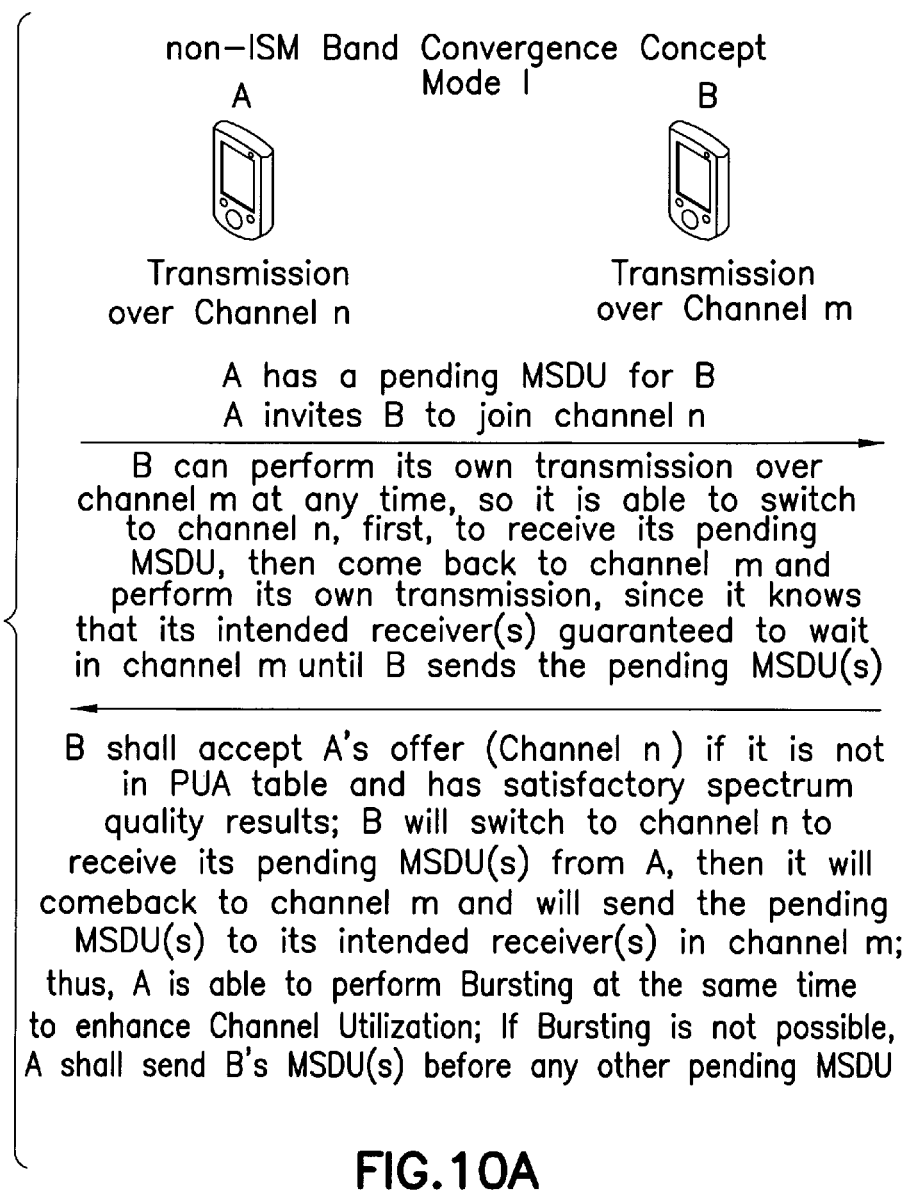
Figure 10C:
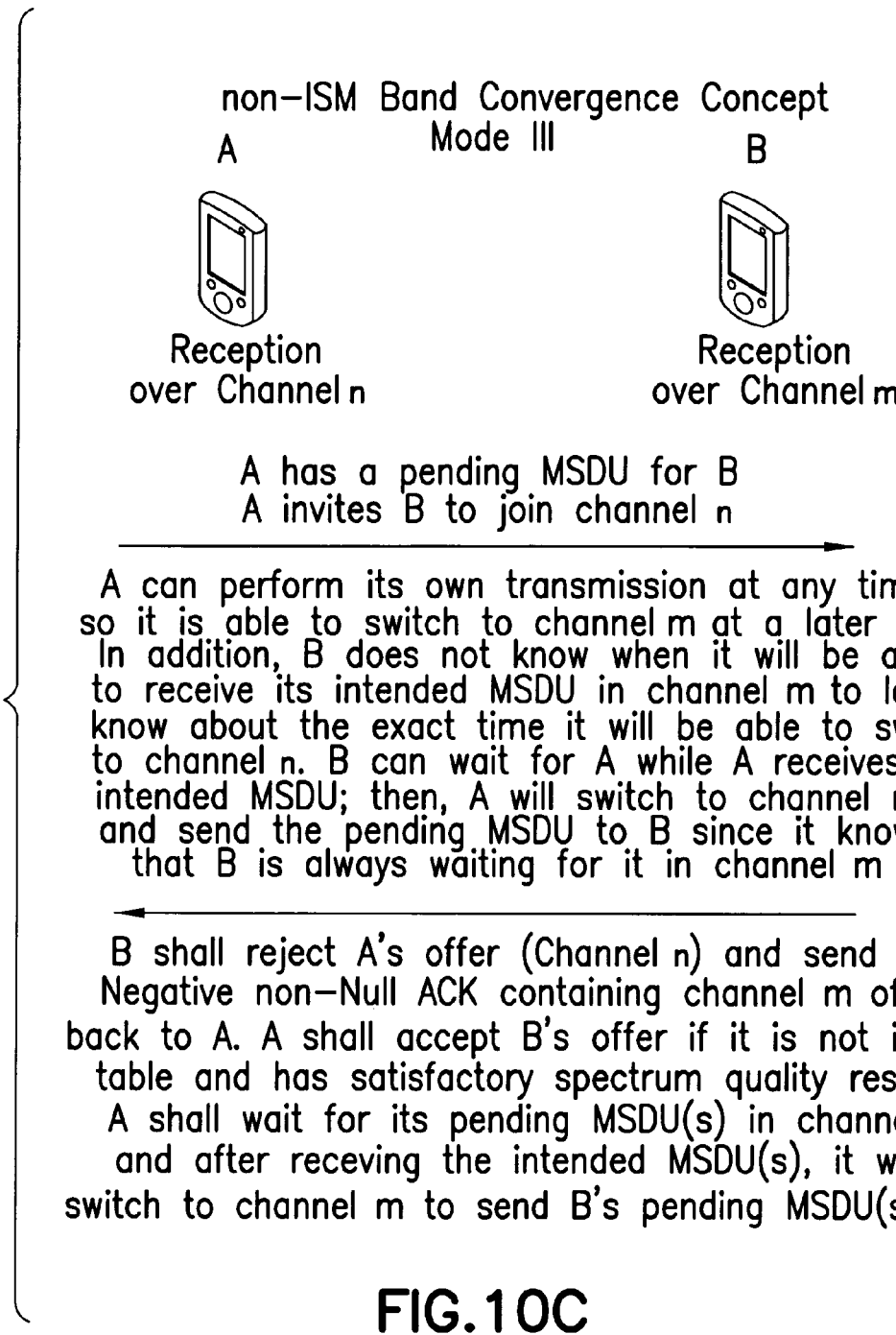
Figure 10D:
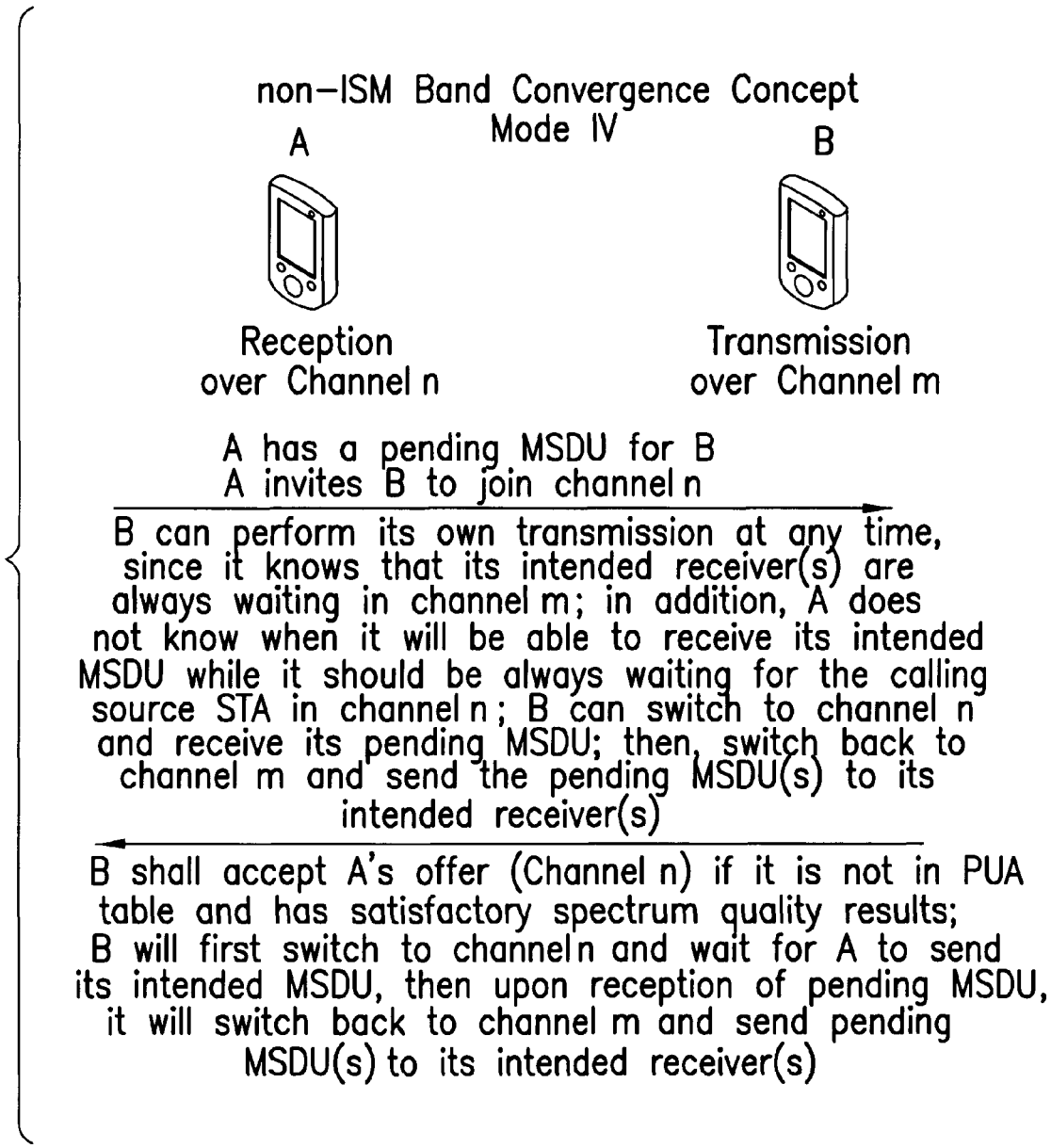

Continuing with the simple example shown in FIG. 9, as the second highest priority task the tagged STA switches to channel $C_1$ to send a set of pending MSDU(s) to a waiting STA. This task is shown as "Transmission (1) $C_1$" meaning that there is only one transmission task to be done in channel $C_1$. At the completion of the second task, the STA switches to channel $C_2$ to send pending MSDU(s) to another STA. This third task is shown as "Transmission (1) $C_2$", meaning that in channel $C_2$ there is only one transmission task recorded for the tagged STA.

As it can be seen from this non-limiting example the task "Reception (1) $C_0$" has the highest priority among all of the listed tasks shown in FIG. 9. In general, "Reception" tasks have a higher priority than "Transmission" tasks due to the fact that "Transmission" can be performed at any time during a Beacon Interval, while "Reception" mandates that the STA switch to the agreed upon channel and wait for the source STA to complete pending MSDU(s) reception. As a result, during an ATIM window, if the cognitive STA is being elected as a receiving STA in a particular non-ISM channel the "Reception" task is recorded in the non-ISM (i.e., cognitive) Task List 24A as a duty to be performed with the highest priority, if there is no other high priority "Reception" task(s) in the Task List 24A.

If there is an existing "Reception" task in the Task List, the new "Reception" tasks may be simply merged with the existing one. This means that the new "Reception" task, if is going to be accepted by the tagged STA, should be performed in the same channel as the existing "Reception" task. This feature may be referred to as a Channel Convergence Concept and defined for both ISM and non-ISM channels. There are also other cases for which the same concept can be used to perform multiple tasks in a single ISM/non-ISM channel simultaneously.

As another possible use case, assume that there is an existing "Reception" task within the Task List 24 with a highest priority, while the new duty to be added to the Task List 24 is a task of type "Transmission". The tagged STA prefers to perform the new "Transmission" task in the same channel as the highest priority "Reception" duty. This is true at least for the reason that the cognitive STA prefers to accomplish all "Reception" and "Transmission" tasks in the same channel to achieve higher channel throughput by means of traffic aggregation/bursting, while reducing channel switching energy costs and time. Thus, the STA may offer the non-ISM channel corresponding to the existing "Reception" duty to the called STA in order to invite it to join the intended channel. Now, if the new "Transmission" task is accepted by the called STA in the offered non-ISM channel, it can be merged with the existing "Reception" duty and be accomplished in the same non-ISM channel. This feature follows the Channel Convergence Concept and is defined for both ISM and non-ISM channels. On the other hand, if the agreed upon channel corresponding to the new "Transmission" task differs from the channel used for the existing "Reception" task, the "Transmission" task is preferably added to the end of Task List 24 (i.e., with the lowest priority).

When a tagged STA sends/receives an ATIM frame, it is involved in an interaction in which both parties (i.e., the tagged STA and the other party) are allowed to negotiate concerning their desired channel(s) to be used during their data communication. When the calling STA begins the interaction, it provides sufficient reasoning regarding its chosen non-ISM channel(s). This reasoning is done with the help of Task List 24 and the pre-defined Reason Codes discussed above. As was explained, each STA has a set of tasks listed according to their order of appearance, importance, and priorities. Among all existing tasks, there is a task with the highest priority that is to be used by the STA. This task may be a mixed task, e.g., "Reception (3) $C_0$" which means that exactly three MSDU receptions are to be performed in channel $C_0$ from three different source STAs. Using the highest priority task, the calling STA begins the interaction and includes its own reasoning based on the highest priority task within the delivered ATIM frame. On the other side the called STA receives the ATIM frame and, based on the provided Reason Code within the ATIM frame, the called STA reacts appropriately according to a set of pre-defined mandatory rules. These pre-defined rules, on one hand, take essential key points for optimized multiple data communications into account while, on the other hand, prevent both involved parties from acting/reacting in a self-interested only manner. In general, the interacting parties (involved STAs) are concerned with their highest priority tasks when offering their intended channels to one another and, based on the existing rules, they reach a mutual agreement concerning a data channel.

Note that if the task with the highest priority is a merged "Reception" task with a "Transmission" duty in the same channel, then preferably only the "Reception" task is used for channel negotiation.

The pre-defined rules are now explained in further detail. Recall that the interacting parties are concerned with their highest priority task at hand, and the "winner" in a particular interaction is a STA for which the offered channel is accepted by the other STA. Upon determination of the winner, there is another set of rules which define how the new assigned task should be recorded in the Task List 24 (i.e., should it be merged with the existing high priority task or simply added to the list with the lowest priority).

Consider first the four exemplary modes, shown in FIGS. 10A-10D, which will be used below.

Assume that, for the first time, the tagged STA to be informed by another cognitive STA of a pending MSDU that is to be sent to the tagged STA. After the channel negotiation phase the STAs reach a mutual agreement to use a non-ISM channel after the completion of the ongoing ATIM window. As a second event, consider the case where the tagged STA is once more informed of a pending MSDU by another cognitive STA. The concept of the non-ISM Band Convergence should thus be used. The tagged STA receives an ATIM frame advertising a set of non-ISM channels and possibly none of the advertised channels are the same as the desired channel of the tagged STA (which is in fact the one that has been agreed to previously in the former ATIM channel negotiation phase). In this case two different scenarios are possible.

A1. When the Reason Code in the received ATIM frame is 000, the tagged STA rejects the offered channel in the ATIM frame and sends a Negative non-Null ACK back to the calling cognitive STA, and offers the channel preferred by the tagged STA. In this case the calling STA should accept the offer by the tagged STA if the advertised non-ISM channel is not in its local Primary User Appearance (PUA) table 30 (discussed below with reference to FIG. 15), and if it has satisfactory spectrum quality results. Upon completion of ongoing ATIM window, the calling cognitive STA first sends the pending MSDU(s) in its own channel, and then switches to the channel of the tagged STA channel and sends the MSDU(s) addressed to the tagged STA (Mode II).

B1. When the Reason Code in the received ATIM frame is 001, the tagged STA rejects the offer in the ATIM frame and sends a Negative non-Null ACK back to the calling cognitive STA, and offers the channel preferred by the tagged STA. In this case the calling STA should accept the offered channel by the tagged STA if the advertised non-ISM channel is not in its local PUA table 30, and if it has satisfactory spectrum quality results. Upon completion of ongoing ATIM window, the calling cognitive STA waits for its pending MSDU(s) in its own channel and, after reception of the intended MSDU(s), it switches to the channel of the tagged STA and sends the MSDU(s) addressed to the tagged STA (Mode III).

Assume now that instead of a cognitive STA, a legacy non-cognitive STA informs the tagged STA about a pending MSDU. Since the tagged STA is equipped with the dual transceiver 20, 22 system, it is able to accept this request to let the calling legacy STA send the pending MSDU(s) after completion of the ongoing ATIM window (over the ISM channel associated with ISM transceiver 20).

Alternatively, again assume that after completion of an ongoing ATIM window the tagged STA should be a receiving STA in a non-ISM channel, but subsequently wants to send a pending MSDU to another associated STA in the wireless network. In this case the tagged STA is allowed to send an ATIM frame to inform the intended receiving STA. However, since prior to any ATIM transmission the tagged STA has no idea whether its intended receiver STA is a cognitive STA or a legacy, non-cognitive STA, it preferably assumes that the receiver is a cognitive STA and puts the formerly agreed upon non-ISM channel in the ATIM frame. In addition, the tagged STA is mandated to set the Reason Code of the ATIM frame to 001. In this case two different scenarios are possible, if one assumes that the called STA is a cognitive STA.

A2. When the called cognitive STA was to be a receiving STA in the following Beacon Interval, and the offered channel is not the same as its desired non-ISM channel, it rejects the channel offered by the tagged STA and responds with a Negative non-Null ACK containing its own desired channel. The tagged STA should then accept the offer if the channel it is not in its local PUA table 30, and if the offered channel has satisfactory spectrum quality results. Upon completion of the ongoing ATIM window, the tagged STA waits for its pending MSDU(s) in its channel and, after receiving the intended MSDU(s), it switches to the channel of the called cognitive STA and sends the pending MSDU(s) addressed to the called STA (Mode III).

B2. When the called cognitive STA was to be a source STA in the following Beacon Interval, and the offered channel is not the same as its desired non-ISM channel, it accepts the channel offered by the tagged STA if it is not in its local PUA table 30, and if it has satisfactory spectrum quality results. Upon completion of the ongoing ATIM window the called STA first switches to the desired channel of the tagged STA and waits to receive its intended MSDU(s), then upon reception of the pending MSDU(s) it switches back to its own desired channel and sends the pending MSDU(s) to its intended receiver(s) (Mode IV).

Assume now that instead of a cognitive STA, a legacy non-cognitive STA is informed by the tagged STA about a pending MSDU. Since the tagged STA is equipped with the dual transceiver 20, 22 system, it is able to handle MSDU delivery after completion of the ongoing ATIM window (over the ISM channel associated with ISM transceiver 20).

It should be noted that if, for the first time, the tagged STA is informed by a legacy non-cognitive STA about a pending MSDU, it is allowed to accept any other cognitive/non-cognitive ATIM request without any particular limitation. The accepted legacy ATIM requests are coordinated over the ISM channel by the use of ISM transceiver 20.

Assume now that, as in the first case, the tagged STA intends to transmit a pending MSDU to another STA after completion of the current ATIM window. Also assume that the transmission is going to be made to a non-cognitive STA over the shared ISM channel. This transmission can be accomplished without confusion with any non-ISM data transmission during the upcoming Beacon Interval. At this point, and as the second event, consider the following cases.

A3. In a first case the tagged STA is informed about a pending MSDU by another cognitive STA. In response, the calling and tagged cognitive STAs negotiate to reach a mutual agreement concerning a non-ISM channel, and subsequently the tagged STA cognitive transceiver 22 is tuned to the agreed upon non-ISM channel. Afterwards, if a pending MSDU transmission request in the form of an ATIM frame is received from any other cognitive STA, the concept of non-ISM Band Convergence is utilized according to the rules A1, B1 discussed above. When the tagged STA receives any other requests from non-cognitive STAs, it simply handles them in the ISM channel in a manner similar to the IEEE 802.11 legacy PS mode MAC. However, when the tagged STA desires to send any ATIM frame to any other cognitive STA, the concept of non-ISM Band Convergence is utilized according to the rules A2, B2 discussed above.

B3. Another case is concerned with when the tagged STA is informed about a pending MSDU by another non-cognitive STA. This is exactly the same situation as the IEEE 802.11 legacy PS mode MAC, meaning that the STA handles all requests (all together) in the ISM channel. In meantime, when the tagged STA receives an invitation from a cognitive STA, the former case is followed.

C3. Another case is concerned with when the tagged STA desires to inform another associated STA about a pending MSDU. Since, at this moment, the tagged STA has not agreed to use any particular non-ISM channel, it is allowed to advertise up to three channels based on its localized decision making/reasoning. If the called STA is a non-cognitive STA, it shall respond with an ACK frame and subsequently the transmission will be performed over the ISM channel. On the other hand, if the called STA is a cognitive STA, the two STAs shall negotiate a non-ISM channel to be used. From this point on, all possible events are addressed according to the rules A4, B4, A5, B5 discussed below.

Now assume that as the first possible case the tagged STA was already supposed to transmit a pending MSDU to another STA after completion of the current ATIM window. Also assume that the aforementioned transmission is going to be made to a cognitive STA in an agreed upon non-ISM channel. At this point, and as a second event, consider the case where the tagged STA is informed about a pending MSDU by another cognitive STA. In this case two different scenarios are possible.

A4. When the Reason Code in the received ATIM frame is 000, the tagged STA accepts the offer if it is not in its local PUA table 30, and it has obtained satisfactory spectrum quality results. Upon completion of ongoing ATIM window, the tagged STA switches to the offered channel to receive its pending MSDU(s) from the calling STA, then it comes back to its channel and sends the pending MSDU(s) to its intended receiver(s). This feature enables the calling cognitive STA to enhance channel utilization by using a bursting scheme. On the other hand, when frame bursting is not possible the calling STA sends the MSDU(s) of the tagged STA before any other pending MSDU (Mode I).

B4. When the Reason Code in the received ATIM frame is 001, the tagged STA accepts the offer if it is not in its local PUA table 30, and if it has obtained satisfactory spectrum quality results. Upon completion of the ongoing ATIM window the tagged STA switches to the offered channel to receive its pending MSDU(s) from the calling STA, and then it switches back to its channel and sends the pending MSDU(s) to its intended receiver(s) (Mode IV).

Assume now that instead of a cognitive STA, a legacy non-cognitive STA informs the tagged STA of a pending MSDU. Since the tagged STA is equipped with the dual-transceiver 20, 22 system, it is able to accept this request to let the calling legacy STA send the pending MSDU(s) after completion of the ongoing ATIM window (over the ISM channel)

Alternatively, again assume that after completion of an ongoing ATIM window the tagged STA is to be a source STA in an agreed non-ISM channel, but subsequently it desires to send a pending MSDU to another associated STA in the wireless network. In this case the tagged STA is allowed to send an ATIM frame to inform the intended receiving STA. However, since prior to any ATIM transmission the tagged STA has no idea as to whether its intended receiver is a cognitive STA, it preferably assumes that the intended receiver is a cognitive STA and it places the formerly agreed upon non-ISM channel in the ATIM frame. In addition, the tagged STA is also mandated to set the Reason Code of the ATIM frame to 001. In this case two different scenarios are possible, if it is assumed that the called STA is a cognitive STA.

A5. When the called cognitive STA was to be a receiving STA in the following Beacon Interval, and the offered channel is not the same as its desired non-ISM channel, it rejects the offer of the tagged STA and responds with a Negative non-Null ACK containing its own desired channel. The tagged STA accepts the offer if it is not in its local PUA table 30, and if it has obtained satisfactory spectrum quality results. Upon completion of the ongoing ATIM window, the tagged STA first sends the pending MSDU(s) in its own desired channel to its intended receiver(s), then it switches to the channel of the called STA channel and sends the pending MSDU(s) to it (Mode II).

B5. When the called cognitive STA was to be a source STA in the following Beacon Interval, and the offered channel is not the same as its desired non-ISM channel, it accepts the offer of the tagged STA if it is not in its local PUA table 30, and if it has obtained satisfactory spectrum quality results. Upon completion of the ongoing ATIM window the called STA first switches to the desired channel of the tagged STA and waits for it to send its intended MSDU(s), then upon reception of the pending MSDU(s), it switches back to its own desired channel and sends pending MSDU(s) to its intended receiver(s). This feature enables the tagged STA to enhance channel utilization by using bursting. On the other hand, when frame bursting is not possible, the tagged STA sends the MSDU(s) of the called STA before any other pending MSDU (Mode I).

Assume now that instead of a cognitive STA, a legacy non-cognitive STA is informed by the tagged STA of a pending MSDU. Since the tagged STA is equipped with the dual-transceiver 20, 22 system, it handles the MSDU delivery after completion of the ongoing ATIM window over the ISM channel and by the use of its ISM transceiver 20.

Figure 11:
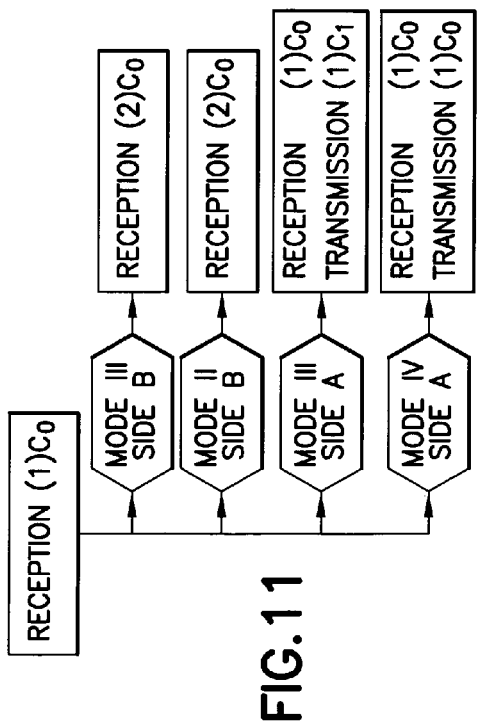
FIG. 11 shows a "Reception" task merging procedure for the Task List shown in FIG. 1B.
Figure 12:
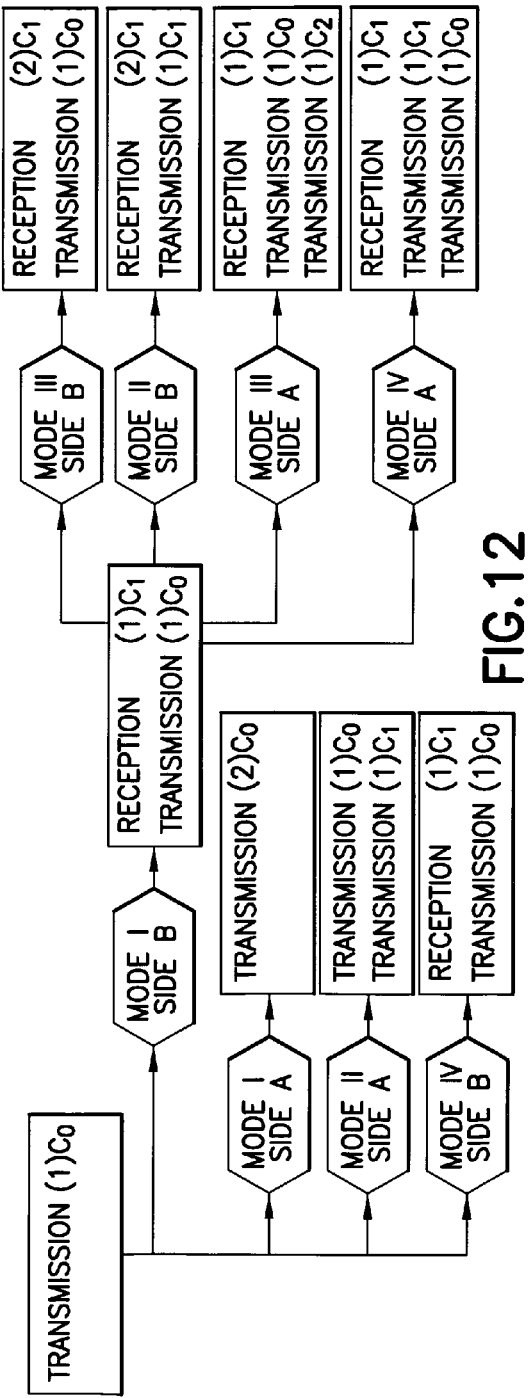
FIG. 12 shows a "Transmission" task merging procedure for the Task List shown in FIG. 1B.

After determining the winner of interaction (negotiation), both involved STAs update their Task Lists 24 appropriately. FIGS. 11 and 12 show how the new task is added to the Task List 24 according to the different modes, explained earlier, and the position of party (whether it was a calling STA, i.e., Side A, or a called STA, i.e., Side B).

Explained now in greater detail is how the above-described rules may be used when merging a new task with the existing Task List 24. Consider the case when the Task List 24 has a "Reception (1) $C_0$" at the top (highest priority) of its recorded tasks (FIG. 11). As in the first row in FIG. 11A, assume that the owner of Task List 24 is invited to participate in Mode III as the called STA (i.e., Side B). According to the rules explained earlier, the tagged STA becomes the winner and as a result the calling STA accepts its offer, i.e., accepts $C_0$. This means that there will be a new task for the called STA as "Reception", for which the agreed upon channel is exactly the same as the existing high priority task in the Task List 24. Therefore, the new task can be simply merged with the existing task (Convergence Concept) and, subsequently, the Task List 24 becomes similar to that illustrated list in FIG. 11. In the third row, since the new task is "Transmission (1) $C_1$", it has the lowest priority and as a result is recorded according to its appearance order. Hence, as shown in FIG. 11 it is put at the end of the Task List 24. On the other hand, in the fourth row, since the new "Transmission" task has exactly the same agreed upon channel as the existing "Reception" task, it is simply merged with it and, consequently, is be handled in parallel with the "Reception (1) $C_0$" upon completion of the ATIM window.

Similarly, FIG. 12 illustrates all possibilities when a "Transmission" task is at the top of the Task List 24.

During the Beacon Interval, when two cognitive STAs desire to establish a layer two connection, they preferably use RTS/CTS frames to negotiate the channel to be used later for the data exchange. When the intended receiver is unreachable for any reason (e.g., it is situated in the radio range of an ongoing large data communication in the calling STA's advertised channel), it is allowed to reject the offered channel and advertise its own suggestion using the Negative non-Null CTS, with the Reason Code (see FIG. 6) set to 110. Upon reception of the Negative non-Null CTS, the source STA checks the Reason Code and is able to determine the reason for which its desired channel has been rejected by the receiver. At this point, according to the source STA decision making it decides whether to accept the channel counteroffer of the receiver.

All Beacon frames are sent simultaneously over the common ISM channel utilized by legacy and cognitive STAs. Beacon frame generation is performed in a cooperative fashion by all associated cognitive STAs, in the same manner as it is performed by legacy STAs and as defined in the IEEE 802.11 standard. During Beacon frame delivery all STAs become quiet and all information exchange activities are suspended. Cognitive STAs are encouraged to put information about Recently Discovered Channels in generated Beacon frames. On the other hand, cognitive STAs are mandated to put sufficient information concerning those channels in which a Primary User has been detected (appeared), accompanied by the corresponding Time Index. It is imperative to note that the encapsulated information regarding the Primary User Appearance is not necessarily based on local induction (interpretation), but may be obtained from the received Beacon, Probe response, or other types of MAC management frames captured over the air interface. Furthermore, it should be also pointed out that for Recently Discovered Channels there should not be any accompanying Time Index within the Beacon or other management frames (in this case the Probe Response management frame is not used for Recently Discovered Channel announcement). As it will be clarified below, the cognitive STA examines each discovered channel to conclude whether it should be recorded in local databases. When the cognitive STA experiences a non-ISM channel successfully, either in the position of a source STA or in the position of a destination STA, the channel is recorded in a so-called Last Successfully Experienced Channel (LSEC) database (simply LSEC table 32, shown in FIG. 15 and discussed below). Only when cognitive STA's local interpretation implies that utilization of a particular non-ISM channel provides a minimum level of satisfaction, the channel information can be recorded in the local LSEC table 32. Note that currently the defined level of satisfaction covers only an ability of successful experience, and an acceptable spectrum quality result.

The Time Index is specified in a number of Beacon Intervals elapsed since an event has taken place.

Figure 13:
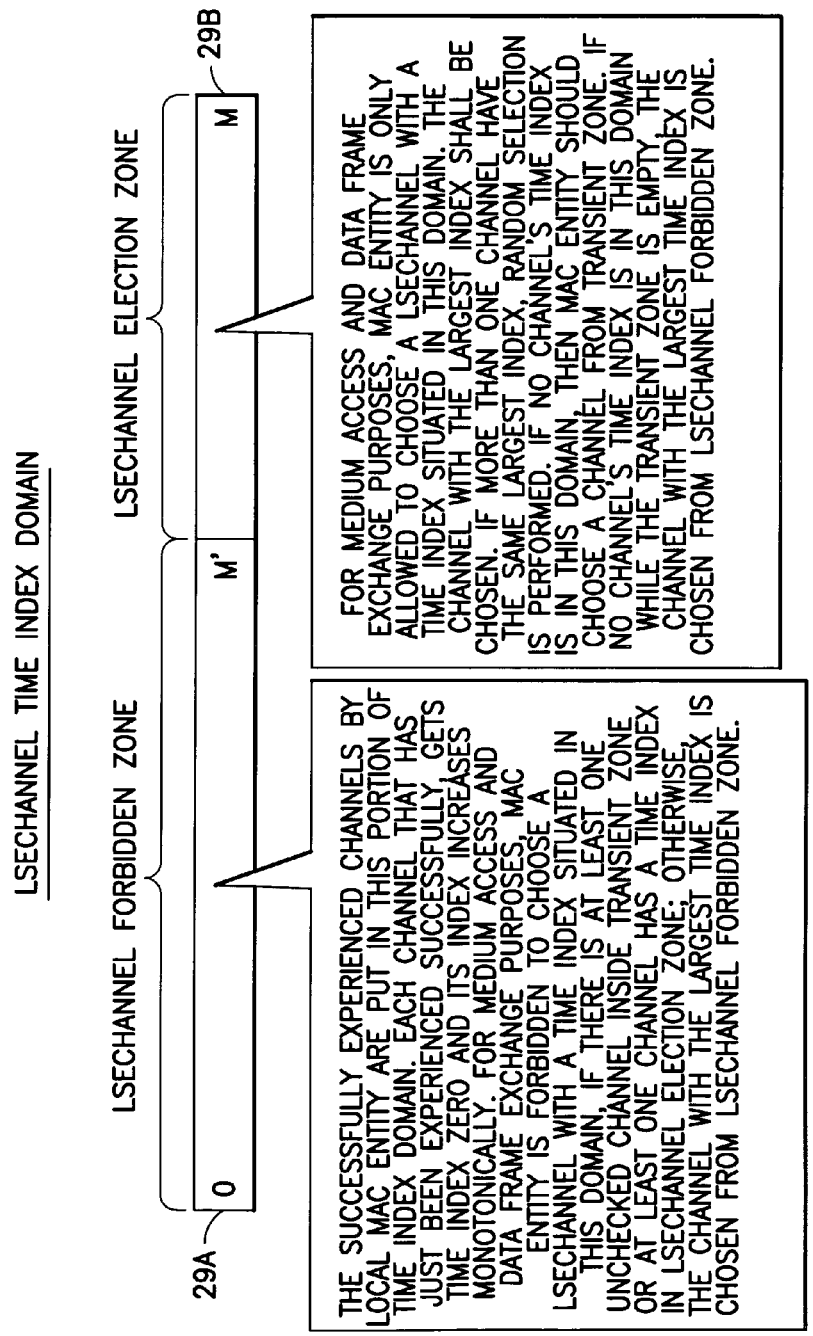
FIG. 13 illustrates sub-domains of a LSEChannel Time Index Domain.

As was discussed above, the MAC entity 26 uses the LSEC table 32 of those channels that have been successfully experienced by the tagged STA. Each entry of the LSEC table 32 has two fields: the first field is a Channel Identifier (e.g., center frequency, channel number, etc.) and the second field is its corresponding Time Index (the number of Beacon Intervals that have elapsed since the last successful experience with the channel by the tagged STA). The Time Index of LSEC entries is a monotonically increasing timer that increments every Beacon Interval. When the tagged STA utilizes one of the recorded channels in the LSEC table 32 successfully, either as a source or a destination end point, the corresponding Time Index is reset to zero. By definition, a recorded channel in the LSEC table 32 is referred to as an LSEChannel. To keep track of the recorded information level of freshness, the Time Index Domain is divided to two sub-domains (or zones) as depicted in FIG. 13.

The first zone (sub-domain), LSEChannel Forbidden Zone 29A, is typically spanned from 0 to M'. When a discovered channel is successfully experienced by the tagged STA (either as a source or destination STA), it receives a Time Index equal to zero and is recorded in the LSEC table 32. The second zone, LSEChannel Election Zone 29B, is spanned between M'+1 and M. As explained earlier, when a previously recorded channel in the LSEC table 32 is again experienced successfully, its Time Index is reset to zero. Basically, the MAC entity 26 always selects a non-ISM channel with the greatest Time Index as its desired choice for an upcoming data communication. This feature makes the non-ISM Band Divergence Concept achievable, as it prevents greedy utilization of a particular non-ISM channel by cognitive STAs after any successful experience with the channel. On the other hand, this feature is indeed imperative for the case where a Primary User appears in a certain non-ISM channel. If all cognitive STAs concentrat on deployment of only one non-ISM channel, upon any Primary User Appearance they should concurrently suspend all ongoing information exchanges, resulting in simultaneous and considerable system performance degradation. If associated cognitive STAs are distributed among all available non-ISM channels (i.e., frequency opportunities), then upon a Primary User Appearance in a particular channel only a few cognitive STAs will encounter throughput degradation due to traffic exchange suspension. Note that the MAC entity 26 is not allowed to update the LSEC record Time Index with any type of received information over the air interface. In addition, upon reporting a new LSEChannel, the reporter is prevented from inclusion of any Time Index in the management frame (e.g., Beacon frame) carrying the LSEChannel information.

In addition to the LSEC table 32, there is a Primary User Appearance (PUA) table 30 used to keep track of all channels in which a Primary User has been recently detected. When a Primary User is observed in a channel, using an extended version of a Dynamic Frequency Selection (DFS) scheme (refer to IEEE 802.11h amendment), cognitive STAs are mandated to inform their one-hop neighbors about Primary User appearance in that particular channel. All discovered channels, in which Primary User appearance has been reported by either the local MAC entity 26 or neighboring STAs, should be recorded in PUA table (Note that the terms PUA database and PUA table can be used interchangeably). In PUA table, each entry has a Time Index which is a monotonically decreasing timer and decrements every Beacon Interval. When a channel is being recorded in the PUA table 30, its timer is loaded by a pre-defined value (e.g., a network operator-defined value) and begins counting down. When the Time Index timer reaches zero, the channel identifier is simply removed from the PUA table 30. When a Beacon/Probe Response/DFS frame reporting a Primary User Appearance is received, the cognitive STA checks its private PUA table 30 to verify whether the reported channel has been already recorded in its database; if not, it is recorded and its corresponding Time Index is simply copied from the received frame. Note that in contrast to the "Recently Discovered Channel" case where the reporter is prohibited from inclusion of the Time Index in the delivered management frames (e.g., Beacon frame), for the case of "Primary User Announcement" the reporter is mandated to accompany the channel being reported with its corresponding Time Index. On the other hand, if the Primary User Appearance has already been recorded in PUA table 30, the corresponding Time Indexes in the local database and the received report frame are compared with each other. When the Time Index in PUA table 30 is less than the Time Index in the received report frame, the cognitive STA updates the Time Index of the channel entry in its local database with the Time Index included in the received frame. When the Time Index in PUA table 30 is greater than the Time Index in the received frame, the cognitive STA simply drops the received information; i.e.:

```
If(Rcvd_Frame(Channel_Id(Time_Index)) ≤
Local_PUA_Table(Channel_Id(Time_Index)))
{
Drop the information inside the received frame;
}
Else {
Local_PUA_Table(Channel_Id(Time_Index)) ←
Rcvd_Frame(Channel_Id(Time_Index));
}
```

When a Primary User is detected in an LSEChannel, the channel should be removed from the LSEC table. As a result, upon receiving a Primary User Appearance notification reported either by the local MAC entity 26 or by a neighboring STA, not only the PUA table 30, but also the LSEC table 32, should be checked. All dynamic frequency selection (DFS) related frames are transmitted over the ISM channel.

Within, for example, the Beacon and Probe Response frames there should be an Information Element dedicated to Primary User Appearance notification. This field resides in the optional portion of above mentioned management frames. Note that the corresponding Time Index for Primary User Appearance event should also be included. Thus, the Channel Identifier (e.g., center frequency) and Time Index are two mandatory sub-fields that are always included.

Figure 14:
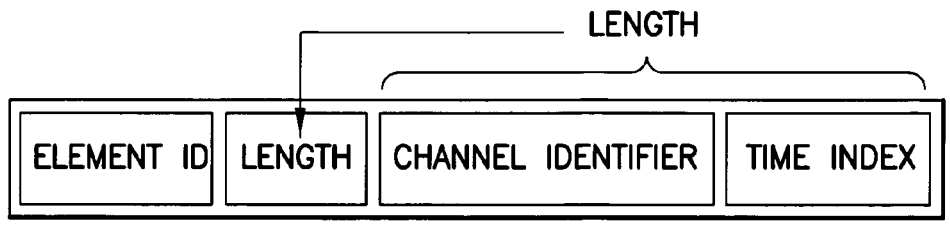
FIG. 14 shows an Information Element for Primary User Appearance Reporting.

Reference can be made to FIG. 14 for showing this information element for Primary User Appearance Reporting purposes.

Figure 15:
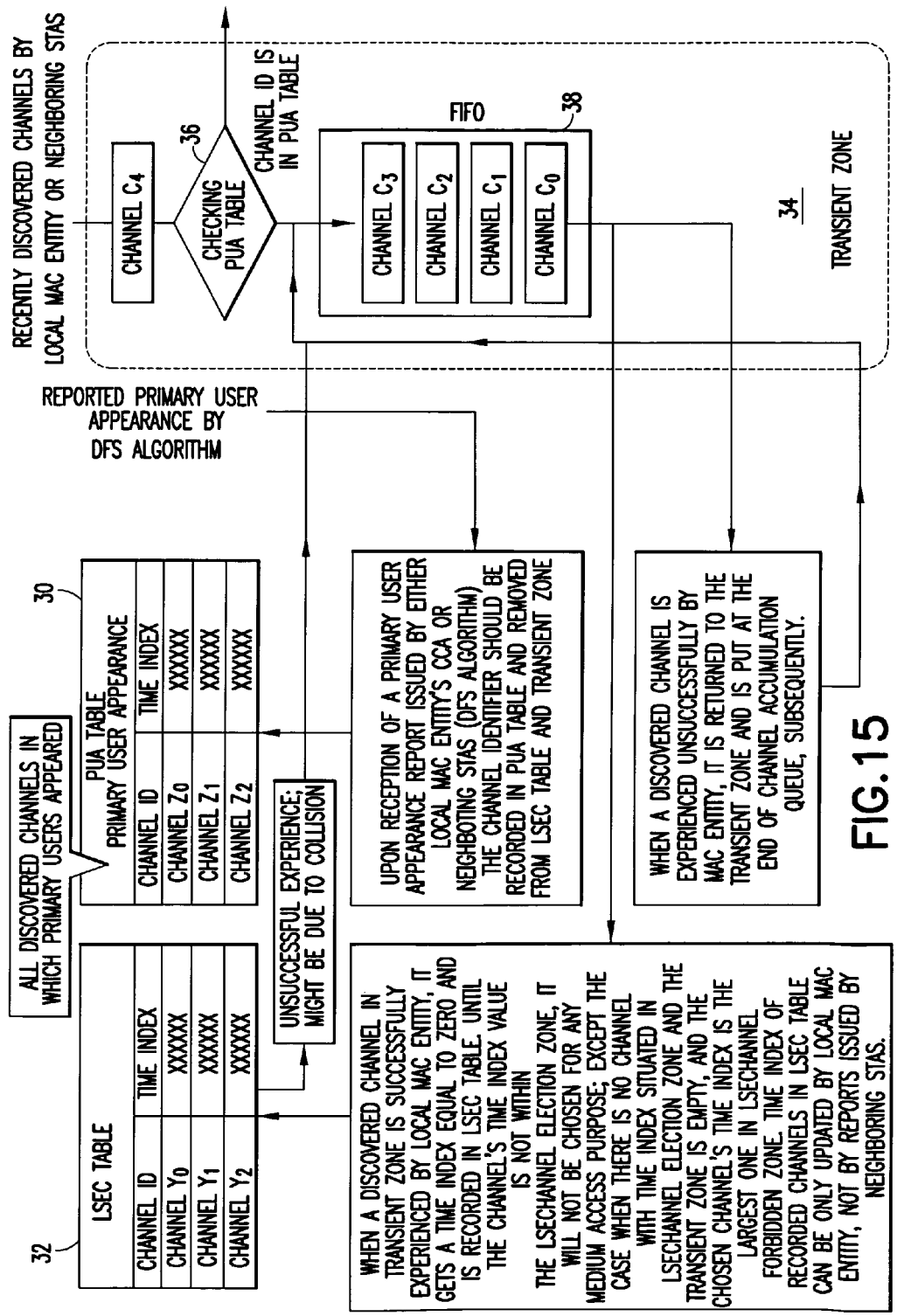
FIG. 15 illustrates a Channel Information Database, Management Entities, and Transient Zone.

In addition to the LSEC table 32 and the PUA table 30 there is a section within the MAC entity 26 databases referred to as a Transient Zone 34 that is specifically used for channel management purposes (See FIG. 15). All information concerning discovered channels either by the local MAC entity 26 or neighboring STAs is gathered within the Transient Zone 34. A newly discovered non-ISM channel is first checked (block 36) to see whether is already included in the PUA table 30. After checking the PUA Table 30, and if the verified channel has not been recorded in the PUA table 30, the channel information is recorded in a FIFO-based structure 38. The FIFO-based structure 38 is actually a FIFO queue, and channel information is queued in this structure and fetched according to inclusion order. On the other hand, if the discovered channel is found in the PUA table 30, it is simply discarded from the Transient Zone 34.

Head-of-line (HOL) channel information is fetched from the Transient Zone FIFO-based queue 38 whenever there is no channel in the LSEC table 32 with a Time Index situated in the LSEChannel Election Zone 29B (See FIG. 13). Basically, as a first choice, the MAC entity 26 is mandated to select a candidate channel with a largest Time Index situated in LSEChannel Election Zone 29B. When there is no channel with the Time Index situated in LSEChannel Election Zone 29B, the MAC entity 26 should check the Transient Zone 34 for any channel availability. When at least one available channel is found in the Transient Zone 34, it is used for medium access and data exchange purposes. If the deployed channel results to a successful data communication, it is recorded in the LSEC table 32 accompanied by a Time Index equal to zero; otherwise, the channel information is sent back to the FIFO queue 38 as illustrated in FIG. 15. Finally, when there is no channel with a Time Index situated in LSEChannel Election Zone 29B, and the Transient Zone is empty (FIFO Queue 38 is empty), the MAC entity 26 should select a channel with a largest Time Index in the LSEChannel Election Forbidden Zone 29A (or simply, LSEChannel Forbidden Zone) shown in FIG. 13.

If a channel selected from the LSEC table 32 is utilized for a data communication successfully, its corresponding Time Index will be reset to zero and it will be retained in the LSEC table 32. On the other hand, if the aforementioned channel is utilized for an unsuccessful data communication, it will be put into the Transient Zone 34 as illustrated in FIG. 15.

If a channel selected from the Transient Zone 34 is utilized for a data communication successfully, it will be recorded in the LSEC table 32 and its corresponding Time Index will be set to zero. On the other hand, if the abovementioned channel is utilized for an unsuccessful data communication, it will be returned to the Transient Zone 34 as shown in FIG. 15.

To select a channel for an upcoming communication the MAC entity 26 first inspects the LSEC table 32 to determine whether a channel with a largest Time Index situated in LSEChannel Election Zone 29B can be found. When there is at least one such channel, it is selected to be advertized during the channel negotiation phase. Otherwise, the MAC entity 26 inspects the Transient Zone 34 and determines if channel information exists in the FIFO queue 38; if at least one channel is found, it is selected. If not, the MAC entity 26 reverts to the LSEC table 32 and determines if any channel with a largest Time Index situated in LSEChannel Forbidden Zone 29A. To review, first the LSEC table 32 is checked for any available channel with the a largest Time Index situated in the LSEChannel Election Zone 29B, then the Transient Zone is checked, and finally if the MAC entity 26 needs to choose additional channel(s) it checks the LSEC table 32 for any available channel with a largest Time Index in LSEChannel Forbidden Zone 29A.

The aforementioned structure makes the use of the non-ISM Band Divergence Concept possible by preventing greedy utilization of a particular non-ISM channel by cognitive STAs after a successful experience with the channel. In other words, the MAC entity 26 operates to avoid accumulated channel requests for a certain non-ISM channel. Generally, when a successfully experienced channel is time indexed by zero, the MAC entity 26 is prohibited from deploying it again and, as a result, it becomes available for use by other neighboring STAs. The use of this approach results in reduced channel congestion levels and to a reduced backoff delay for highly populated wireless networks. As was noted above, the use of this approach is also important for the case where the Primary User appears in a certain non-ISM channel. If all associated cognitive STAs 10A have already concentrated in only one non-ISM channel, then upon a Primary User Appearance in this particular channel all STAs 10 would have been mandated to concurrently suspend all ongoing information exchanges. In contradistinction, if the cognitive STAs 10A have been distributed amongst all available non-ISM channels (frequency opportunities), then upon Primary User Appearance in a particular channel only some subset of the set of all cognitive STAs would encounter throughput degradation due to traffic exchange suspension.

The local MAC entity 26 is preferably capable of discovering new frequency opportunities in a continuous fashion. In addition, the tagged STA is able to discover new channels from its neighbors by simply listening to their exchanged control frames (e.g., ATIM/RTS/CTS/ACK/Negative non-Null CTS/Negative non-Null ACK). By using this strategy the STAs 10 share their findings in a cooperative and reactive manner.

As was explained previously, the cognitive STAs 10A are mandated to utilize the ISM channel for BSS establishment, management, and control information exchange. On the other hand, according to the IEEE 802.11 standard if a legacy STA 10B receives a management/control frame accompanied with one of the known Frame Types defined in IEEE 802.11 it processes only those fields that it knows how to exploit. This means that newly added fields are not processed and will be simply discarded by the legacy STAs 10B. On the other hand, the legacy STAs 10B should be able to process the Duration/ID field and defer from medium access during the period when two cognitive STAs 10A are exchanging control frames. For this reason it is desirable to define how the Duration/ID field should be set when exchanging control frames over the shared ISM channel.

The source STA 10 is allowed to advertise up to three channels within an ATIM/RTS frame. As a result, generally ATIM/RTS frames have no static pre-defined size as in legacy IEEE 802.11. Despite the dynamic nature of the ATIM/RTS frame size, no complication arises due to the fact that the source STA 10 is only required to acquire the control of the medium, and subsequently is free to transmit its ATIM/RTS without any limitation on the size of delivered frame. However, at the receiver side a problem may arise since it may not be clear how the receiver will respond to the received ATIM/RTS frame. As a result, the source STA 10 does not know exactly for how much time it should reserve its surrounding wireless medium, using the network allocation vector (NAV) within the ATIM/RTS frame, to enable the called STA to send the expected ACK/CTS frame back. For example, in one case it is possible that one of the offered channels is accepted by the receiver and, consequently, only CC fields will be included within the returned ACK/CTS frame. In this case the source STA 10 can readily predict that if the receiver is going to accept the offer, it will send back three CC fields (one for the accepted channel and two for the rejected channels). However, there may instead be a case where the receiver rejects all offered channels, and also advertises up to three channels of its own in the Negative non-Null ACK/Negative non-Null CTS frame. As should be apparent, in general one may conclude that there is no way for both the source and destination STAs 10 to predict how the other end-point may respond.

To solve this problem it is preferred that the source STA 10 reserve the medium to accommodate a maximum possible returned frame size. As a result, and in accordance with the exemplary embodiments, the RTS reserves the medium for a CTS frame containing up to three CC fields (the source STA 10 knows exactly how many CC fields will be included in a returned CTS since they exactly correspond to the number of channels previously offered in the RTS), in addition to as many as three CI fields (corresponding to the maximum possible three channels that the receiver is allowed to advertise, if it rejects the three channels offered by the source STA 10). As an example, assume that the source STA 10 advertises two non-ISM channels, and that the receiver does not accept the offered channels and prefers instead to advertise only one non-ISM channel different from those offered by the source STA. According to the aforementioned rule, the source STA reserves its surrounding area for:

$$SIFS + legacy\_CTSTime + 2 \times CC + 3 \times CI.$$

This means that source STA 10, due to its inability to predict how many channels may be offered by its intended receiver, reserves the medium for the case when the receiver offers three different channels.

Related to the dynamic size of the CTS there is a more conservative approach, that is, for the receiver limit the allowed number of offered channels to one. In this case the source STA is able to anticipate that if all offered channels are rejected by its intended receiver then there will be exactly the same number of CC fields as the number of offered channels in the RTS, plus one CI field, in the returned CTS frame (i.e., Negative non-Null CTS). Although in this case the size of returned Negative non-Null CTS frame is still unpredictable, the incurred variation is not considerable in comparison to the case in which receiver STA is allowed to offer up to three channels. Reconsidering the previous example, according to the above simplifying rule, the source STA is only required to reserve the channel for:

$$SIFS + legacy\_CTSTime + 2 \times CC + CI.$$

On the other hand, if the receiver STA 10 has no channel offer to advertise, the additional media reservation performed by the source STA 10 will be equivalent to one CI, which is only five bytes in size and is thus not a significant portion of the overall reservation.

For the case of the receiver STA, when it reserves its surrounding media the situation is simpler. If the receiver STA accepts one of the offered channels, it will not need to reserve the media for any additional period. On the other hand, if it rejects all offers and advertises its own desired channel, it can anticipate an ACK (or Negative ACK) frame with exactly the same number of CC fields as the number of offered channels in its Negative non-Null CTS.

As can be appreciated, the media over-reservation potential problem exists only for the source STA 10, and by limiting the number of the receiver STA possible offers the problem can be at least partly alleviated.

The following rules are applicable for involved STAs 10 concerning reservation of the wireless medium:
1. ATIM/RTS frame Duration/ID field should be loaded by SIFS+legacy_CTSTime+number of offered channels by source STA×CC+maximum number of channels receiver is allowed to advertise if it is going to reject all source STA's offers×CI (over-reservation is probable).
2. Positive CTS/ACK and Negative Null CTS/ACK frames Duration/ID is loaded by zero since there is no need to reserve the media for extra frame reception.
3. Negative non-Null CTS/ACK frame Duration/ID should be loaded by SIFS+legacy_ACKTime+number of offered channels by receiver×CC (no over-reservation).

Discussed thus far has been the multiple transceiver cognitive STA 10A embodiment, having the ISM transceiver 20 and the cognitive transceiver 22. Discussed now is the single transceiver embodiment.

When the physical layer is equipped with a single transceiver, several issues arise concerning multi-channel MSDU transmission. In this discussion it may be assumed that the cognitive STAs 10 are single-transceiver-based and as a result, each cognitive STA 10A is able to focus on only one channel, either ISM or non-ISM channel, at any given time. Therefore, for example, if the STA 10A is sending or receiving on a non-ISM channel, then it cannot simultaneously handle legacy ISM connections. Both the power saving (PS) mode disabled and the PS mode enabled scenarios are covered below.

A) PS Mode Disabled

This mode is similar to the case where the physical layer is equipped with a dual transceiver (ISM/non-ISM), except that the cognitive STA 10A is not able to serve any connection establishment request delivered over the shared ISM channel when it is involved with an ongoing data transmission on a non-ISM channel. This is due to the fact that the STA has the single transceiver structure and, thus, it can be tuned to only one channel at any given time. As a result the STA which is sending an ATIM/RTS frame to establish a connection with a cognitive STA 10A that has being involved with another data communication in a non-ISM channel will not receive any response and subsequently will timeout. The occurrence of successive timeouts degrades the ISM channel utilization and wastes available opportunities for other legacy STAs 10B to establish data communication with their associated counterparts. It can be assumed that the achieved channel utilization in single-transceiver mode is lower than for the case in which the STA is equipped with two independent transceivers. Also, it should be noted that the aforementioned throughput degradation is due to the overall structure of physical layer, and is not due to the MAC entity 26 itself.

B) PS Mode Enabled

In this case all transmitted/received MSDU(s) delivery requests, in the form of ATIM, are handled exactly as in the dual transceiver mode, except that all ISM and non-ISM related "Transmission" and "Reception" tasks that are to be performed in the upcoming Beacon Interval are accumulated in a common Task List 24. This means that there is no separate non-ISM and ISM Task Lists 24A, 24B, due to the fact that a single transceiver-based STA 10 is capable of handling only one task at any particular time. Therefore, successive tasks are recorded according to their appearance order and, more importantly, based on their priorities. In conclusion, for the single transceiver case there is only one Task List 24 dedicated to both ISM and non-ISM duties.

Concerning the strategic interactions between cognitive STAs 10A during the negotiation phase, all of the rules discussed above are applicable with the following exception.

When there is at least one "non-ISM Reception" task in the (unified) Task List 24, any "ISM Reception" task issued by a legacy STA 10B is rejected. On the other hand, when there is an "ISM Reception" task in the Task List 24, all other "Reception" tasks are converged to the common ISM channel, as the Convergence Concept has been taken into account for all pre-defined interaction rules introduced earlier. This may be referred to as 'ISM Attraction Dilemma'. The ISM Attraction Dilemma is undesirable in the sense that it attracts all cognitive transmissions to the shared common ISM band, which preferably is used only for control signaling purposes. Therefore, the "ISM Reception" task(s) are preferably rejected if there is at least one "non-ISM Reception" task in the Task List 24. Since legacy STAs 10B are not capable of switching to non-ISM channels, as a result they are not able to follow the Convergence Concept in non-ISM channels and, for this reason, their transmission requests over the ISM channel are simply rejected (if the cognitive STA 10A has already agreed to a "Reception" task over a non-ISM channel).

Figure 16:
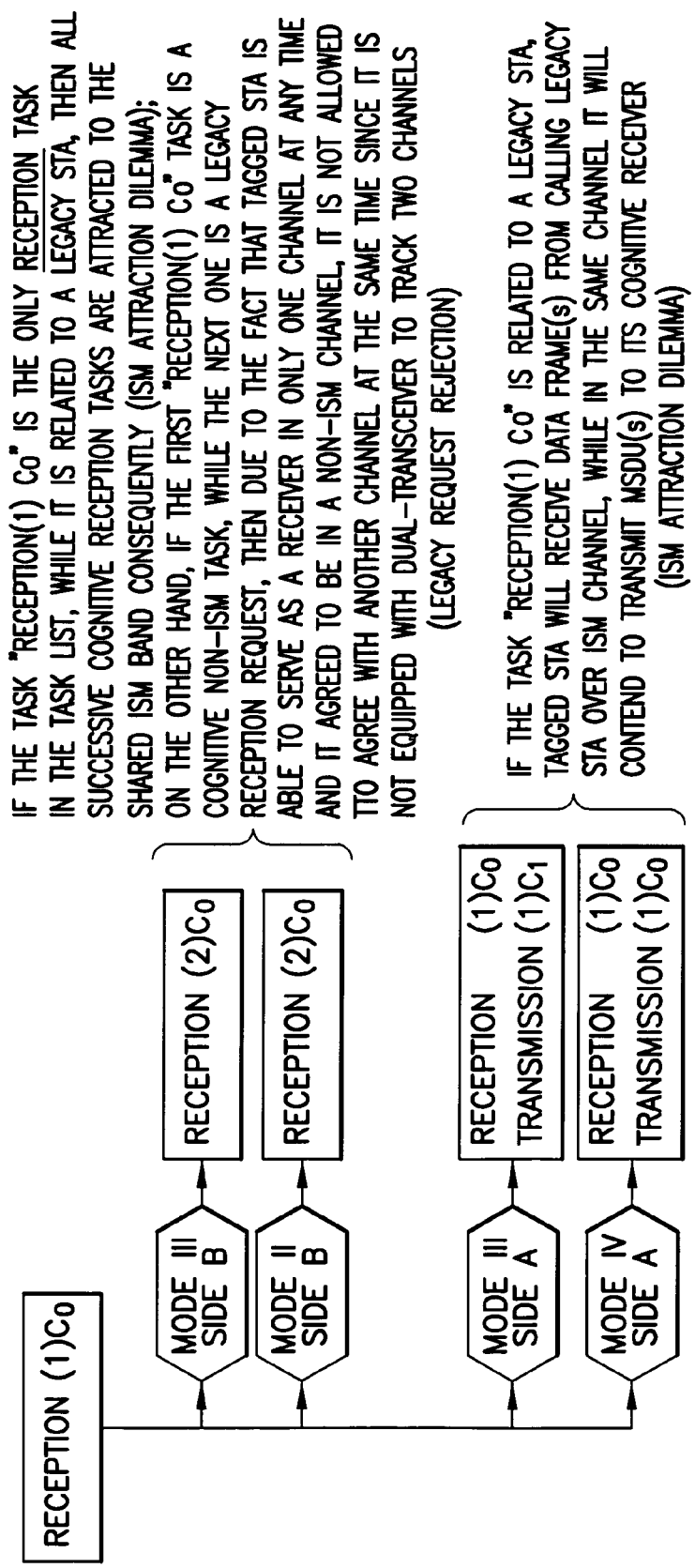
FIG. 16 shows a Task List maintenance rule and strategy that accommodates a single transceiver STA embodiment.

FIG. 16 shows a modified Task List maintenance rule and strategy that is based on the foregoing discussion of the single transceiver embodiment of the STA 10.

As it can be seen in FIG. 16, the ISM Attraction Dilemma is possible for three different cases. Since the tagged STA has an "ISM Reception" task, as a result all other accepted "Reception" tasks are also attracted to the ISM channel. For the fourth row, there is also a possibility of ISM Attraction, if the existing "Reception" task in Task List 24 is related to a legacy STA 10B.

Based on the foregoing it can be appreciated that a novel cognitive frequency agile MAC protocol entity 26 has been described, one suitable for use with, but not limited to, next generation 802.11 wireless networks. The MAC entity 26 is capable of coordination of concurrent multi-channel data communications in a distributed fashion. Both the power save mode disabled and power save mode enabled modes are accommodated while taking into account both single transceiver and dual transceiver physical layer structures. The MAC entity 26 protocol algorithm is designed in such a way that it makes both non-ISM channel Convergence and Divergence Concepts simultaneously possible and achievable. The use of these two concepts improves channel utilization on one hand, and on the other hand prevents congestion, in particular in non-ISM channels. For each of aforementioned concepts novel strategies, including the use of dual-zone timers, strategic decision-making schemes and the Task Lists 24A, 24B, have been described. In addition, it can be noted that the exemplary embodiments of this invention do not require any dedicated control channel structure for the cognitive STAs 10A, while providing additional services for legacy existing IEEE 802.11 networks. Also, the cognitive MAC entity 26 has complete backwards compatibility with the legacy IEEE 802.11 MAC, meaning that the legacy STAs 10B are able to receive and process all MAC frames transmitted by the cognitive STAs 10A. As a result, direct communication between a legacy STA 10B and a cognitive STA 10A become possible.

Simulations have shown that a channel utilization enhancement of about 6 to 7 percent for existing IEEE 802.11 networks becomes possible due at least to the additional network services offered by cognitive STAs 10A, while achieving high channel throughput in non-ISM channels for cognitive STAs due to better medium access coordination.

Described now are further enhancements to cognitive radio techniques in accordance with additional embodiments of this invention.

In the final version of IEEE 802.11s amendment a so-called common channel framework (CCF) is to be considered as a non-compulsory technique to offer higher aggregate channel throughput due to simultaneous multiple channel deployment and concurrent data transmissions. In this approach mesh points (MPs) are allowed to utilize a common channel to negotiate about an available data channel that will be deployed for exchanging data frame(s) between the source and the destination entities (abbreviated by SE and DE). The negotiation phase is accomplished by exchanging two designated control frames referred to as ready-to-switch (RTX) and clear-to-switch (CTX).

It is noted in this regard that according to the IEEE 802.11s standard, any device that supports pre-defined mesh services in a wireless mesh network (WMN) is called a mesh point (MP). Note that a MP can be either a dedicated infrastructure device or a user appliance that is able to fully participate in both the formation and operation of the mesh network simultaneously.

Further in this regard the source entity (SE) refers to any type of mesh equipment that has something to send. This can be either a MP or a mesh access point (MAP). In addition, a cognitive source entity (CSE) may be considered to be a frequency agile SE. The destination entity (DE) refers to any type of mesh equipment that is intended to receive data frame(s) from a SE. Similarly, by cognitive destination entity (CDE) what is intended is a frequency agile DE.

At the beginning of the exchange, the SE sends an RTX frame over the common channel to inform the DE of an intended data transmission targeted to it. The SE offers an empty channel to the DE which is to be deployed during the data transmission. Using a dedicated field in the header of the RTX, i.e., "destination channel information", the SE advertises the channel to the DE. When the DE is also interested in deployment of the offered channel, it responds using a CTX control frame which is also transmitted over the shared common channel. Subsequent to the correct reception of the CTX frame by the SE, both involved entities switch to the destination channel in order to commence the agreed upon data transmission. After switching to the destination channel, and after a time period equal to DIFS (Distributed Inter-Frame Space ), if the media is sensed idle the SE will be allowed to start transmission of data frame(s) to the DE. At the end, an acknowledgment (ACK) frame is delivered through the destination channel back to the SE. It is noted that there is a special type of MP, the mesh access point (MAP), which serves also as an access point (AP) in addition to providing pre-defined conventional mesh services.

In IEEE 802.11s it is assumed that the MPs are equipped with a single radio transceiver. As a result, a particular MP on the common channel is unable to communicate with other MPs which are operating on the other channels. At the same time, single-radio MPs on other channels are unaware of the network status on the common channel.

As was discussed above, the cognitive IEEE 802.11 STAs 10A are able to establish the cognitive basic service set (CBSS) to which both legacy and cognitive STAs are able to join. All CBSSs are established on the ISM frequency bands in which the legacy STAs 10B operate, enabling all legacy STAs 10B to detect, probe and associate to the existing CBSSs. In addition, based on the above concepts the cognitive STAs 10A are not allowed to deploy the shared ISM channel for private data transmissions, except in the case where a legacy STA 10B wants to establish a link layer connection with a cognitive STA 10A, or when the destination of interest of a cognitive STA 10A is a legacy STA 10B. In these two cases the cognitive STA 10A operates on the shared ISM channel in order to be able to exchange the intended data frame(s) with the legacy STA 10B. By establishing the CBSS over a conventional ISM channel, the cognitive STAs 10A are able to provide additional network connectivity and packet forwarding to the legacy system on one hand, and on the other hand they are allowed to utilize the shared ISM channel as a common control channel that is primarily exploited for cognitive-management/cognitive-control traffic transmissions. Based on the above-referenced cognitive medium access control protocol one may conclude that there is no need for a common control channel to be particularly specified in order to enable the cognitive STAs 10A to negotiate about the use of non-ISM data channels.

The exemplary embodiments of this invention extend the foregoing MAC entity protocol and operation to the IEEE 802.11s type of WMNs. In this case a cognitive wireless mesh network (CWMN) may be defined as a set of mesh entities (MEs) including both cognitive MPs/MAPs and conventional or legacy 802.11s MPs/MAPs. In the CWMN ISM band(s)/channel(s) are particularly utilized for 802.11s MPs/MAPs and legacy 802.11 STAs traffic delivery, and for exchanging cognitive-management and control frames to negotiate concerning non-ISM channels that may be deployed. In this CWMN architecture the ISM band(s)/channel(s) are deployed as common control channel by all cognitive STAs, cognitive MPs (CMPs), and cognitive MAPs (CMAPs). As a result, cognitive mesh entities (CMEs) 40 should preferably avoid using ISM bands/channels for private data transmissions as much as possible. On the other hand, and based on the above architecture, non-ISM channels are specially utilized for data transmissions in a distributed manner coordinated by cognitive STAs, CMPs, and CMAPs.

As employed herein an ME encompasses any type of mesh equipment that belongs to the WMN. This can be a simple IEEE 802.11 STA which has been already associated to the WMN, an MP, or an MAP. In addition, an CME is any type of ME that exhibits frequency agility, and may be a cognitive 802.11 STA, an CMP, or an CMAP.

Figure 17:
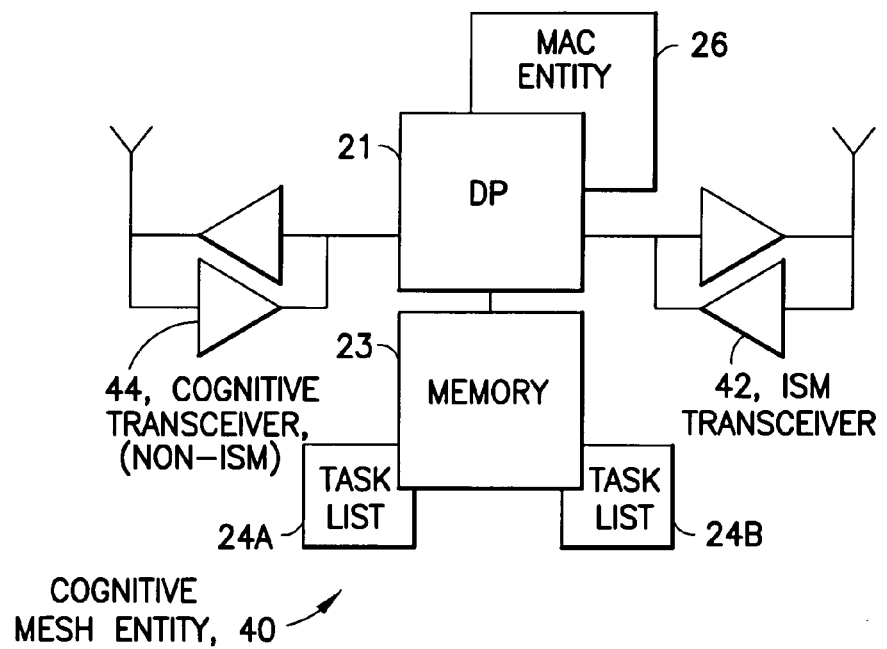
FIG. 17 shows a simplified block diagram of a two-transceiver cognitive mesh entity (CME).

FIG. 17 shows a simplified block diagram of a two transceiver CME 40. Similar to the cognitive STA 10A having the cognitive MAC entity protocol discussed above, each CME 40 is equipped with a plurality of transceivers, namely an ISM transceiver 42 and a non-ISM (cognitive) transceiver 44. The ISM transceiver 42 is particularly dedicated to operate on the shared ISM channel(s), while the non-ISM transceiver 44 functions as a cognitive transceiver capable of switching between different non-ISM frequency bands to handle data transmissions in a parallel fashion. One result of this architecture is that the CME 40 does not suffer from the problem of not being aware of the network status. Note again in this regard that in IEEE 802.11s it is assumed that the MPs are equipped with a single radio transceiver. As a result an MP operating on the common channel is unable to communicate with other MPs which are operating on the other channels. At the same time, a single radio (single transceiver) MP operating on one of the other channels is unaware of the network status on the common channel.

Note that the shared ISM channel is especially dedicated to only cognitive control and management purposes, and not to data transmissions conducted by cognitive STAs/CMPs/ CMAPs, i.e., CMEs. It is assumed that there should be always an available common control channel that is substantially free of any primary user deployment, so that the cognitive radios are always allowed and able to utilize it to negotiate about any possible deployable non-ISM data channel for their private data transactions. Existing ISM channels may be utilized by either independent neighboring wireless LAN hotspots, IEEE 802.11 STAs associated with the WMN, or legacy (i.e., non-cognitive) MPs/MAPs. The result is the deployment of a CWMN that comprises both cognitive and non-cognitive MPs/MAPs and various types of legacy IEEE 802.11 entities. The shared ISM channel(s) are set aside particularly for use by legacy non-cognitive 802.11/802.11s equipment.

Further in accordance with the exemplary embodiments of this invention the cognitive MAC entity 26 discussed above is incorporated into the CME 40 as the MAC entity 46 (see FIG. 17).

FIG. 17, discussed above, shows a non-limiting example of a CME 40. For the purposes of describing the exemplary embodiments of this invention a CDE and a CSE may each be constructed along the lines of the CME 40, as well as along the lines of the cognitive STA 10A shown in FIG. 1B, and preferably include the MAC entity 26 that functions as described above. Note that at one particular time a particular CME 40 may function as a CDE, and at another time it may function as a CSE.

Figure 18:
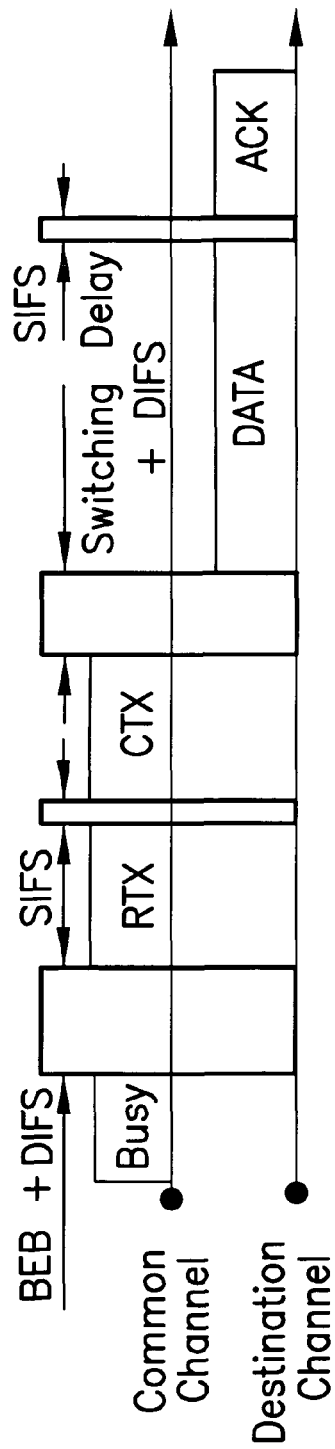
FIG. 18 is a depiction of a Common Channel Framework (CCF) concept in IEEE 802.11s.

Of particular interest is the non-compulsory CCF which is expected to be included in the final version of 802.11s amendment. FIG. 18 illustrates the basic concept of CCF.

Regarding the IEEE 802.11s CCF scheme, and as was noted above, both RTX and CTX control frames are transmitted over the common channel. The main reason for exchanging these two control frames on the common channel is that mesh entities, e.g. MPs/MAPs, do not have any a priori knowledge about deployed and/or preferred data channels of other mesh entities. As a result, source entities are required to transmit RTX frames over the common channel, and the destination entities of interest are expected to be waiting for a link layer connection establishment request. The current IEEE 802.11s CCF scheme suffers at least from a lack of knowledge about the network status when a tagged ME is currently operating on a channel other than the common channel. As a result, there is no guarantee that a particular RTX will lead to a successful link layer connection establishment.

The exemplary embodiments of this invention not only apply the enhanced cognitive MAC entity to the WMN, but also reduce the incurred control overhead due to the channel negotiation phase. Recalling that in IEEE 802.11s there is a particular common channel and a few parallel/orthogonal data channels that are chiefly dedicated to data transmission, the exemplary embodiments of this invention employ the ISM channel(s)/band(s) as common channel(s), while all available non-ISM frequency opportunities can be utilized for data transmissions by the CMEs 40.

An important aspect of this feature is the way in which CMEs 40 are configured to operate on non-ISM channels in an efficient fashion. In contrast to the cognitive 802.11 entities that were discussed above, such as the cognitive STAs 10A, it is more efficient for a CME 40 to select an available non-ISM frequency opportunity, based on a set of pre-defined spectrum sensing criteria, as its long-term residency channel (LTRC), and then subsequently inform its one-hop neighbor MEs of the selected LTRC. After choosing a particular non-ISM channel as the LTRC, the CME 40 keeps its non-ISM transceiver 44 tuned to the selected LTRC until, based on some criterion or criteria, it becomes evident that switching to another channel may be more beneficial. In the case of permanent channel switching, the CME 40 is mandated to announce the new non-ISM channel that is going to be utilized just after the switching announcement. Basically, permanent channel switching is announced using a designated frame referred to as a channel switching (CHSW) frame.

When the CME 40 wishes to commence a data transmission to one of its one-hop cognitive mesh neighbors (CMNs), due to the fact that it already knows the LTRC of the intended DE, the negotiation phase can be simply removed if the SE is also interested in the current residency channel of the DE. To accomplish the intended data transmission, the CME 40 switches its cognitive transceiver 44 from its LTRC to the LTRC of the DE. When the CME 40 decides to switch its cognitive transceiver 44 to another non-ISM channel to conduct a data transmission, it preferably reports this fact, and the corresponding absence period from its LTRC.

When the CME 40 decides to switch to another channel for a planned data transmission, it may use an eRTX frame sent over the shared ISM channel. As employed herein the CMEs 40, instead of using RTX/CTX, exchange new eRTX/eCTX control frames. The new eRTX/eCTX frames are similar to conventional RTX/CTX frames, but contain additional fields. Sending the eRTX frame over the shared ISM channel simultaneously achieves two goals: 1) establishment of a link layer connection with the intended DE, and 2) informing the one-hop neighbors about the absence (on-leave) status (absence from the LTRC) and its corresponding time duration. Note that the overhead due to CMEs 40 is reduced by the use of only one control frame (the eRTX control frame) to establish the intended link layer connection and to report the on-leave status for a particular time period.

By the use of these techniques MEs are provided with frequency agility to obtain higher channel capacity and to coordinate channel activities in such a way as to incur lowest level of overhead in the common control channel. In addition, on-leave information can be simply employed for destination non-ISM channel (the LTRC of the DE) reservation purposes, in a manner similar to the Duration/ID which is chiefly used for updating the network allocation vector (NAV) in 802.11 ISM channels. Here, the legacy IEEE 802.11 (and its 802.11s amendment) Duration/ID field of the eRTX and eCTX control frames are used for the shared ISM channel reservation (i.e., NAV update in ISM channel). In contrast, the on-leave information carried by a designated field in eRTX/eCTX is used for the destination non-ISM channel reservation in which the targeted cognitive data transmission is intended to be accomplished.

When the a priori knowledge about the CDE current LTRC is correct, upon reception of an eRTX which carries the correct CDE LTRC channel information the CDE can simply respond with an eCTX frame. This does not occur over the shared ISM channel, but instead on the current non-ISM LTRC of the CDE. In addition to eCTX, both DATA and ACK frames are preferably also sent on the CDE's LTRC. Based on this approach the usage of the shared ISM channel is minimized, as it need be utilized only for cognitive control frame exchange.

On the other hand, when the CSE has incorrect a priori knowledge about the LTRC of the desired CDE, upon reception of the eRTX frame by the CDE it becomes aware that the knowledge of the CSE about its current LTRC is incorrect and, as a consequence, the expected eCTX frame is delivered over the ISM channel. Afterwards the CSE receives the eCTX from the shared ISM channel and is informed of its incorrect knowledge concerning the LTRC of the intended CDE. In this circumstance the CDE is expected to place the correct information in the transmitted eCTX and, in a subsequent step, the CSE sends another eRTX frame over the shared ISM channel, but with the updated (and now correct) information. It can be noted that reception of an eRTX frame, which carries incorrect information, by entities that have no prior background knowledge of the LTRC of the CDE distributes incorrect information through the network. Thus, such undesirable cases are preferably addressed as quickly as possible. By sending another eRTX frame the CSE prevents distribution of inconsistent information through the wireless system. The CSE is then allowed to commence its data transmission over the LTRC of the CDE after sending the second eRTX, and an additional SIFS.

Another issue that should be addressed properly is the case where a CME decides to perform a temporary channel switching operation while at least one of its neighbors has already initiated backoff cycles intended for data transmission to the CME. Recall that the switching entities are required to announce their transition to the other channels in the form of eRTX frame if the transition is intended for a data transmission. Upon reception of a switching notification in the form of an eRTX, the cognitive entity or entities that are conducting the backoff cycles preferably suspend the counting down of backoff timers until the end of the on-leave period. In the case of a permanent switching operation there is no need to suspend the ongoing backoff cycle, since based on the cognitive scheme, CMEs are enforced to follow two rules when counting down their backoff counters:

1. If the backoff counter is loaded by an integer value B, for any subsequent countdowns before reaching '1' CME shall perform carrier sensing only on the shared ISM channel;
2. For the last countdown, i.e., when counting down from one to zero, both the shared ISM and the destination non-ISM channels are simultaneously sensed as being idle for at least a time duration equal to DIFS (i.e., Distributed Inter-Frame Space).

An important difference between the conventional backoff algorithm employed by IEEE 802.11s and the one described herein leads to a lower access delay in comparison to the existing multi-channel MAC protocols. In addition, the backoff technique is more robust to the hidden terminal problem, as compared to the 802.11s common channel framework.

It can be noted that a WMN may be considered to be substantially fixed in nature (i.e., experiencing little or no topology alteration) and, as a result, the use of distributed radio resource allocation techniques can be more effective in these kinds of wireless systems as compared to infrastructure-less mobile ad hoc networks. Although the mesh entities do not exhibit mobility (or at least they are intended to have no mobility during a long-term deployment), the wireless clients associated with the WMN are totally free to roam between different 802.11 hotspots and regional basic service areas (BSAs). Since 802.11s-based mesh entities are unaware of the network status when they are operating on a channel other than the common channel, both the multi-hop nature of the wireless system and the client mobility can lead to system throughput degradation and higher medium access delay. The exemplary embodiments of this invention that are described below address these various problems in a distributed/frequency-aware manner.

Described now are embodiments of the protocol core algorithm and the corresponding frame structures. Based on the enhanced MAC entity 26 and related features that were described above, the channel information (CI) field is added to the header of control 802.11 frames (e.g., announcement traffic indication message (ATIM), ready-to-send (RTS), clear-to-send (CTS), etc.) and management 802.11 frames (e.g., Beacon, Probe Response, etc.) and is used for advertising possibly deployable non-ISM channels. The definition of the position of new header field is important so that legacy 802.11 equipment are enabled to recognize/compile all legacy/known header fields to enable, for example, their NAVs to be correctly updated. In other words, the legacy STAs 10B should be able to deduce all required information from the legacy fields, and the new fields should be placed in such a way that they can be simply discarded by the legacy 802.11 STAs. One preferred location for the CI field is before the frame check sequence (FCS) field in all control/management frames.

As was noted above, in IEEE 802.11s two designated control frames, i.e., RTX and CTX, are used by the CCF scheme especially for link layer connection establishment between neighboring MEs. An aspect of this invention is to expand the RTX/CTX frame functionality to enable the CWMN to coordinate cognitive concurrent data transmissions in an efficient manner. These control frames are renamed as eRTX and eCTX, respectively (see FIGS. 20A and 20B). Note that by introducing eRTX/eCTX it is not intended to define any new frame type to the existing IEEE 802.11s standard. Instead the same frame types as for the legacy RTX/CTX are used, but with additional fields. When the CME 40 desires to set up a link layer connection with another CME using the cognitive common channel framework (CCCF), it sends out an eRTX frame over the shared ISM channel in which the CWMN is already established. There is no need for the CME 40 to advertise any non-ISM channels to the intended CDEs when requesting a link layer connection set up. In fact, each CME 40, based on a set of pre-defined channel sensing criteria, chooses a non-ISM channel as its LTRC and then tunes its non-ISM cognitive transceiver 44 to the selected LTRC. For establishing a link layer connection with a CME, the CSE switches to the LTRC of the CDE in order to accomplish the data transmission. For this reason the CSE places the channel information of the LTRC of the CDE within the eRTX to be delivered on the shared ISM channel. The destination channel information is included in a designated field, which may be referred to as a channel switching information element (CHSWIE). All one-hop neighbors of the CSE, by reception of the transmitted eRTX, are informed of the time period during which the cognitive neighbor will be on-leave. In fact, the CSE may be mandated to report its on-leave duration since if it is assumed that every CME 40 is equipped with only one non-ISM transceiver 44 that can be tuned to only one channel at a given time. By transitioning to another channel the CME 40 is unable to receive any data frames on its LTRC and, as a result, all CMEs that are interested in transmitting data frames to the channel switching CME need to be informed about the situation. For example, a CME 40 that has already initiated a backoff cycle for data transmission to another CME, which is going to switch temporarily from its LTRC to a different channel, should be informed to suspend the ongoing backoff cycle for the duration of the on-leave period. In addition, and as was noted above, the on-leave time duration is also employed for medium reservation and NAV update in the destination channel to which the CME desires to switch.

In accordance with this aspect of the invention there are defined two different types of channel switching that the CME 40 is allowed to perform. A first type of channel switching is referred to as temporary switching, and is accomplished when the CME 40 wants to perform a data transmission on a non-ISM channel other than its LTRC. The second type of channel switching is referred to as permanent switching, and is conducted by the CME 40 based on a set of pre-defined channel sensing criteria (e.g., it discovers that switching to another non-ISM channel can be more beneficial). Due to the fact that temporary channel switching is always initiated by the CSE 40 when it desires to perform a data transmission, the eRTX control frame is used to establish the intended link layer connection and to also simultaneously inform one-hop CMEs of the channel switching. Furthermore, the newly defined channel switching (CHSW) control frame is used to report permanent switching.

Figure 19:
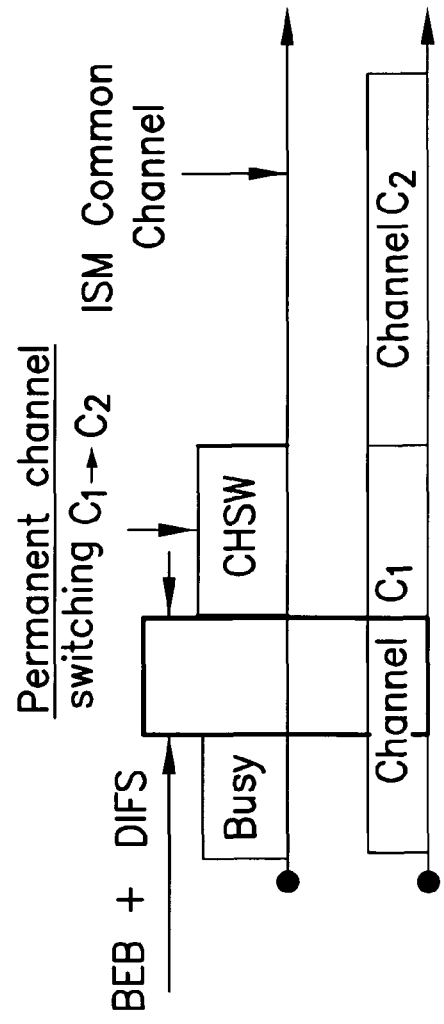
FIG. 19 shows an example of a permanent channel switching announcement using a CHSW frame transmitted on the shared ISM channel.

FIG. 19 illustrates a simple frame flow to announce a permanent switching of the CME 40 from channel C1 to channel C2. The permanent channel switching announcement is made using the CHSW transmitted on the shared ISM channel. As the first step, the switching CME 40 initiates a backoff cycle and performs continuous carrier sensing on the shared ISM channel. When the backoff counter reaches zero, the CME 40 sends out a CHSW frame on the shared ISM channel carrying the information of the non-ISM channel to which the switching is to be accomplished. Since there is no particular destination/receptor entity for the CHSW frame, the receiver address (RA) in the CHSW may be loaded with, for example, the frame initiator MAC address.

In addition to the aforementioned channel switching approaches, which are basically initiated by the cognitive entity (CE), another type of permanent channel switching is one initiated by the CME 40 that desires to transmit a set of data frames to more than one CDE. In this approach the CSE invites all of the intended CDEs to congregate in a particular non-ISM channel to receive the data frames in an integrated manner. In this way the CSE achieves a higher transmission capacity since it is able to accomplish all intended data deliveries using frame bursting. To attain this goal the CSE sends out a designated frame, which may be referred to as a switching invitation (SWinv) frame, on the shared ISM channel. The channel capacity improvement based on this technique may be referred to as welfare enhancement (WE).

It can be noted that this approach may also be employed for link layer multicasting. For the case of multicasting, the multicast MAC address is simply placed in the dedicated RA of the SWinv control frame. However, for the case of WE with multiple unicast data transmissions, multiple unicast MAC addresses are used to invite individual CDEs 40 to switch to the channel of interest. In the CCCF it is possible to combine unicast and multicast channel switching invitations in a single SWinv control frame, as explained below.

Figure 20A:
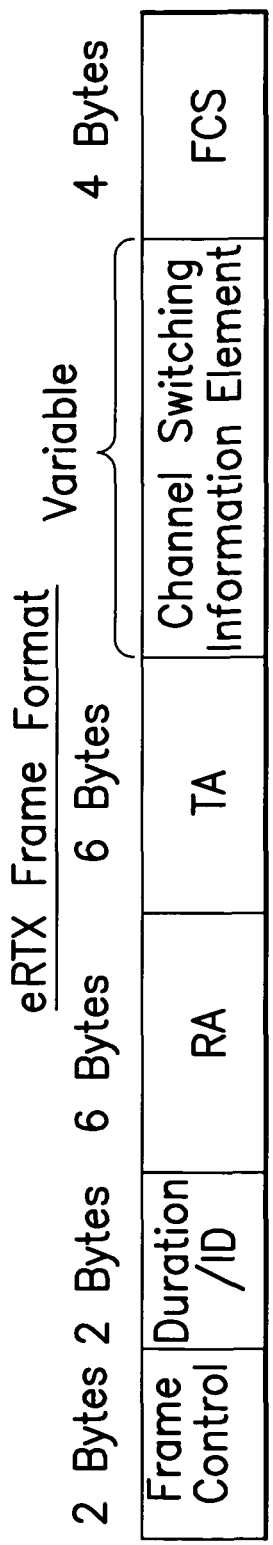
Figure 20B:
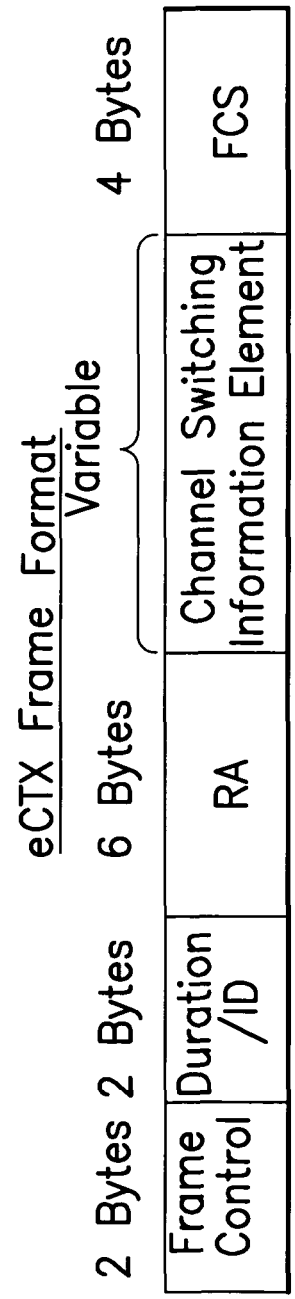
FIG. 20B shows the eCTX frame format.

FIGS. 20A and 20B illustrate the frame structure of the eRTX and eCTX, respectively. Similar to the legacy RTX and CTX control frames defined in IEEE 802.11s, an eRTX/eCTX includes an initial 2 byte frame control and 2 byte Duration/ID fields. With regard to how the Duration/ID field should be set for eRTX and eCTX, in essence the Duration/ID field of eRTX and eCTX frames is specially used for the shared ISM channel reservation and NAV update. On the other hand, the on-leave duration information carried by eRTX/eCTX frames, which reflects the on-leave status time duration of the CSE, is used for destination non-ISM channel reservation purposes.

The above-described new CHSWIE field is inserted into both the eRTX and eCTX control frames just before FCS field. For eRTX and eCTX frames the CHSWIE field has a variable length depending on the application scenario. In addition, it should be noted that RA in the eRTX frame can be loaded with either a unicast, a multicast, or a broadcast MAC address, whereas the same field in the eCTX frame can be loaded only with the unicast MAC addresses.

Figure 21:
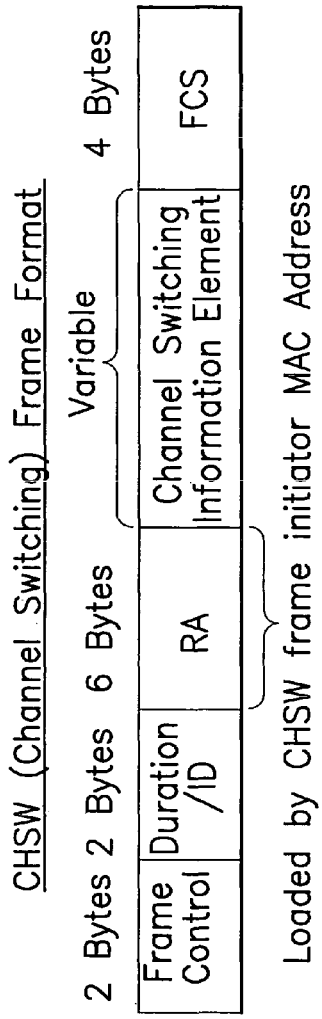
FIG. 21 shows a Channel Switching (CHSW) frame format in the CCCF.

FIG. 21 shows the frame format of CHSW control frame. The CHSW frame is used whenever the CME 40 decides to change its preferred LTRC channel permanently. The switching CME 40 sends out the CHSW control frame over the shared ISM channel, with RA field loaded with the MAC address of the CME sending the CHSW control frame. This strategy is somewhat similar to the 'CTS to self' technique defined in the IEEE 802.11g amendment, but with a different application.

Figure 22:
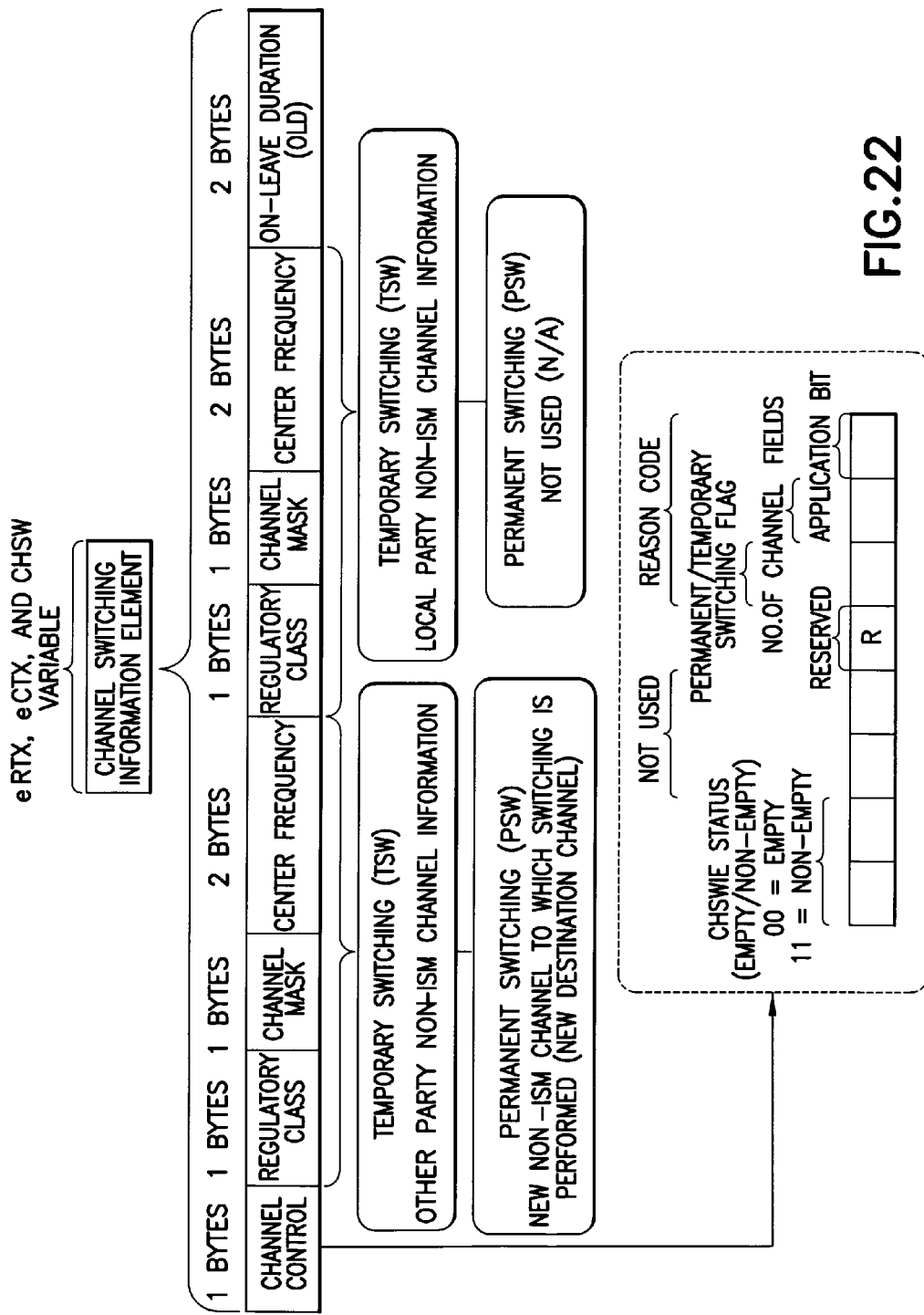
FIG. 22 depicts a channel switching information element (CHSWIE) structure in eRTX, eCTX, and CHSW frames.

FIG. 22 illustrates the detailed structure of the CHSWIE field used in eRTX, eCTX, and CHSW frames. Up to two CI sub-fields are included in a single CHSWIE. The CI structure was described above (see FIGS. 3 and 4 and the corresponding description of same). The first byte of the CHSWIE is dedicated to channel control (CC) in order to control the basic structure of the CHSWIE and its contents. In the CC field the first several bits are assigned to convey "CHSWIE status". Basically, if the CHSWIE has no appended CI sub-field, then the CHSWIE status is set to 00 (i.e., Empty CHSWIE); otherwise, the aforementioned bits are loaded with 11 (i.e., non-Empty CHSWIE). The next two successive bits in CC (i.e., the Proposition/Evaluation and Decision Bits) are not currently used in CCCF and, together with the subsequent reserved bit, may be used for future protocol development purposes. Note that the bits of the Reason Code in CCCF have different meanings than those shown in FIG. 22. The first bit, i.e. "Permanent/Temporary Switching Flag", is used to specify whether the intended channel switching is permanent or temporary. The second bit, i.e., "No. of Channel Fields", specifies the number of CIs that are appended to the CHSWIE. The last bit, i.e., "Application Bit", may be used in conjunction with the preceding bits.

When there is only one CI within the CHSWIE, as shown in FIG. 22, it may be used for permanent switching. In this case the CI sub-field carries the information of the non-ISM channel to which the permanent switching by the CME 40 is to occur. Generally, the Regulatory Class, Channel Mask and the channel Center Frequency are the three sub-fields that are included in every CI regardless of application or type of switching. When the CME 40 decides to permanently change its current LTRC and switch to another non-ISM channel, it places the information descriptive of the new channel within the CI of the CHSWIE appended in a CHSW frame, and sends it over the shared ISM channel (see FIG. 19).

On the other hand when there are two CIs within the CHSWIE, the CHSWIE field is intended to be used in either eRTX or eCTX (i.e., temporary switching). In this case the first CI represents the "other party non-ISM channel information" while the second CI corresponds to the "local party non-ISM channel information". By "other party" what is meant is the CME 40 to which the frame is addressed, i.e., the frame receptor. By "local party" what is meant is the frame initiator that is transmitting the frame over the wireless channel. As an example, for an eRTX frame the "other party" refers to the CDE and the "local party" refers to the CSE that is delivering the eRTX. As another example, for an eCTX frame the "other party" refers to the original CSE that desires to send data frames to a destination of interest, while the "local party" refers to the original CDE who is to receive data frames from the CSE.

The CHSWIE is terminated by a two bytes representing the on-leave duration (OLD) sub-field. The OLD sub-field specifies the time duration of absence of the switching CME from its LTRC. For temporary channel switching, the OLD subfield is loaded with a non-zero value between 0000 and FFFF (hexadecimal). In contrast, when the CME is performing a permanent switch to another LTRC the OLD sub-field is with FFFF. Basically, the Duration/ID field in both the eRTX and eCTX is employed for the shared ISM channel reservation and NAV update, while the OLD sub-field of the CHSWIE in eRTX and eCTX is used not only for on-leave duration reporting, but also for channel reservation and NAV update in the destination channel (e.g., the LTRC of the CDE). Therefore, it is important to define the way by which both the Duration/ID and OLD sub-fields are tuned when exchanging eRTX/eCTX control frames. For this reason, a consideration is made of all possible scenarios that can take place when the CME 40 desires to commence a data transmission with another CME based on different combinations of Reason Code bit pattern and CHSWIE status. The Tables shown in FIGS. 23A and 23B tabulate these diverse scenarios in an integrated fashion. Note in this regard that the most significant bit (MSB) of the Reason Code field specifies the type of switching, i.e., Temporary (TSW) or Permanent (PSW). In the case of Temporary Switching, the second bit determines the number of Channel Information (CI) fields located between Channel Control (CC) and the On-Leave Duration (OLD) field. Possible CI fields are other party and local party non-ISM CI. In the case of Temporary Switching, when two CI fields are included (i.e., when the second bit is '1'), the other party CI should be always before the local party CI (i.e., frame initiator CI). For example, for the case of an eCTX with two CI fields, the first CI corresponds to the CSE (other party) and the second CI corresponds to the CDE (local party or eCTX initiator) non-ISM channel information, respectively. Note that in these Tables, in addition to the content of existing CI fields (i.e., the carried information), the reason for which the CI field is included is also presented, where the content is underlined and the reason is placed within brackets [ ]. Further, by "CME's channel information" is meant "the CME's current non-ISM channel information".

For the case of the CHSWIE status=11 (FIG. 23A), when the CSE has a priori knowledge of the LTRC of the CDE, either correct or incorrect, its transmitted eRTX frame always carries a non-empty CHSWIE. As a result, the CHSWIE status bits of the CC the in CHSWIE are loaded with 11.

As a first exemplary case, assume that the Reason Code has been set to 000. This refers to temporary switching with only one appended CI sub-field. When this configuration is used in an eRTX control frame, the CI carries LTRC channel information of the CDE. To establish a link layer connection with a CME, the CSE needs to switch to the LTRC of the intended CDE. By transmitting an eRTX frame, the CSE sends its request to the CDE and, at the same time, it informs its one-hop cognitive mesh neighbors of its temporary transition to another non-ISM channel. In this case the LTRC channel information of the CDE should be included in the CHSWIE of the eRTX. On the other hand when the Reason Code is loaded with 010, not only the LTRC of the CDE but also the LTRC channel information of the CSE is included in the CHSWIE of the eRTX, where both appended LTRCs (CDE and CSE) are based on local knowledge of the CSE. It should be noted that inclusion of the LTRC channel information of the CDE in eRTX control frames is considered mandatory, while enclosure of the LTRC channel information of the CSE is considered to be optional. Also note that for the case of 000 the size of CHSWIE is seven bytes while for the case of 010 it is eleven bytes.

For the case of an eCTX, when the Reason Code is loaded with 000, the single appended CI carries the LTRC of the CSE. Basically, when the knowledge of the CDE concerning the LTRC channel information of the CSE is incorrect, the technique to obtain the correct information is to use integrate the LTRC channel information of the CSE in the received eRTX. Actually, the correct information can be obtained via the received eRTX if the CSE has previously included its LTRC channel information in the preceding eRTX. When the CDE notices that its knowledge about the LTRC of the CSE is incorrect, it preferably makes the required corrections to its local databases as soon as possible. In fact, the CDE will be unable to be informed about its incorrect knowledge unless the CSE includes its LTRC channel information in the eRTX frame to be sent to CDE (recall that inclusion of the LTRC channel information of the CSE in the eRTX is optional). In this way the CDE is enabled to determine that its knowledge regarding the LTRC of the CSE is incorrect and needs to be corrected. In addition to the importance of local knowledge correction, the CDE is also mandated to inform its one-hop CMNs of the correct LTRC channel information of the CSE. In fact, it is possible that the CDE has already distributed its incorrect knowledge among its one-hop CMNs, resulting in further undesirable distribution of the inconsistent/incorrect information. Therefore, when the CDE (by reception of an eRTX frame carrying the LTRC channel information of the CSE) is notified of its incorrect knowledge, it is required to place the correct information within its eCTX and send it out over the shared ISM channel.

As a next case, consider an eCTX with Reason Code equal to 001: temporary switching with only one appended CI sub-field. In this case the CI carries LTRC channel information of the CDE. When a CME transmits an eRTX frame over the shared ISM channel, it is required to place the LTRC channel information of its intended CDE within the CHSWIE field of the eRTX. If the CDE receives the delivered eRTX and notices erroneous appended information concerning its LTRC, instead of sending the eCTX on its non-ISM LTRC it instead sends out the eCTX over the shared ISM channel. In addition the CDE places its correct LTRC channel information in the eCTX to inform the CSE of its incorrect knowledge. In response, the CSE responds with another eRTX on the ISM channel that contains the LTRC correct information. Only after transmission of an eRTX with the correct channel information is the CSE allowed to commence its data delivery over the intended non-ISM channel (i.e., the LTRC of the CDE).

For the case of an eCTX carrying a Reason Code loaded with 010, not only is the knowledge of the CSE about the LTRC of the CDE incorrect, but the knowledge of the CDE about the LTRC of the CSE is also incorrect. In other words, this case includes both above-described scenarios, i.e., eCTX/000 and eCTX/001. The CDE is required to send the eCTX with both the LTRC correct channel information for the CSE and its own LTRC correct channel information. This frame is delivered on the shared ISM channel, and the CSE is then also required to send another eRTX frame over the shared ISM channel that contains the correct LTRC channel information for the CDE. The CSE then begins sending data frame(s) on the LTRC of the CDE after completion of sending the second eRTX (plus an additional SIFS).

Discussed now is the case of CHSWIE status=00 (FIG. 23B). When the CSE has no a priori knowledge about the LTRC of the CDE, either correct or incorrect, its transmitted eRTX frame carries an empty CHSWIE. As a result, the CHSWIE status bits of the CC in the CHSWIE are loaded with 00. In addition, and as far as the receiver side (i.e., CDE) is concerned, when both the appended LTRC channel information of the CDE in the eRTX, and the knowledge of the CDE about the LTRC of the CSE are correct, the CDE is allowed to respond by the use of an eCTX transmitted on its own non-ISM LTRC. In this case the CHSWIE of the eCTX is empty, with no further appended CI field.

Figure 24:
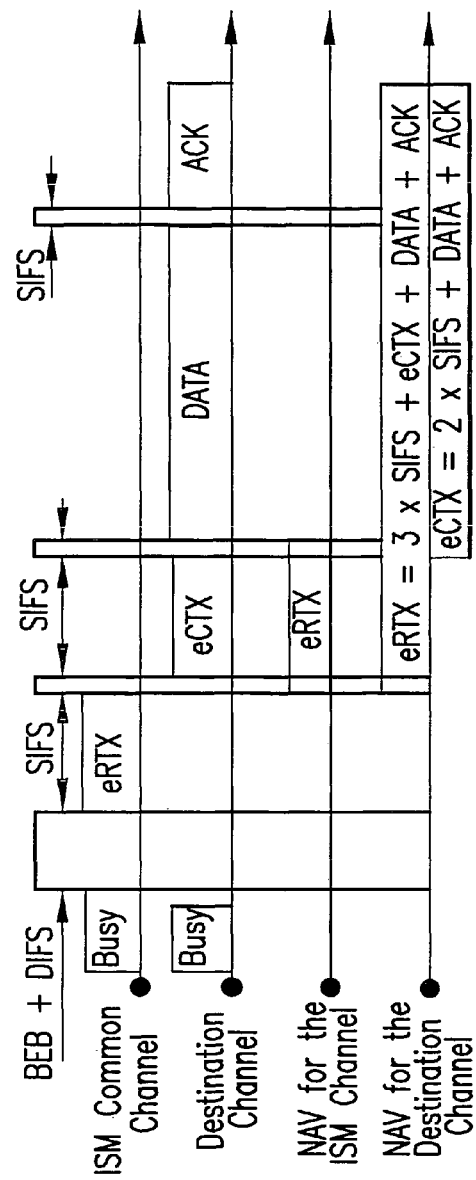
FIG. 24 shows a channel reservation using eRTX and eCTX, for a case where the knowledge of the CSE concerning the LTRC of the CDE is correct.

FIG. 24 shows the regular frame exchange between CSE and CDE when the knowledge of the CSE concerning the LTRC channel information of the CDE is correct. The CSE first initiates a backoff cycle and commences counting down the backoff counter. Before reaching one, for every countdown CSE is required to perform carrier sensing only on the shared ISM channel. When counting down from one to zero the CSE is expected to perform carrier sensing on both the ISM and on the LTRC non-ISM channels of the CDEs. Upon reaching zero the CSE sends an eRTX over the shared ISM channel. Since in this scenario the included information in the eRTX regarding LTRC of the CDE is correct, the CDE responds with an eCTX on its LTRC channel. Subsequently, data and ACK frames are also exchanged over the LTRC of the CDE. As was mentioned above, the scenario shown in FIG. 24 corresponds to the case where the knowledge of the CSE about the LTRC of the CDE is correct. In this scenario the CSE includes only the LTRC information of the CDE in the CHSWIE field of the eRTX which is being transmitted over the shared ISM channel. When only the LTRC channel information of the CDE is included in the eRTX the Duration/ID field in the eRTX is loaded by eCTX (with 7 bytes CHSWIE)+2×SIFS, while the OLD sub-field in the CHSWIE is loaded by eCTX (with 1 byte CHSWIE)+DATA+ACK+3×SIFS. In this scenario the transmitted eCTX on LTRC of the CDE carries an empty CHSWIE for which the Duration/ID field is loaded by 00, and the OLD sub-field in the CHSWIE is loaded by DATA+ACK+2×SIFS. The reason that the CSE reserves the ISM channel for a time period equal to eCTX (with 7 bytes CHSWIE)+2×SIFS is due to the fact that the CSE should take into account the case when its knowledge of the LTRC of the CDE is totally incorrect, and thus where the intended CDE responds with an eCTX on the shared ISM channel accompanied by a non-empty 7 byte CHSWIE with the correct LTRC channel information for the CDE. In this case the shared ISM channel should have been reserved by CSE beforehand to prevent any possible loss of channel control. If the ISM channel is reserved for less than the aforementioned period, it is possible that another ME may acquire control of the shared ISM channel, and the above tagged CSE then needs to re-initiate the entire eRTX/eCTX negotiation phase from the beginning.

Figure 25:
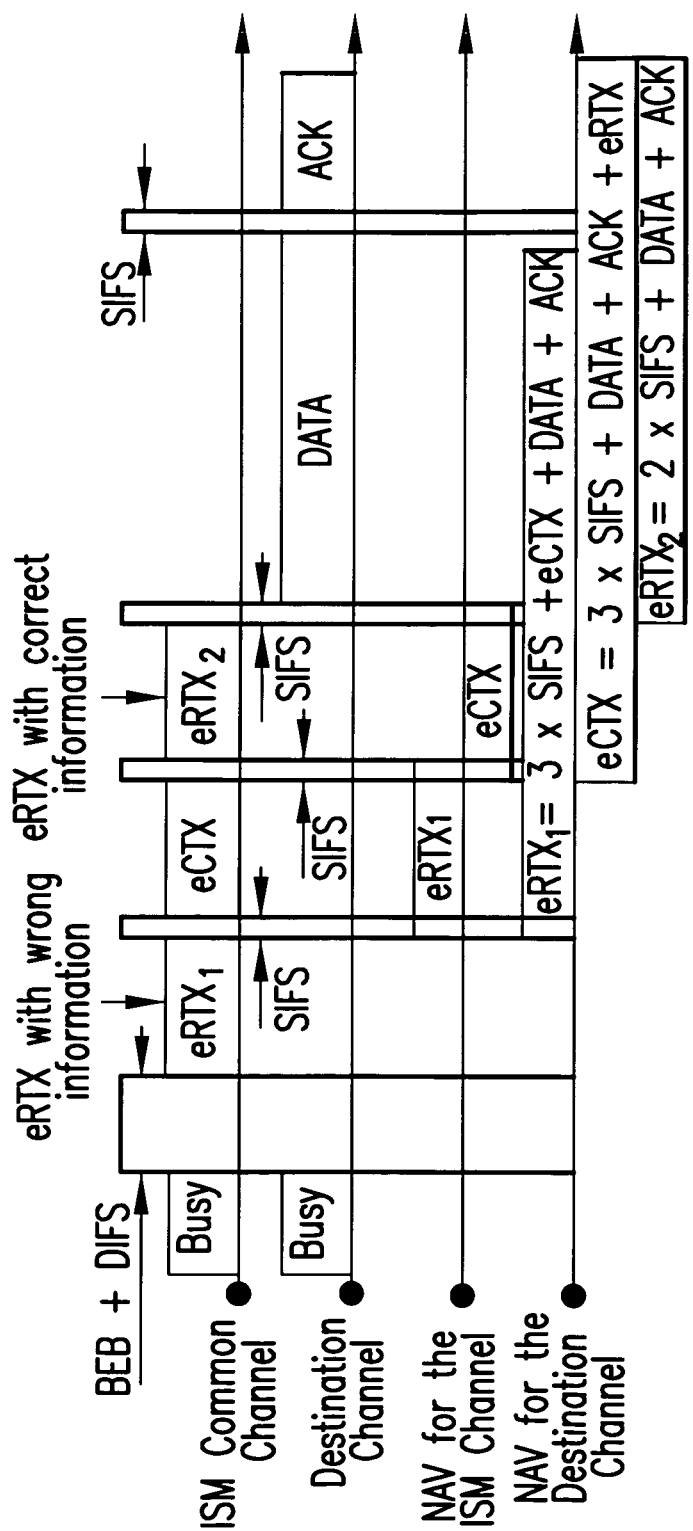
FIG. 25 shows a channel reservation using eRTX and eCTX for a case where only the LTRC channel information of the CDE is included in the eRTX, while the knowledge of the CSE of the LTRC of the CDE is incorrect.

FIG. 25 shows the case when only the LTRC channel information of the CDE is included in the eRTX, while the knowledge of the CSE of the LTRC of the CDE is incorrect.

In this case the CSE appends only the LTRC channel information for the intended CDE in the CHSWIE of the eRTX. In addition, the knowledge of the CSE about LTRC of the CDE is incorrect. As a result, the CDE responds with an eCTX on the shared ISM channel to inform the CSE of its incorrect knowledge regarding the LTRC of the CDE. When the CSE receives the eCTX from the shared ISM channel it is accordingly notified about its incorrect knowledge and, as a result, it sends out another eRTX on the common ISM channel with corrected LTRC information of the CDE. Upon successful reception of the second eRTX with the corrected LTRC information, and after an additional SIFS, the CSE is allowed to start transmission of its data frames on the (correct) LTRC of the CDE. As it was pointed out above, when only the LTRC channel information of the CDE is included in eRTX the Duration/ID field in the eRTX is loaded with the eCTX (with 7 bytes CHSWIE)+2×SIFS, while the OLD sub-field in the CHSWIE is loaded with eCTX (with 1 byte CHSWIE)+DATA+ACK+3×SIFS. On the other hand, based on this scenario the transmitted eCTX on the shared ISM channel carries a CHSWIE loaded with the correct LTRC channel information of the CDE for which the Duration/ID field is loaded with eRTX (with 7 bytes CHSWIE)+SIFS and the OLD sub-field in the CHSWIE is loaded with eRTX (with 7 bytes CHSWIE)+DATA+ACK+3×SIFS. For the second eRTX the Duration/ID field is loaded with 00, while the OLD sub-field is loaded with DATA+ACK+2×SIFS.

Figure 26:
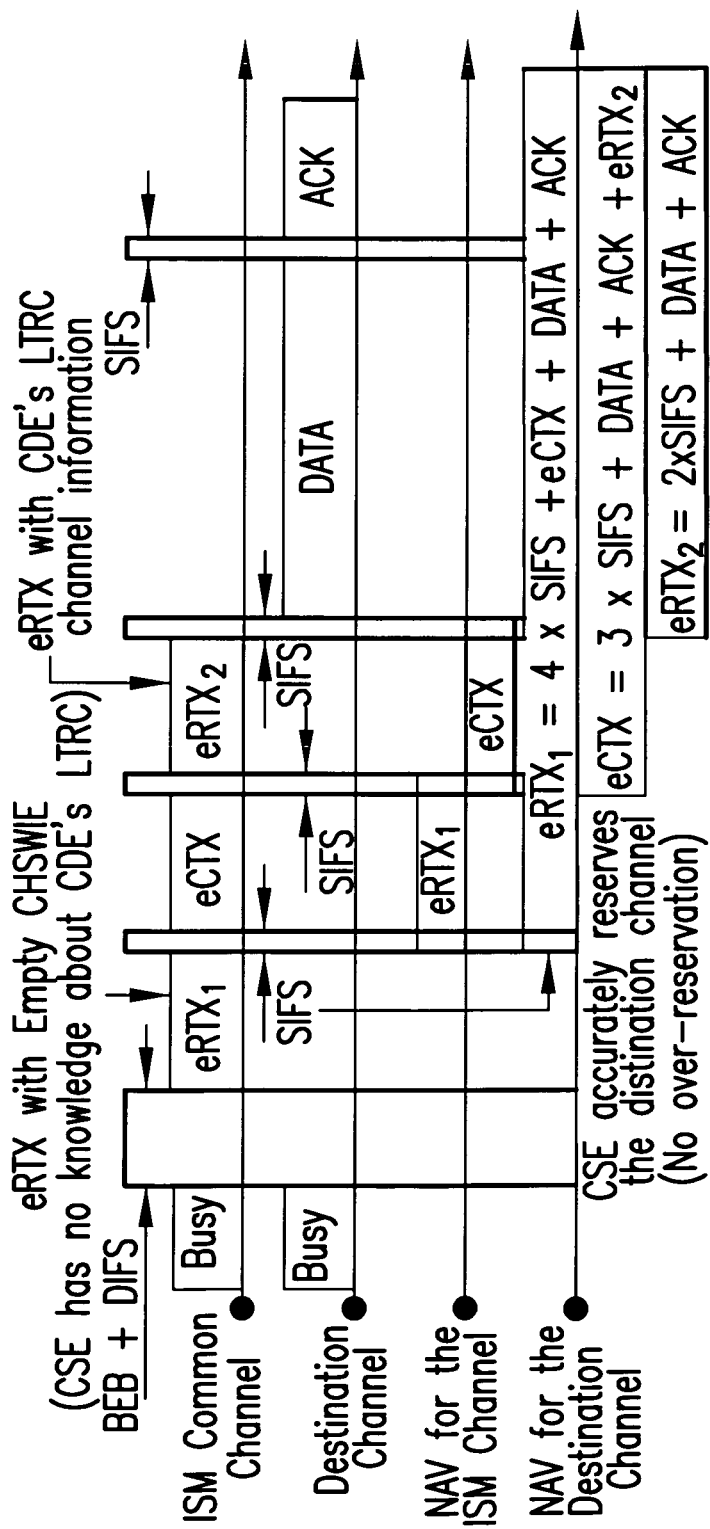
FIG. 26 shows the channel reservation using eRTX and eCTX when the CSE has no a priori knowledge of the LTRC of the CDE.

FIG. 26 shows the channel reservation using eRTX and eCTX when the CSE has no a priori knowledge of the LTRC of the CDE. When the CSE has no a priori knowledge about the LTRC of the intended CDE it simply sends an eRTX frame with an empty CHSWIE on the shared ISM channel to inform the CDE of its desire to establish a link layer connection. Upon reception of an eRTX frame with an empty CHSWIE the CDE replies with an eCTX on the shared ISM channel carrying its current LTRC channel information. When the CSE receives the eCTX it sends another eRTX on the shared ISM channel accompanied by LTRC channel information of the CDE in the CHSWIE field. After completion of second eRTX transmission the CSE commences data delivery on the targeted non-ISM channel (i.e., on the LTRC of the CDE).

In the case depicted by FIG. 26 the Duration/ID field of first eRTX is loaded with eCTX (with 7 bytes CHSWIE)+2×SIFS while the OLD sub-field in the CHSWIE is loaded with eCTX (with 7 bytes CHSWIE)+eRTX (with bytes CHSWIE)+DATA+ACK+4×SIFS. The transmitted eCTX on the shared ISM channel carries a CHSWIE loaded with the LTRC channel information of the CDE for which the Duration/ID field is loaded with eRTX (with 7 bytes CHSWIE)+SIFS and the OLD sub-field in the CHSWIE is loaded with eRTX (with 7 bytes CHSWIE)+DATA+ACK+3×SIFS. For the second eRTX the Duration/ID field is simply loaded with 00, while the OLD sub-field is loaded with DATA+ACK+2×SIFS.

Figure 27:
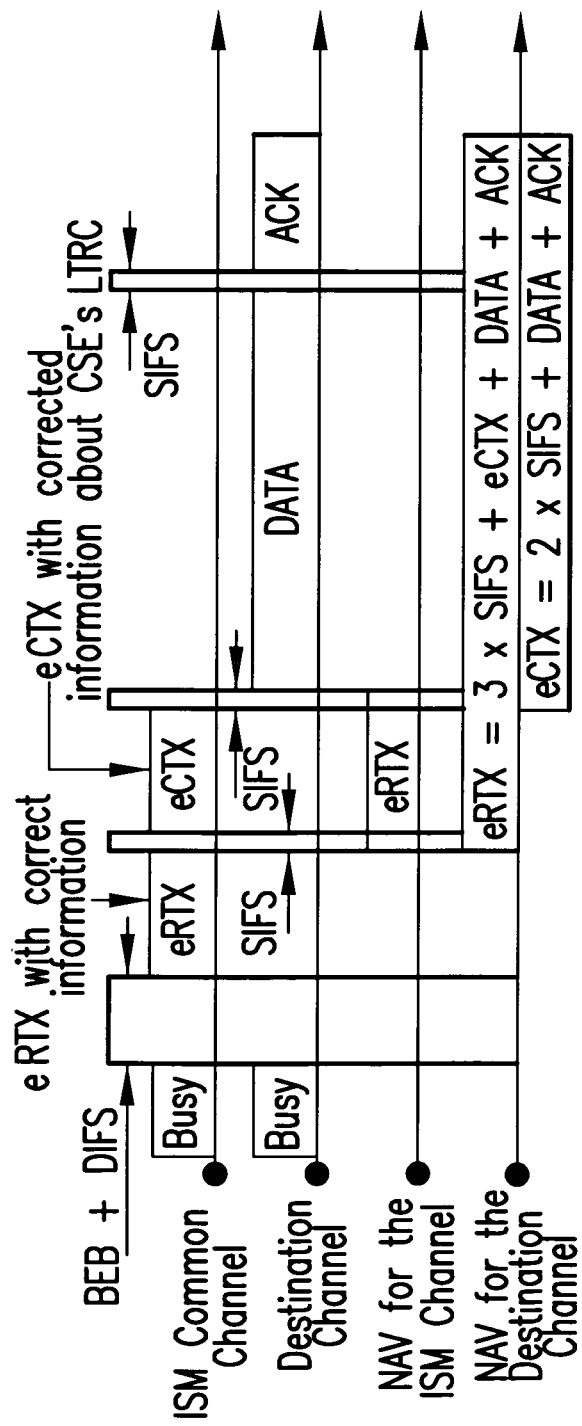
FIG. 27 shows the channel reservation using eRTX and eCTX when the knowledge of the CDE of the LTRC of the CSE is incorrect.

FIG. 27 shows the case where the CSE includes both CDEs and LTRC channel information in the eRTX frame to be delivered on the shared ISM channel. In this case it is assumed that the appended LTRC channel information of the CDE in the eRTX is correct, while the knowledge of the CDE about the LTRC of the CSE is incorrect. Since the CSE has included its LTRC channel information in the eRTX, the CDE is informed that its knowledge concerning the LTRC of the CSE is incorrect. As a result, the CDE responds using an eCTX delivered on the shared ISM channel appended with the correct LTRC channel information of the CSE. In response, and after a SIFS, the CSE commences transmission of data frames over the LTRC of the CDE.

For the case shown in FIG. 27 the Duration/ID field of eRTX is loaded with the eCTX (with 11 bytes CHSWIE)+2×SIFS, while the OLD sub-field in the CHSWIE is loaded with eCTX (with 1 byte CHSWIE)+DATA+ACK+3×SIFS. The transmitted eCTX on the shared ISM channel carries a CHSWIE loaded with the LTRC channel information of the CSE, for which the Duration/ID field is loaded with '00' while the OLD sub-field in the CHSWIE is loaded with DATA+ACK+2×SIFS.

Figure 28:
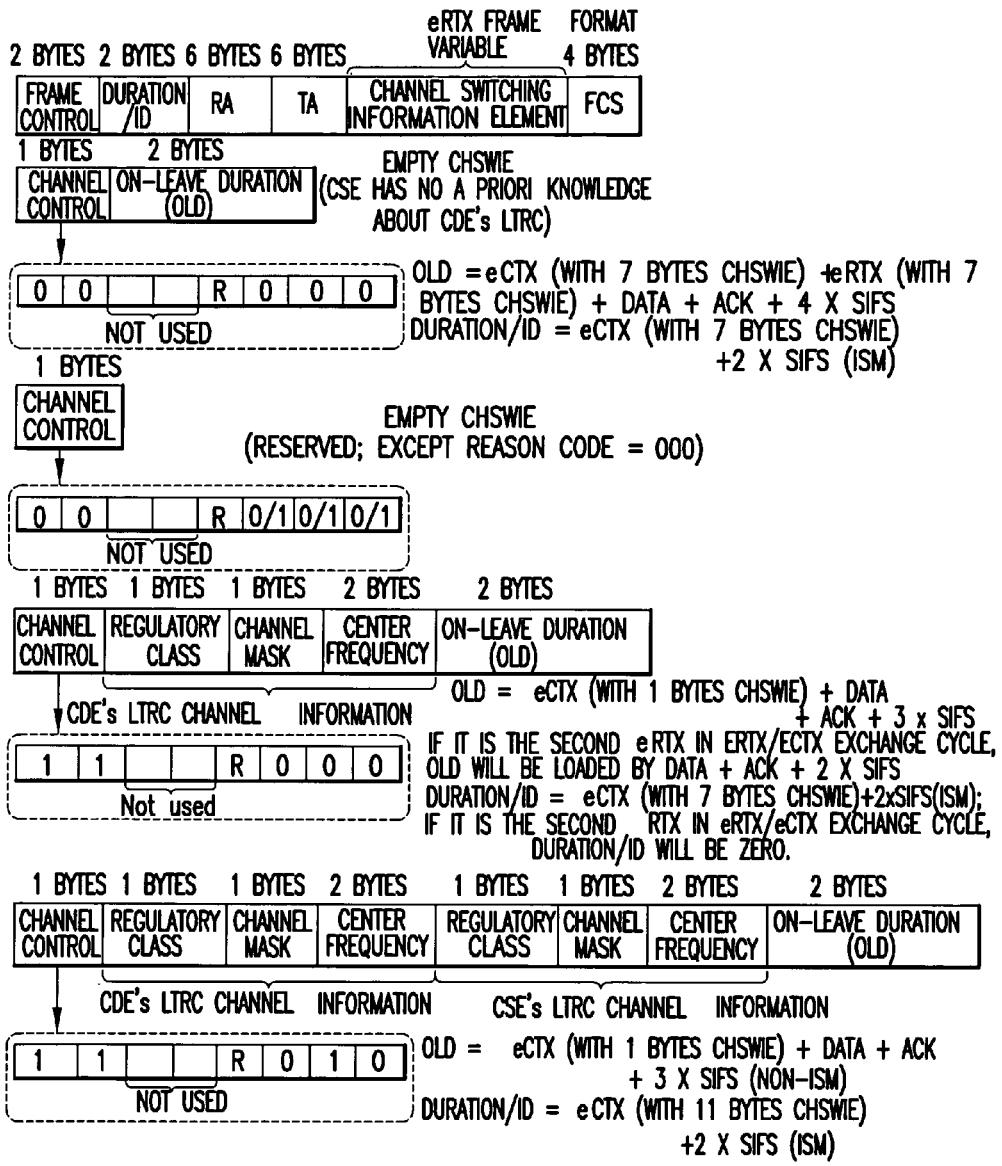
FIG. 28 illustrates the eRTX CHSWIE possible configurations and the corresponding Duration/ID and OLD sub-field setup.
Figure 29:
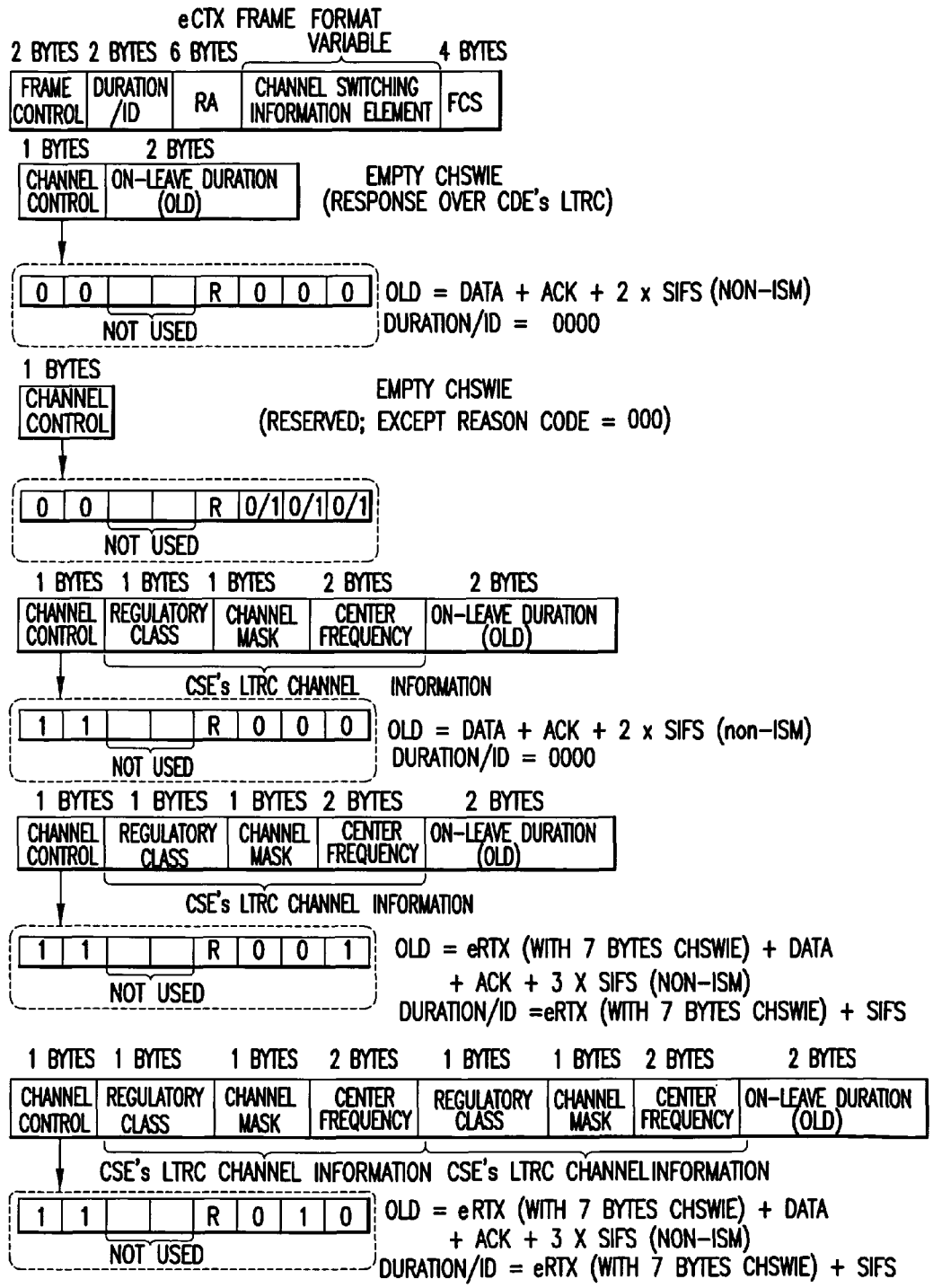
FIG. 29 illustrates the eCTX CHSWIE possible configurations and the corresponding Duration/ID and OLD sub-field setup.

FIGS. 28 and 29 illustrate all possible CHSWIE configurations for both eRTX and eCTX, including their Duration/ID and OLD sub-field setups.

As was described above, a designated control frame referred to as SWinv is defined to be employed for Unicast Welfare Enhancement (UWE) and Multicast Welfare Enhancement (MWE). Note also that the SWinv control frame may be used as well for inviting cognitive members of a multicast group to gather or congregate in a particular non-ISM channel (which may be totally different than their own respective LTRC channels). Based in large part on the UWE concept the CME 40 is allowed to invite its intended CDEs to gather in a certain non-ISM channel. If the invitation of the CSE is accepted by the entire group of CDEs the CME 40 (i.e., the CSE in this case) is enabled to use frame bursting to achieve a significantly higher channel throughput (channel utilization) by successively transmitting data frames addressed to the invited CDEs. For the multicasting case (i.e., MWE), and since the CME 40 is not allowed to deploy the shared non-ISM channel for cognitive unicast/multicast data transmission, and further since there is no way to perform multicasting over multiple non-ISM channels at the same time (due to the presence of a the single non-ISM transceiver 44), the multicast CSE invites members of its intended multicast group to gather in the particular non-ISM channel.

Figure 30:
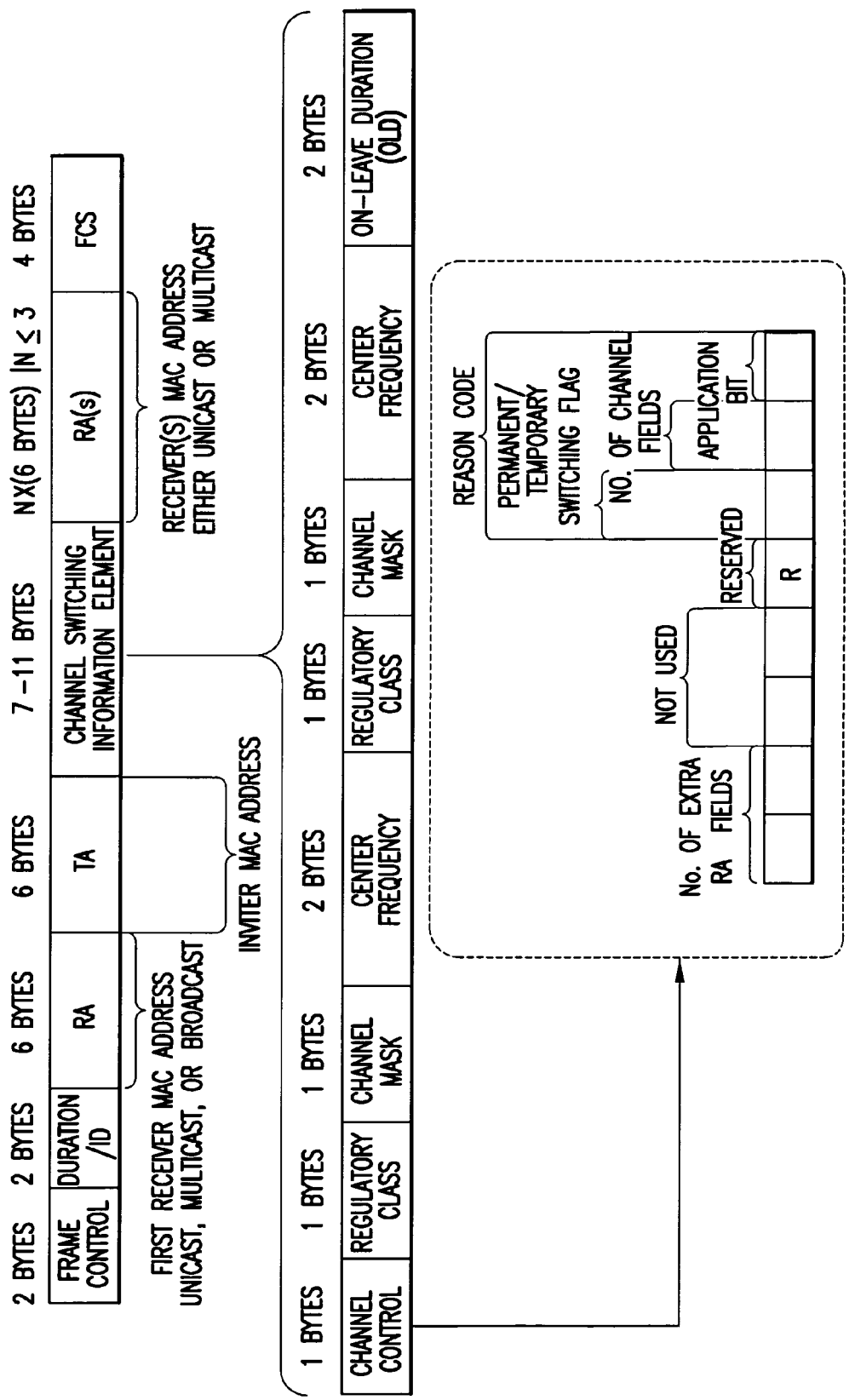
FIG. 30 illustrates in detail the frame format of a SWinv control frame and its associated CHSWIE.

FIG. 30 illustrates the detailed frame format of the SWinv and its CHSWIE. It may be noticed that the design of the SWinv frame structure enables legacy 802.11 and 802.11s equipment to interpret all of the appended legacy fields without difficulty. Note that between the Duration/ID and transmitter address (TA) fields the first receiver address (RA) is positioned. This address can be a unicast, a multicast, or a broadcast MAC address. In CHSWIE field up to two CI fields may be included, depending on the application and addressing scenario. Subsequent to the CHSWIE field up to three further RAs may be included. These RAs can be either unicast or multicast MAC addresses. The SWinv is terminated with a conventional FCS. TA represents the MAC address of the inviting CME 40, while the RAs hold invited CME MAC addresses. In FIG. 30 the CC sub-field of CHSWIE in the SWinv is also illustrated. The first two bits of the CC are dedicated to a "No. of Extra RA Fields". Using these two bits the number of additional RA fields that are included in the SWinv after the CHSWIE is specified to the receiver. For example, 00: No extra RA fields, 01: one extra RA fields, 10: two extra RA fields, 11: three extra RA fields. Several following bits are presently not used. As before, the Permanent/Temporary Switching Flag, No. of Channel Fields, and Application Bit are used to differentiate between diverse unicast/multicast scenarios. The Permanent/Temporary Switching Flag specifies the type of switching for the case of multicasting. It should be noted that for unicast switching (i.e., UWE), channel switching is always performed permanently. As a result the OLD sub-field in the CHSWIE is not needed to declare the amount of time invited CDEs are required to switch to the destination non-ISM channel. Therefore, if the planned switching is intended for only the UWE, the OLD sub-field may be simply loaded by FFFF Hex. On the other hand, for multicast-related switching scenarios the OLD sub-field may be set to any needed value. If the Permanent/Temporary Switching Flag is loaded with a one, then the OLD sub-field is preferably loaded with FFFF Hex.

Note that by the use of the SWinv it is possible to combine multicast and unicast switching invitations into a single control frame. As a result the incurred overhead due to successive switching invitations can be reduced. Since it is possible to append both multicast and unicast switching invitations into a single SWinv at the same time, a plurality of CI fields are used to carry the destination channel related information for both the multicast and unicast cases.

A description is now provided of exemplary different use case applications of the SWinv control frame.

Figure 31:
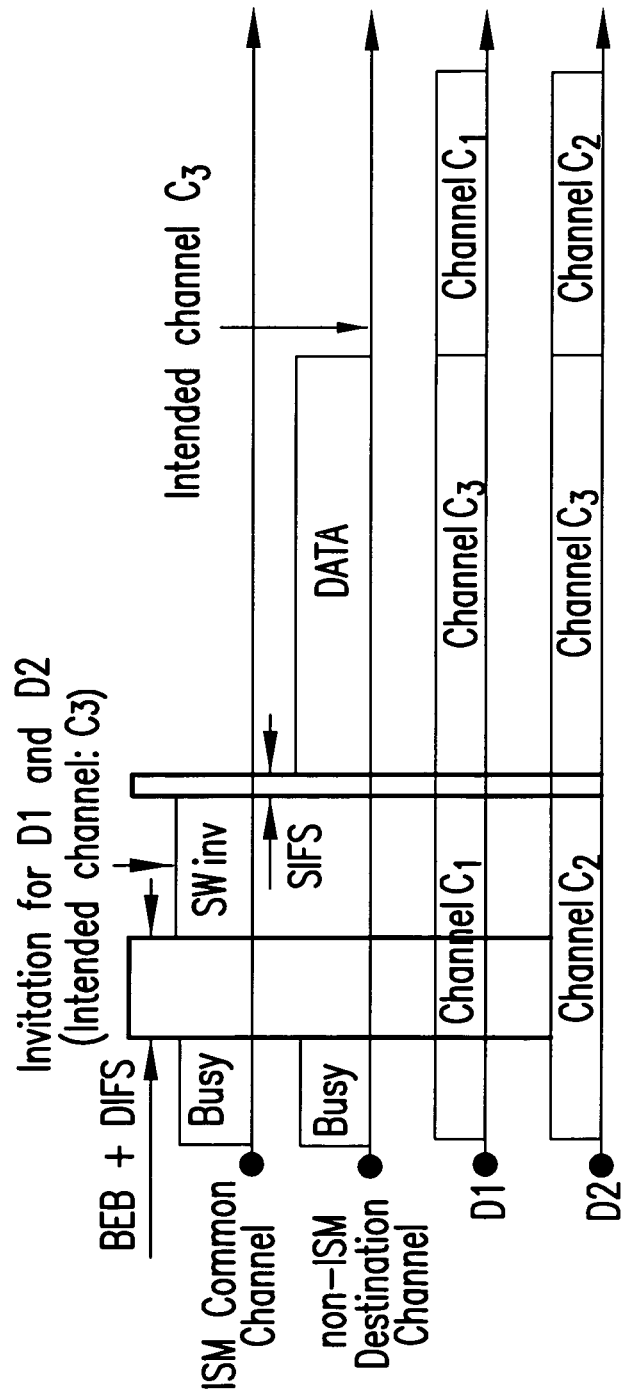
FIG. 31 illustrates exemplary message flow for a multicast temporary channel switching use case.

A first use case relates to multicast temporary channel switching. When the CME 40 intends to invite members of a multicast group to switch temporarily to a particular non-ISM channel it sends a SWinv with No. of Extra RA Fields set to '00', Permanent/Temporary Switching Flag15 set to '0' (indicating Temporary), No. of Channel Fields16 set to '0', and the OLD sub-field loaded with a value between 0 and FFFF Hex. The multicast physical (MAC) address is placed in the first RA field (the RA field between the Duration/ID and TA fields). The destination non-ISM channel information is loaded into the single appended CI sub-field in CHSWIE. OLD is loaded by MULTICAST_DATA+SIFS. The transmitter address (TA) is loaded with the CSE (inviting ME) MAC address. The Duration/ID field of SWinv is loaded with '00'. Upon transmission of the SWinv on the shared ISM channel, plus an extra SIFS, the multicast CSE commences delivering the multicast data frame(s) on the destination non-ISM channel. No acknowledgment is required to be returned by CDEs after completion of multicast data transmission. In addition, invited CDEs are not required to transmit a CHSW control frame when switching to the intended destination channel. FIG. 31 shows the timing and frame exchange pattern for multicast invitation/transmission in more detail.

In FIG. 31 the multicast CSE commences a backoff cycle based on the legacy DCF access scheme. Before the backoff counter reaches one the CSE performs carrier sensing only on the shared ISM channel, while when counting down from one to zero it performs the carrier sensing procedure for both the shared ISM and the destination non-ISM channels. When the channels are sensed as being idle for a period of time equal to at least DIFS, the CSE transmits a SWinv on the shared ISM channel to invite two members of a multicast group (i.e., D1 and D2) to switch to the destination non-ISM channel, C3. Both invited CDEs switch to the C3 channel to receive the multicast data frame. Upon completion of data reception, both CDEs switch back to their initial LTRCs.

A second use case relates to multicast permanent channel switching. When the CME 40 intends to invite members of a multicast group to switch permanently to a particular non-ISM channel, it sends a SWinv with No. of Extra RA Fields set to '00', Permanent/Temporary Switching Flag set to '1', and No. of Channel Fields set to '0'. The multicast MAC physical address is placed in the first RA field. The destination non-ISM channel information is loaded into the single appended CI sub-field in the CHSWIE. The TA is loaded with the CSE (inviting ME) MAC address. No extra RA field is appended after the CHSWIE. In this case, two different strategies may be used for multicast permanent channel switching.

Figure 32:
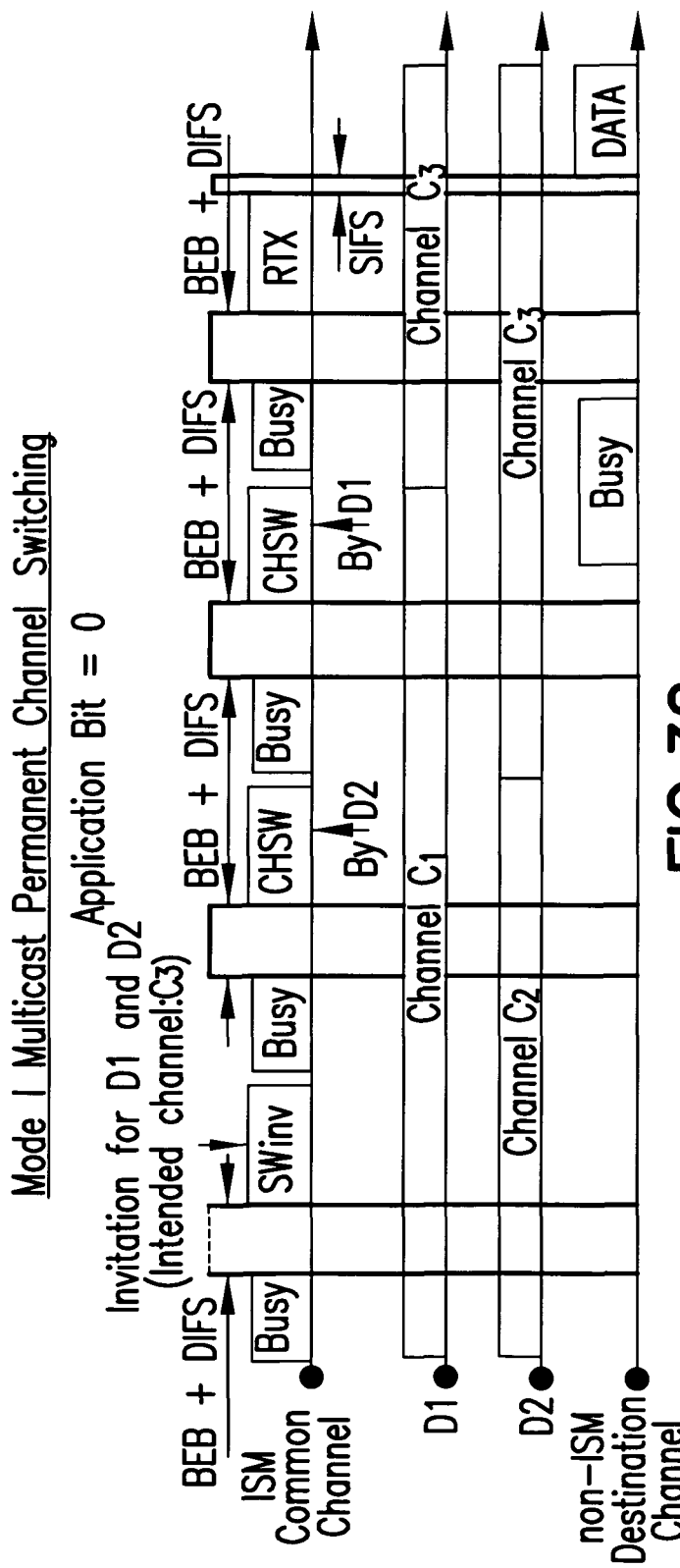
FIG. 32 illustrates exemplary message flow for a Mode I multicast permanent channel switching use case.

In the first strategy, which may be referred to as Mode I Multicast Permanent Channel Switching, the multicast CSE initiates a backoff cycle based on the legacy DCF access scheme. Before the backoff counter reaches one the CSE performs carrier sensing only on the shared ISM channel, while when counting down from one to zero the CSE performs the carrier sensing procedure for both the shared ISM and the destination non-ISM channels. When the channels are sensed idle for at least DIFS, the CSE transmits a SWinv on the shared ISM channel to invite multicast members to switch (permanently) to the destination non-ISM channel. In this mode the Duration/ID field is loaded with 00. In addition, the OLD sub-field of the CHSWIE in the SWinv is also loaded with 00. To inform the CDEs that the intended multicast permanent channel switching is initiated based on Mode I the CSE loads the Application Bit of the CC sub-field in the SWinv control frame with zero. Upon completion of the SWinv transmission, the CSE loads a switching timeout timer with a maximum possible busy period in the shared ISM channel (see IEEE 802.11/1999 standard) and waits for the CDEs to switch to the destination channel. Whenever an invited CDE decides to switch to the destination channel, it is required to perform carrier sensing on the shared ISM channel. Each invited CDE sends a CHSW frame over the ISM channel to inform its one-hop cognitive mesh neighbors (and specially the multicast CSE) that it is permanently switching to the new channel, and is thus selecting it as its new LTRC. Upon expiration of the switching timeout timer CSE commences transmission of multicast data frames using a regular RTX control frame with the RA loaded with the multicast MAC address. For transmission of the RTX frame the CSE is performs carrier sensing on both shared ISM and the destination non-ISM channels. FIG. 32 illustrates the above described interactions in more detail.

Figure 33:
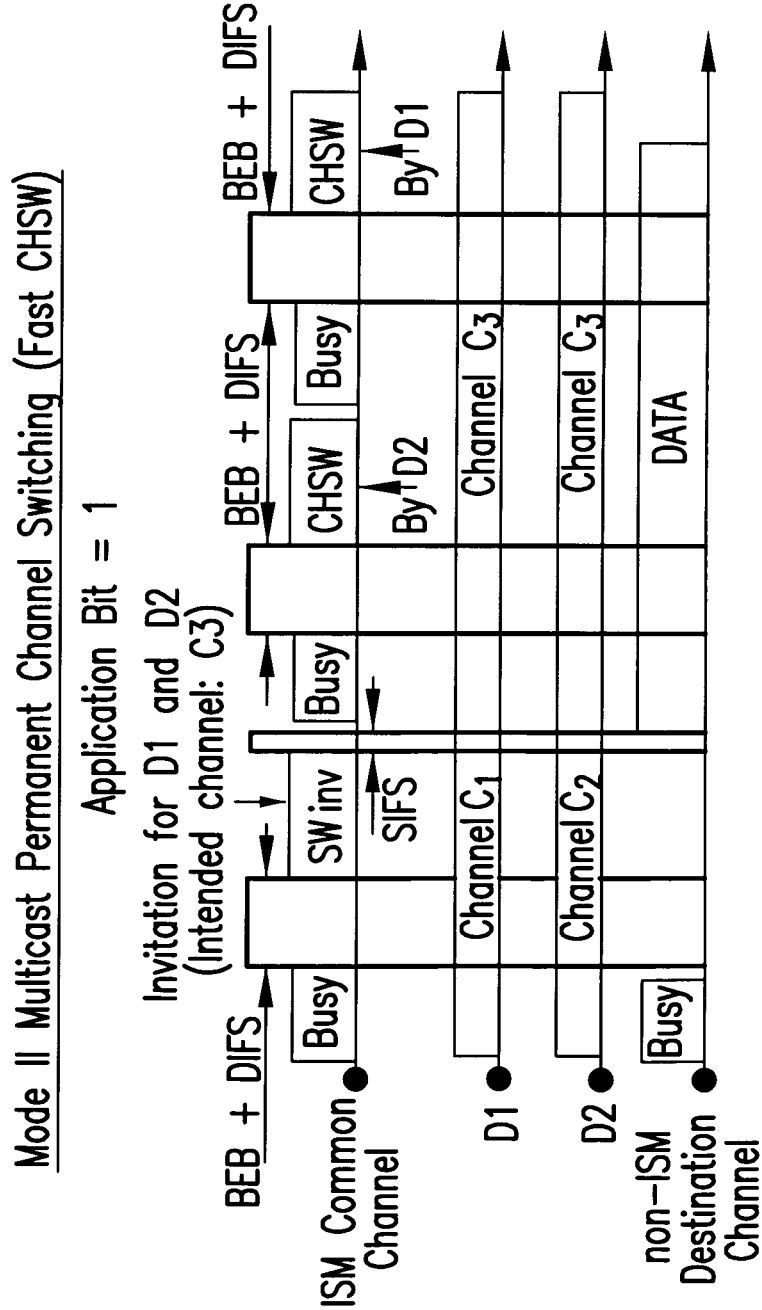
FIG. 33 illustrates exemplary message flow for a Mode II multicast permanent channel (fast) switching use case.

In the second strategy, which may be referred to as Mode II Multicast Permanent Channel Switching (Fast CHSW), the multicast CSE initiates a backoff cycle based on the legacy DCF access scheme. Before the backoff counter reaches one the CSE performs carrier sensing only on the shared ISM channel, while when counting down from one to zero the CSE performs the carrier sensing procedure for both the shared ISM and the destination non-ISM channels. When the channels are sensed idle for at least DIFS, the CSE transmits a SWinv on the shared ISM channel to invite multicast members to permanently switch to the destination channel. In this second mode the Duration/ID field of the SWinv is loaded with 00 while the OLD sub-field of the CHSWIE is loaded with MULTICAST_DATA+SIFS. To inform the CDEs that the intended multicast permanent channel switching is initiated based on Mode II the CSE loads the Application Bit of the CC sub-field in the SWinv control frame with a one. In this mode, after completion of SWinv transmission plus an SIFS, all CDEs are required to switch to the destination non-ISM channel. Switching to the new non-ISM channel is accomplished before informing one-hop cognitive mesh neighbors of selecting the destination channel as the new LTRC using the designated CHSW control frames. In parallel with the multicast data frame reception the multicast CDEs may also contend for the shared ISM channel to transmit the required CHSW frames to inform their one-hop neighbors of the selection of the non-ISM channel as their new LTRC. In this mode there is no need for the CSE to initiate the switching timeout timer. This type of multicast switching is well suited for use in fast channel switching cases, such as when the multicast MSDU(s) are sensitive to the incurred access/transmission delay (i.e., for voice or video traffic). FIG. 33 illustrates this above-described use case.

A third use case relates to unicast welfare enhancement (UWE). When the CME 40 intends to invite another single CME 40 to permanently switch to a particular non-ISM channel it sends a SWinv with the No. of Extra RA Fields set to 00, the Permanent/Temporary Switching Flag set to 1, the No. of Channel Fields set to 0 and the OLD sub-field loaded with FFFF Hex. When the CME intends to invite a plurality of other CMEs 40 to permanently switch to a particular non-ISM channel it sends a SWinv with the No. of Extra RA Fields loaded with 01, 10, or 11, the Permanent/Temporary Switching Flag set to 1, the No. of Channel Fields set to 0 and the OLD sub-field loaded with FFFF Hex. The destination non-ISM channel information is loaded into a single appended CI sub-field in the CHSWIE. The TA is loaded with the address of the CSE (inviting ME). The Duration/ID field of SWinv is loaded with 00. By the use of the SWinv the CSE is able to invite up to four CMEs to switch to the destination non-ISM channel. In this case the Application Bit in the CC sub-field is not used. Subsequent to receiving the SWinv the invited CDEs contend for the shared ISM channel to transmit CHSW frames in order to inform their one-hop cognitive neighbors of the permanent switch to the new non-ISM channel.

Figure 34:
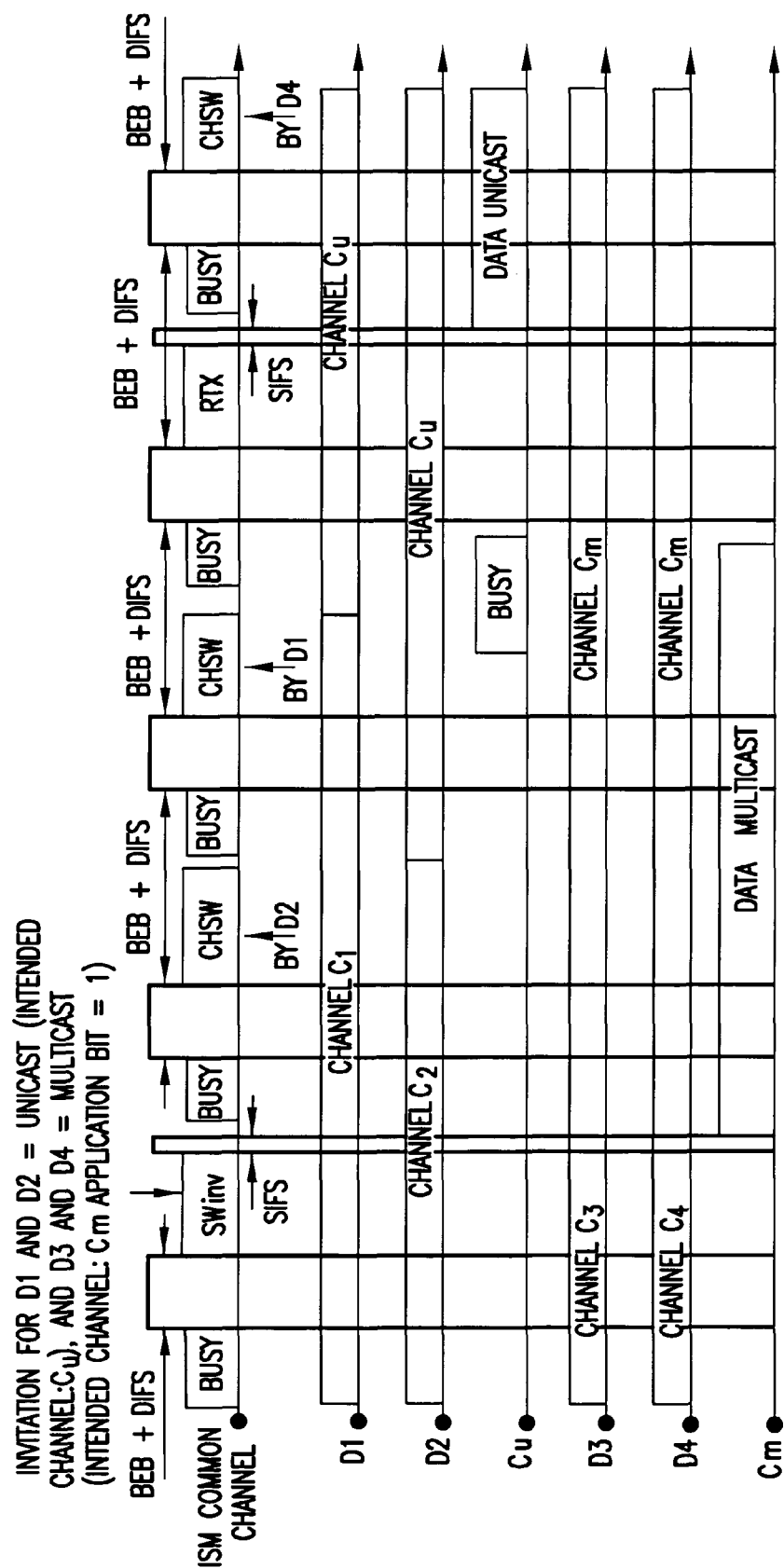
FIG. 34 illustrates exemplary message flow for a combined multicast/unicast channel switching use case.

A fourth use case relates to combined Multicast/Unicast channel switching. In this case the CSE invites a multicast group and a set of unicast CMEs to permanently switch to either one or two non-ISM channel(s). The multicast MAC address is loaded into the first RA field between Duration/ID and TA fields, while the remaining three RA addresses may be used for the unicast channel switching cases. In addition, the first CI sub-field in the CHSWIE is used for multicast channel switching and the second CI is utilized for the unicast channel switching case. As in the use cases described above, the Duration/ID field is loaded with 00. The OLD sub-field in the CHSWIE is loaded with either 00 or MULTICAST_DATA+SIFS, depending on the type of multicasting channel switching: Mode I or Mode II. Using the Application Bit in the CC, the type (or mode) of the multicast switching is specified. Based on the specified type of multicast switching the OLD sub-field is loaded with the appropriate value, i.e., 00 (Mode I) or MULTICAST_DATA+SIFS (Mode II). The subsequent channel activity is the same as multicast switching explained above, and is coordinated based on the switching mode: I or II. The OLD sub-field is not used for the appended unicast case, instead it is used for multicast switching and loaded according to the multicast mode. The unicast CDEs are required to transmit a CHSW frame over the shared ISM channel if they agree to switch their LTRC to the advertised destination channel. FIG. 34 illustrates an example for this case.

It can be appreciated that the embodiments described with reference to FIGS. 18-34 provide a further novel frequency agile medium access control protocol capable of coordination of concurrent multi-channel data communications in a distributed fashion. These embodiments may employ the distributed multi-channel cognitive MAC protocol for the 802.11 wireless LANs (an enhanced MAC or eMAC) which was described in reference to FIGS. 1-17. These embodiments provide unicast/multicast welfare enhancement, and a practical approach to reduce the incurred overhead on the shared ISM channel due to cognitive mesh entities control/management frame exchange. In addition, medium access delay experienced by cognitive mesh entities is reduced.

Based on the foregoing it should be apparent that the exemplary embodiments of this invention provide a method, apparatus and computer program product(s) to enhance the operation of wireless networks that include cognitive radio apparatus, such as mobile stations and mesh elements.

Figure 35:
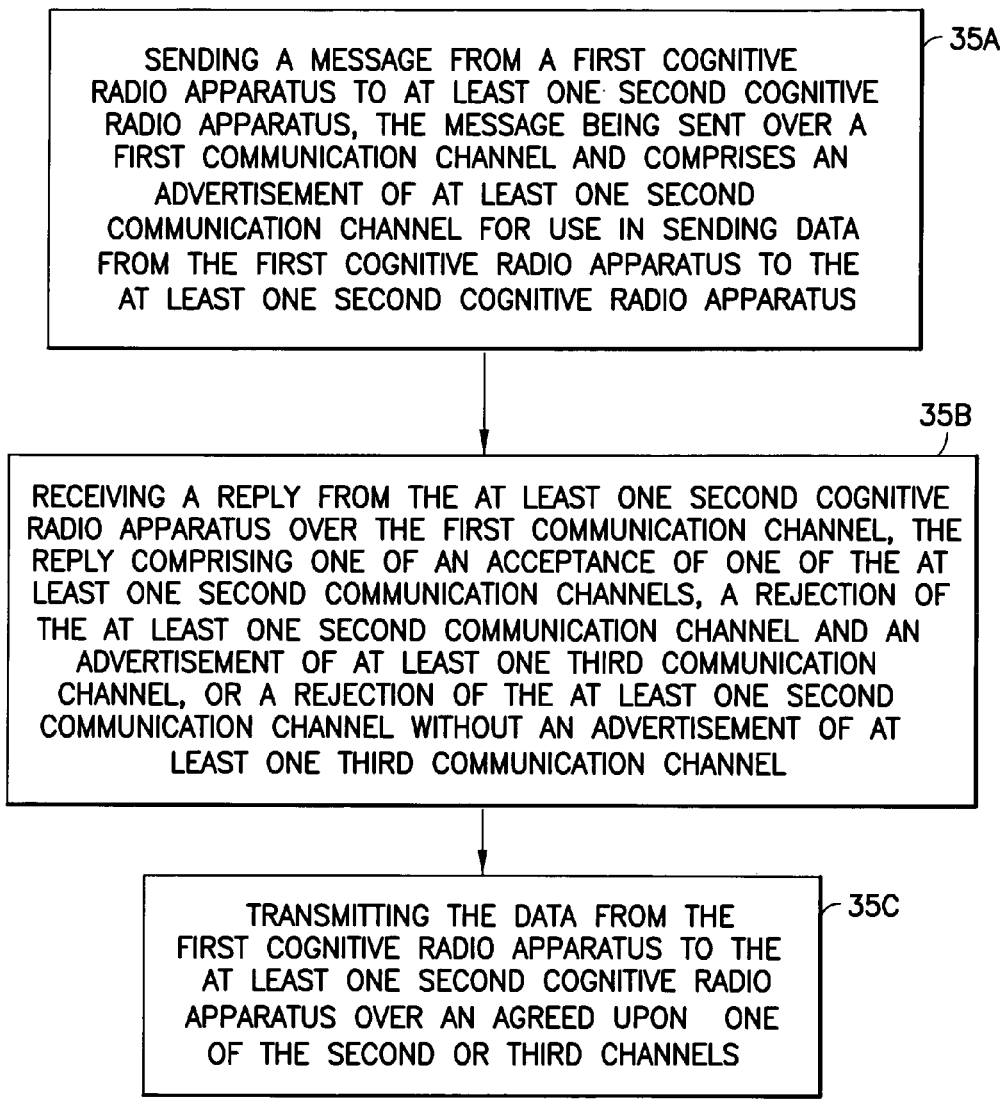
FIG. 35 is a logic flow diagram that illustrates the operation of a method, and a result of execution of computer program instructions, in accordance with the exemplary embodiments of this invention.

FIG. 35 is a logic flow diagram that illustrates the operation of a method, and a result of execution of computer program instructions, in accordance with the exemplary embodiments of this invention. At Block 35A there is a step of sending a message from a first cognitive radio apparatus to at least one second cognitive radio apparatus, the message being sent over a first communication channel and comprises an advertisement of at least one second communication channel for use in sending data from the first cognitive radio apparatus to the at least one second cognitive radio apparatus. At Block 35B there is a step of receiving a reply from the at least one second cognitive radio apparatus over the first communication channel, the reply comprising one of an acceptance of one of the at least one second communication channels, a rejection of the at least one second communication channel and an advertisement of at least one third communication channel, or a rejection of the at least one second communication channel without an advertisement of at least one third communication channel. At Block 35C there is a step of transmitting the data from the first cognitive radio apparatus to the at least one second cognitive radio apparatus over an agreed upon one of the second or third channels.

In the method, and the result of execution of computer program instructions as in the previous paragraph, where in a case where the reply is a rejection of the at least one second communication channel and the advertisement of at least one third communication channel, further comprising sending a response from the first cognitive radio apparatus to the second cognitive radio apparatus over the first communication channel, the response comprising one of an acceptance of one of the at least one third communication channels or a rejection of the at least one third communication channel.

In the method, and the result of execution of computer program instructions as in the previous paragraphs, where the reply comprises one of a reason for the acceptance or a reason for the rejection.

In the method, and the result of execution of computer program instructions as in the previous paragraphs, where the first communication channel is a common channel in an ISM frequency band that is used by cognitive radio apparatus and by non-cognitive radio apparatus.

In the method, and the result of execution of computer program instructions as in the previous paragraphs, where the first cognitive radio apparatus operates in one of a power saving mode enabled state or a power saving mode disabled state.

In the method, and the result of execution of computer program instructions as in the previous paragraphs, where the first cognitive radio apparatus comprises a first transceiver for communication over the first communication channel and a second frequency agile transceiver for communication over the second or third communication channels, further comprising a first task list associated with the first transceiver and a second task list associated with the second transceiver, each task list comprising at any given time one or both of reception tasks and transmission tasks and, for at least the second task list, a communication channel associated with each task.

In the method, and the result of execution of computer program instructions as in the previous paragraphs, where tasks in a given one of the task lists are prioritized, where reception tasks are assigned a higher priority than transmission tasks.

In the method, and the result of execution of computer program instructions as in the previous paragraphs, further comprising scheduling tasks so as to use, if possible, a same communication channel for more than one task.

In the method, and the result of execution of computer program instructions as in the previous paragraphs, further comprising scheduling tasks so as to use, if possible, a same communication channel for two reception tasks.

In the method, and the result of execution of computer program instructions as in the previous paragraphs, further comprising scheduling tasks so as to use, if possible, a same communication channel for two transmission tasks.

In the method, and the result of execution of computer program instructions as in the previous paragraphs, further comprising scheduling tasks so as to use, if possible, a same communication channel for a reception task and for a transmission task.

In the method, and the result of execution of computer program instructions as in the previous paragraphs, further comprising scheduling tasks so as to use a communication channel for a multicast transmission task to a plurality of second cognitive radio apparatus.

In the method, and the result of execution of computer program instructions as in the previous paragraphs, further comprising scheduling tasks so as to use a communication channel for a multicast transmission task to a plurality of second cognitive radio apparatus, and the same communication channel for a unicast transmission to at least one further cognitive radio apparatus.

In the method, and the result of execution of computer program instructions as in the previous paragraphs, where the second and third communication channels are in a non-ISM frequency band, and where a decision to accept or reject a particular channel is based at least in part on a result of spectrum sensing in the non-ISM frequency band to detect an appearance of a primary user.

In the method, and the result of execution of computer program instructions as in the previous paragraphs, where an advertised communication channel is accepted if it is not a channel in which a primary user appeared, and it has satisfactory spectrum quality results.

In the method, and the result of execution of computer program instructions as in the previous paragraphs, further comprising operating a cognitive medium access control entity that comprises a Last Successfully Experienced Channel (LSEC) table, a Primary User Appearance (PUA) table, and a Transient Zone that buffers identifications of locally and remotely discovered non-ISM channels, where each channel identified in LSEC and PUA table entries includes an associated time index having a value that changes periodically and that controls potential usage of the channels identified in the LSEC and PUA tables.

In the method, and the result of execution of computer program instructions as in the previous paragraph, where the value of the time index is changed every Beacon Interval.

In the method, and the result of execution of computer program instructions as in the previous paragraphs, where the time index value of a particular channel is reset to zero when the channel is placed in the LSEC table, where the time index value is periodically incremented, and where the channel is not available to be reused until the time index value reaches some predetermined non-zero value.

In the method, and the result of execution of computer program instructions as in the previous paragraphs, where the time index value of a particular channel is set to some predetermined value when the channel is placed in the PUA table, where the time index value is periodically decremented, and where the channel is removed from the PUA table when the time index value reaches zero.

In the method, and the result of execution of computer program instructions as in the previous paragraphs, where advertisements of the second and third communication channels each comprise fields for specifying an identification of a center frequency and a regulatory class.

In the method, and the result of execution of computer program instructions as in the previous paragraphs, where the first cognitive radio apparatus comprises a first transceiver for communication over the first communication channel, where the first communication channel is a common channel in an ISM frequency band that is used by cognitive radio apparatus and by non-cognitive radio apparatus, and a second frequency agile transceiver for communication over at least one communication channel in a non-ISM frequency band, further comprising sending a message over the first communication channel to the at least one second cognitive radio apparatus that also comprises first and second transceivers, the message instructing the second cognitive radio apparatus to one of switch temporarily or permanently to a particular communication channel in the non_ISM frequency band.

In the method, and the result of execution of computer program instructions as in the previous paragraphs, where in one mode of operation the second cognitive radio apparatus acknowledges the message over the first communication channel before switching to the particular communication channel in the non-ISM frequency band, and where in another mode of the operation the second cognitive radio apparatus acknowledges the message over the first communication channel after switching to the particular communication channel in the non-ISM frequency band.

In the method, and the result of execution of computer program instructions as in the previous paragraphs, further comprising sending at least one of multicast data and unicast data over the particular communication channel in the non-_ISM frequency band.

In the method, and the result of execution of computer program instructions as in the previous paragraphs, where the message invites a multicast group of second cognitive radio apparatus to switch temporarily to a particular non-ISM communication channel.

In the method, and the result of execution of computer program instructions as in the previous paragraphs, where the message invites a multicast group of second cognitive radio apparatus to switch permanently to a particular non-ISM communication channel.

In the method, and the result of execution of computer program instructions as in the previous paragraphs, where the message invites a single second cognitive radio apparatus to switch temporarily to a particular non-ISM communication channel.

In the method, and the result of execution of computer program instructions as in the previous paragraphs, where the message invites a multicast group of second cognitive radio apparatus and a single second cognitive radio apparatus to switch permanently to one or more than one particular non-ISM communication channels.

The various blocks shown in FIG. 35 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of prestored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings.

However, any and all modifications will still fall within the scope of the non-limiting and exemplary embodiments of this invention.

For example, while the exemplary embodiments have been described above in the context of the IEEE 802.11 type of system, it should be appreciated that the exemplary embodiments of this invention are not limited for use with only this one particular type of wireless communication system, and that they may be used to advantage in other wireless communication systems. Further, all of the various specific references to specific frequency bands and channels and channel numbers, the number of bits in certain frame fields, the names of these certain bits and fields, the ordering of these fields, the number of certain fields within a given frame and the like are meant to be exemplary, and are not to be construed as limitations upon the implementation and practice of the various exemplary embodiments.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising;
    sending a message from a first cognitive radio apparatus to at least one second cognitive radio apparatus during a negotiation phase to determine a channel to be used for sending data from the first cognitive radio apparatus to the at least one second cognitive radio apparatus, the message being sent over a first communication channel and comprising an advertisement of at least one second communication channel for use in sending the data from the first cognitive radio apparatus to the at least one second cognitive radio apparatus, the advertisement comprising a corresponding proposition/evaluation bit for each of the at least one second communication channel;
    receiving a reply from the at least one second cognitive radio apparatus over the first communication channel, the reply comprising one of an acceptance of one of the at least one second communication channels with the corresponding proposition/evaluation bit from the advertisement, a rejection of the at least one second communication channel and an advertisement of at least one third communication channel, and a rejection of the at least one second communication channel without an advertisement of at least one third communication channel; and transmitting the data from the first cognitive radio apparatus to the at least one second cognitive radio apparatus over an agreed upon one of the second or third channels in response to a completion of the negotiation phase,
where the first communication channel is a common channel in an ISM frequency band that is used by cognitive radio apparatus and by non-cognitive radio apparatus.

2. The method of claim 1, where in a case where the reply is a rejection of the at least one second communication channel and the advertisement of at least one third communication channel, further comprising sending a response from the first cognitive radio apparatus to the second cognitive radio apparatus over the first communication channel, the response comprising one of an acceptance of one of the at least one third communication channels or a rejection of the at least one third communication channel.

3. The method of claim 1, where the reply comprises one of a reason for the acceptance or a reason for the rejection.

4. The method of claim 1, where the first cognitive radio apparatus operates in one of a power saving mode enabled state or a power saving mode disabled state.

5. The method of claim 1, where the first cognitive radio apparatus comprises a first transceiver for communication over the first communication channel and a second transceiver for communication over the second or third communication channels, further comprising a first task list associated with the first transceiver and a second task list associated with the second transceiver, each task list comprising at any given time one or both of reception tasks and transmission tasks and, for at least the second task list, a communication channel associated with each task.

6. The method of claim 5, where tasks in a given one of the task lists are prioritized, where reception tasks are assigned a higher priority than transmission tasks.

7. The method of claim 1, where the second and third communication channels are in a non-ISM frequency band, and where a decision to accept or reject a particular channel is based at least in part on a result of spectrum sensing in the non-ISM frequency band to detect an appearance of a primary user.

8. The method of claim 7, where an advertised communication channel is accepted if it is not a channel in which a primary user appeared, and it has satisfactory spectrum quality results.

9. The method of claim 1, further comprising operating a cognitive medium access control entity that comprises a Last Successfully Experienced Channel (LSEC) table, a Primary User Appearance (PUA) table, and a Transient Zone that buffers identifications of locally and remotely discovered non-ISM channels, where each channel identified in LSEC and PUA table entries includes an associated time index having a value that changes periodically and that controls potential usage of the channels identified in the LSEC and PUA tables.

10. The method of claim 1, where advertisements of the second and third communication channels each comprise fields for specifying an identification of a center frequency and a regulatory class.

11. The method of claim 1, where the first cognitive radio apparatus comprises a first transceiver for communication over the first communication channel, where the first communication channel is a common channel in an ISM frequency band that is used by cognitive radio apparatus and by non-cognitive radio apparatus, and a second transceiver for communication over at least one communication channel in a non-ISM frequency band, further comprising sending a message over the first communication channel to the at least one second cognitive radio apparatus that also comprises first and second transceivers, the message instructing the second cognitive radio apparatus to one of switch temporarily or permanently to a particular communication channel in the non-ISM frequency band.

12. The method of claim 1, wherein the corresponding proposition/evaluation bit is a subfield of a channel control byte sent by the first cognitive radio apparatus during the negotiation phase.

13. A computer-readable non-transitory medium that stores program instructions, the execution of the program instructions resulting in operations that comprise:
sending a message from a first cognitive radio apparatus to at least one second cognitive radio apparatus during a negotiation phase to determine a channel to be used for sending data from the first cognitive radio apparatus to the at least one second cognitive radio apparatus, the message being sent over a first communication channel and comprising an advertisement of at least one second communication channel for use in sending the data from the first cognitive radio apparatus to the at least one second cognitive radio apparatus, the advertisement comprising a corresponding proposition/evaluation bit for each of the at least one second communication channel;
receiving a reply from the at least one second cognitive radio apparatus over the first communication channel, the reply comprising one of an acceptance of one of the at least one second communication channels with the corresponding proposition/evaluation bit from the advertisement, a rejection of the at least one second communication channel and an advertisement of at least one third communication channel, and a rejection of the at least one second communication channel without an advertisement of at least one third communication channel; and
transmitting the data from the first cognitive radio apparatus to the at least one second cognitive radio apparatus over an agreed upon one of the second or third channels in response to a completion of the negotiation phase,
where the first communication channel is a common channel in an ISM frequency band that is used by cognitive radio apparatus and by non-cognitive radio apparatus.

14. The computer-readable medium of claim 13, where in a case where the reply is a rejection of the at least one second communication channel and the advertisement of at least one third communication channel, further comprising sending a response from the first cognitive radio apparatus to the second cognitive radio apparatus over the first communication channel, the response comprising one of an acceptance of one of the at least one third communication channels or a rejection of the at least one third communication channel.

15. The computer-readable medium of claim 13, where the reply comprises one of a reason for the acceptance or a reason for the rejection.

16. The computer-readable medium of claim 13, where the first cognitive radio apparatus operates in one of a power saving mode enabled state or a power saving mode disabled state.

17. The computer-readable medium of claim 13, where the first cognitive radio apparatus comprises a first transceiver for communication over the first communication channel and a second transceiver for communication over the second or third communication channels, further comprising a first task list associated with the first transceiver and a second task list associated with the second transceiver, each task list comprising at any given time one or both of reception tasks and transmission tasks and, for at least the second task list, a communication channel associated with each task.

18. The computer-readable medium of claim 17, where tasks in a given one of the task lists are prioritized, where reception tasks are assigned a higher priority than transmission tasks.

19. The computer-readable medium of claim 13, where the second and third communication channels are in a non-ISM frequency band, and where a decision to accept or reject a particular channel is based at least in part on a result of spectrum sensing in the non-ISM frequency band to detect an appearance of a primary user.

20. The computer-readable medium of claim 19, where an advertised communication channel is accepted if it is not a channel in which a primary user appeared, and it has satisfactory spectrum quality results.

21. The computer-readable medium of claim 13, further comprising an operation of operating a cognitive medium access control entity that comprises a Last Successfully Experienced Channel (LSEC) table, a Primary User Appearance (PUA) table, and a Transient Zone that buffers identifications of locally and remotely discovered non-ISM channels, where each channel identified in LSEC and PUA table entries includes an associated time index having a value that changes periodically and that controls potential usage of the channels identified in the LSEC and PUA tables.

22. The computer-readable medium of claim 13, where advertisements of the second and third communication channels each comprise fields for specifying an identification of a center frequency and a regulatory class.

23. The computer-readable medium of claim 13, where the first cognitive radio apparatus comprises a first transceiver for communication over the first communication channel, where the first communication channel is a common channel in an ISM frequency band that is used by cognitive radio apparatus and by non-cognitive radio apparatus, and a second transceiver for communication over at least one communication channel in a non-ISM frequency band, further comprising an operation of sending a message over the first communication channel to the at least one second cognitive radio apparatus that also comprises first and second transceivers, the message instructing the second cognitive radio apparatus to one of switch temporarily or permanently to a particular communication channel in the non-ISM frequency band.

24. An apparatus, comprising;
a first transceiver for communication over a first communication channel;
a second transceiver for communication over second and third communication channels; and
a controller configured to operate the apparatus as a first cognitive radio apparatus and to transmit a message to at least one second cognitive radio apparatus during a negotiation phase to determine a channel to be used for sending data from the first cognitive radio apparatus to the at least one second cognitive radio apparatus, the message being transmitted over the first communication channel and comprising an advertisement of at least one second communication channel for use in sending the data from the first cognitive radio apparatus to the at least one second cognitive radio apparatus, the advertisement comprising a corresponding proposition/evaluation bit for each of the at least one second communication channel, said controller further configured to receive a reply from the at least one second cognitive radio apparatus over me first communication channel, the reply comprising one of an acceptance of one of the at least one second communication channels with the corresponding proposition/evaluation bit from the advertisement, a rejection of the at least one second communication channel and an advertisement of at least one third communication channel, and a rejection of the at least one second communication channel without an advertisement of at least one third communication channel, said controller further configured to transmit the data to the at least one second cognitive radio apparatus over an agreed upon one of the second or third channels in response to a completion of the negotiation phase.

25. The apparatus of claim 24, where in a case where the reply is a rejection of the at least one second communication channel and the advertisement of at least one third communication channel, said controller is further configurable to transmit a response to the second cognitive radio apparatus over the first communication channel, the response comprising one of an acceptance of one of the at least one third communication channels or a rejection of the at least one third communication channel.

26. The apparatus of claim 24, where the reply comprises one of a reason for the acceptance or a reason for the rejection.

27. The apparatus of claim 24, where the first communication channel comprises a common channel in an ISM frequency band that is used by cognitive radio apparatus and by non-cognitive radio apparatus.

28. The apparatus of claim 24, operating in one of a power saving mode enabled state or a power saving mode disabled state.

29. The apparatus of claim 24, further comprising a first task list associated with the first transceiver and a second task list associated with the second transceiver, each task list comprising at any given time one or both of reception tasks and transmission tasks and, for at least the second task list, a communication channel associated with each task, where tasks in a given one of the task lists are prioritized, where reception tasks are assigned a higher priority than transmission tasks, and where said controller is further configurable when scheduling tasks to use, if possible, a same communication channel for two reception tasks, or a same communication channel for two transmission tasks, or a same communication channel for a reception task and for a transmission task, or a communication channel for a multicast transmission task to a plurality of second cognitive radio apparatus, or a communication channel for a multicast transmission task to a plurality of second cognitive radio apparatus, and the same communication channel for a unicast transmission to at least one further cognitive radio apparatus.

30. The apparatus of claim 24, where advertisements of the second and third communication channels each comprise fields for specifying an identification of a center frequency and a regulatory class.

31. The apparatus of claim 24, where the first communication channel is a common channel in an ISM frequency band that is used by cognitive radio apparatus and by non-cognitive radio apparatus, where the second transceiver is configured to communicate over at least one communication channel in a non-ISM frequency band, and where said controller is further configurable to send a further message for instructing the second cognitive radio apparatus to one of switch temporarily or permanently to a particular communication channel in the non-ISM frequency band, where in one mode of operation said controller receives an acknowledgment from the second cognitive radio apparatus of the instruction before the second cognitive radio apparatus switches to the particular communication channel in the non-ISM frequency band, and where in another mode of operation said controller receives an acknowledgment from the second cognitive radio apparatus of the instruction after the second cognitive radio apparatus switches to the particular communication channel in the non-ISM frequency band.

* * * * *